(12) United States Patent
Hagihara

(10) Patent No.: US 9,001,241 B2
(45) Date of Patent: *Apr. 7, 2015

(54) A/D CONVERSION CIRCUIT AND IMAGE PICK-UP DEVICE

(75) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 442 days.

This patent is subject to a terminal disclaimer.

(21) Appl. No.: 13/413,773

(22) Filed: Mar. 7, 2012

(65) Prior Publication Data

US 2012/0229666 A1    Sep. 13, 2012

(30) Foreign Application Priority Data

Mar. 8, 2011    (JP) .................. 2011-050812

(51) Int. Cl.
  *H04N 3/14*    (2006.01)
  *H04N 5/335*    (2011.01)
  *H04N 5/378*    (2011.01)

(52) U.S. Cl.
  CPC .................... *H04N 5/378* (2013.01)

(58) Field of Classification Search
  CPC .. H04N 5/378; H04N 5/37455; H04N 5/3765
  USPC ................................. 348/294–324
  See application file for complete search history.

(56) References Cited

U.S. PATENT DOCUMENTS 7,629,913 B2    12/2009  Okumura
8,704,696 B2 *   4/2014  Hagihara ............... 341/169
2005/0242849 A1  11/2005  Muramatsu et al.
2009/0167586 A1   7/2009  Shimomura et al.
2010/0194949 A1   8/2010  Hisamatsu
2010/0225796 A1*  9/2010  Lim et al. .............. 348/308

(Continued)

FOREIGN PATENT DOCUMENTS

JP    2000-001399 A    1/2000
JP    2001-008109 A    1/2001
JP    2005-311933 A    11/2005

(Continued)

OTHER PUBLICATIONS

Notice of Allowance and Fee(s) Due dated Dec. 18, 2013, issued in related U.S. Appl. No. 13/683,685 (12 pages).

(Continued)

*Primary Examiner* — Christopher K Peterson
(74) *Attorney, Agent, or Firm* — Westerman, Hattori, Daniels & Adrian, LLP

(57) ABSTRACT

An A/D conversion circuit includes a reference signal generation unit, a comparison unit, a delay circuit, a latch unit, an arithmetic circuit, a lower counter, and an upper counter including a second binary counter performing counting using the count clock based on one of the output signals constituting the first lower phase signal, performs counting to acquire a first upper count value, inverts values of respective bits constituting the first upper count value, performs counting using the count clock based on of the output signals constituting the second lower phase signal, and performs counting based on the second upper count clock to acquire a second upper count value, and having a data protection function for protecting an upper count value held by the second binary counter at a time of count clock switching, wherein digital data corresponding to a difference between the first and second analog signals is acquired.

9 Claims, 23 Drawing Sheets

(56) References Cited

U.S. PATENT DOCUMENTS

2011/0013058 A1 1/2011 Sakurai et al.
2012/0176518 A1 7/2012 Yamazaki et al.

FOREIGN PATENT DOCUMENTS

| JP | 2009-089066 A | 4/2009 |
| JP | 2009-159331 A | 7/2009 |
| JP | 2011-023887 A | 2/2011 |

OTHER PUBLICATIONS

Japanese Notice of Allowance dated Sep. 30, 2014, issued in corresponding JP Application No. 2011-050812 with English translation (6 pages).

* cited by examiner

A/D CONVERSION CIRCUIT AND IMAGE PICK-UP DEVICE

BACKGROUND OF THE INVENTION

1. Field of the Invention

The present invention relates to an A/D conversion circuit and an image pick-up device provided with the A/D conversion circuit.

Priority is claimed on Japanese Patent Application No. 2011-050812, filed Mar. 8, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

FIG. 21 is a block diagram illustrating a partial configuration of a conventional A/D conversion circuit. FIG. 21 illustrates a unit of a conventional A/D conversion circuit for measuring a time, which is called a time to digital converter (TDC)-type A/D conversion circuit. The circuit illustrated in FIG. 21 includes a ring-like delay circuit 201 in which a plurality of delay elements NAND0 and INV1 to INV8 are connected to one another in a ring shape, a latch circuit 202 for holding the output of the ring-like delay circuit 201, a binarizing circuit (a full-encoder circuit) 203 for binarizing values held by the latch circuit 202, a counter circuit 204 for performing counting using one of the outputs of the ring-like delay circuit 201 as a count clock, and a memory circuit 205 for holding the output of the binarizing circuit 203 and the counter circuit 204.

Next, an A/D conversion operation will be described. FIG. 22 is a timing chart illustrating a conventional operation. FIG. 22 illustrates the operation timing of the circuit illustrated in FIG. 21. A logic state of a starting pulse StartP changes from an L state to an H state, so that the logic states of the delay elements constituting the ring-like delay circuit 201 sequentially change. Accordingly, a pulse circulates in the ring-like delay circuit 201. After a predetermined time has lapsed, the latch circuit 202 holds (latches) the output of the ring-like delay circuit 201. As illustrated in FIG. 22, the output of the ring-like delay circuit 201 corresponds to any one of nine states (state 0 to state 8). The output of the ring-like delay circuit 201 held (latched) by the latch circuit 202 is fully encoded (simultaneously encoded) by the binarizing circuit 203 to generate binarized data (a lower count value). The counter circuit 204 performs counting using the output of the delay element INV8 as a count clock to generate a count value (an upper count value). The lower count value and the upper count value are held in the memory circuit 205 to be output to the subsequent circuit as digital data.

The above-mentioned A/D conversion circuit is applied to, for example, an image pick-up device. Japanese Unexamined Patent Application, First Publication No. 2011-23887 discloses an example in which an A/D conversion circuit is arranged in a column unit provided to correspond to each of pixel columns to perform A/D conversion with respect to signals output from pixels.

FIG. 23 is a block diagram illustrating the configuration of a conventional image pick-up device. FIG. 23 illustrates a schematic configuration of a (C)MOS image pick-up device in accordance with a conventional example disclosed in Japanese Unexamined Patent Application, First Publication No. 2011-23887. An image pick-up device 1001 includes an image capturing unit 1002, a vertical selection unit 1012, a read current source unit 1005, an analog unit 1006, a clock generation unit 1018, a ramp unit 1019, a column processing unit 1015, a horizontal selection unit 1014, an output unit 1017, and a control unit 1020. The image pick-up device 1001 is provided in column A/D conversion sections 1016 of the column processing unit 1015 thereof with a unit of the circuit illustrated in FIG. 21, and performs A/D conversion using the column A/D conversion sections 1016.

The control unit 1020 controls the vertical selection unit 1012, the read current source unit 1005, the analog unit 1006, the clock generation unit 1018, the ramp unit 1019, the column processing unit 1015, the horizontal selection unit 1014, the output unit 1017, and the like. The image capturing unit 1002 has a configuration in which unit pixels 1003 having photoelectric conversion elements are arranged in a matrix form, generates pixel signals corresponding to the amounts of incident electromagnetic waves, and outputs the pixel signals to vertical signal lines 1013 provided to columns.

The vertical selection unit 1012 controls row addresses or row scanning of the image capturing unit 1002 through row control lines 1011 when the unit pixels 1003 of the image capturing unit 1002 are driven. The horizontal selection unit 1014 controls column addresses or column scanning of the column A/D conversion sections 1016 of the column processing unit 1015. The read current source unit 1005 is a current source for reading the pixel signals from the image capturing unit 1002 as voltage signals. The analog unit 1006 performs amplification and the like according to necessity.

The column processing unit 1015 includes the column A/D conversion sections 1016 provided to the columns of the image capturing unit 1002. The column A/D conversion section 1016 converts an analog signal, which is the pixel signal output for each column from each unit pixel 1003 of the image capturing unit 1002, into digital data, and outputs the digital data. The clock generation unit 1018, for example, includes a ring-like delay circuit (corresponding to the ring-like delay circuit 201 of FIG. 21), and outputs a counter clock. The ramp unit 1019, for example, includes an integration circuit or a DAC circuit, and generates a reference signal which changes in an inclined manner through time.

The horizontal selection unit 1014 includes a shift register, a decoder and the like, and controls the column address or column scanning of each column A/D conversion sections 1016 in the column processing unit 1015. Accordingly, the A/D converted digital data is sequentially output to the output unit 1017 through horizontal signal lines.

Next, the configuration of the column A/D conversion section 1016 will be described. Each of the column A/D conversion sections 1016 has the same configuration, and includes a comparison unit 1110 and a counter 1101 (corresponding to the counter circuit 204 of FIG. 21).

The comparison unit 1110 includes a comparator circuit, and compares the pixel signal output from the unit pixel 1003 of the image capturing unit 1002 with the reference signal. For example, the comparison unit 1110 outputs a High level when the reference signal is larger than the pixel signal, and outputs a Low level when the reference signal is smaller than the pixel signal. The counter 1101 includes a binary counter circuit, and measures a comparison time until the comparison unit 1110 completes the comparison. Accordingly, a measurement value of the comparison time corresponding to the amplitude of the pixel signal is obtained as a count value of the counter 1101.

Next, the A/D conversion operation will be described. The detailed operation of the unit pixel 1003 will be omitted.

However, a reset level and a signal level are output from the unit pixel 1003 as the pixel signal.

First, after the reset level is stably read from the unit pixel 1003, the comparison unit 1110 compares the reference signal with the pixel signal. The counter 1101 performs counting in an up-count mode, and a count value at the time of completion of the comparison is digital data of the reset level. Then, the count value of the counter 1101 is inverted.

Next, after the signal level is stably read from the unit pixel 1003, the comparison unit 1110 compares the reference signal with the pixel signal. The counter 1101 performs the counting in the up-count mode, and a count value of the counter 1101 at the time of completion of the comparison is digital data of a signal component (a signal obtained by subtracting the reset level from the signal level).

In the image pick-up device illustrated in FIG. 23, the counter 1101 corresponding to the counter circuit 204 illustrated in FIG. 21 performs the counting, so that an upper count value constituting an upper bit of digital data is obtained. However, since the image pick-up device has no configuration corresponding to the latch circuit 202 and the binarizing circuit 203 illustrated in FIG. 21, it is not possible to obtain a lower count value constituting a lower bit of digital data. Therefore, in the image pick-up device illustrated in FIG. 23, it is not possible to obtain digital data with high accuracy.

Circuits for obtaining an upper count value and a lower count value are arranged at units corresponding to the column A/D conversion sections 1016 of FIG. 23, so that it is possible to obtain digital data with high accuracy. As an example of such a circuit arrangement, an upper counter for obtaining the upper count value and a lower counter for obtaining the lower count value are considered to be arranged at the units corresponding to the column A/D conversion sections 1016.

In this case, the upper counter performs counting using one of output signals of a plurality of delay elements as a count clock, and the lower counter performs counting using a signal corresponding to the states of output signals of a plurality of delay elements as a count clock. When carry digit or shift-down digit has occurred in the most significant bit (MSB) of the lower count value counted by the lower counter, the upper counter performs counting using the MSB output signal of the lower counter as a count clock in order to adjust the upper counter value by the carry digit or shift-down digit.

Therefore, it is necessary to switch the counter clock input to the upper counter between one output signal of the plurality of delay elements and the MSB output signal of the lower counter. Hereinafter, the case in which the upper counter performs counting at the falling of the count clock (the upper counter performs counting when the count clock has changed from a High state (hereinafter referred to as an H state) to a Low state (hereinafter referred to as an L state)) will be described as an example.

The A/D conversion operation is an asynchronous operation, and a logic state of the count clock (one output signal of the plurality of delay elements) at a time point (a comparison completion time point) at which the comparison between the reference signal and the pixel signal has been completed is the H state or the L state. For example, when the logic state of the count clock at the comparison completion time point is the H state and a count clock in the L state is input from the lower counter to the upper counter through count clock switching, the logic state of the count clock changes from the H state to the L state before and after the switching, resulting in the occurrence of a phenomenon (erroneous count) in which the upper counter unnecessarily performs counting by one count. In other words, the erroneous count occurs due to the count clock switching input to the upper counter.

SUMMARY

The present invention provides an A/D conversion circuit and an image pick-up device capable of preventing the occurrence of an erroneous count.

An A/D conversion circuit may include: a reference signal generation unit that generates a reference signal increasing or decreasing through time; a comparison unit that compares an analog signal to be subject to A/D conversion with the reference signal, and completes a comparison process at a timing at which the reference signal has satisfied a predetermined condition with respect to the analog signal; a delay circuit that has a plurality of delay elements connected to one another to delay a pulse signal, and outputs a lower phase signal including output signals from the plurality of delay elements; a latch unit that latches a first lower phase signal at a first timing and then latches a second lower phase signal at a second timing, the first timing corresponding to a timing at which the comparison process for a first analog signal is completed, the second timing corresponding to a timing at which the comparison process for a second analog signal is completed; an arithmetic circuit that generates a first lower count signal according to the first lower phase signal held by the latch unit, and generates a second lower count signal according to the second lower phase signal held by the latch unit; a lower counter including a first binary counter that performs counting using the first lower count signal as a count clock and outputs a first upper count clock to acquire a first lower count value, inverts values of respective bits constituting the first lower count value, and performs counting using the second lower count signal as a count clock and outputs a second upper count clock to acquire a second lower count value; and an upper counter including a second binary counter that performs counting using the count clock based on one of the output signals constituting the first lower phase signal output from the delay circuit as a count clock, performs counting based on the first upper count clock to acquire a first upper count value, inverts values of respective bits constituting the first upper count value, performs counting using the count clock based on one of the output signals constituting the second lower phase signal output from the delay circuit as a count clock, and performs counting based on the second upper count clock to acquire a second upper count value, and having a data protection function for protecting an upper count value held by the second binary counter at the time of count clock switching, wherein digital data corresponding to a difference between the first analog signal and the second analog signal is acquired.

The A/D conversion circuit may further include: an adjustment unit that outputs an adjustment signal to the first binary counter or the second binary counter as a count clock, the adjustment signal being used for adjusting the lower count value held by the first binary counter or the upper count value held by the second binary counter.

The delay circuit may be a ring-like delay circuit in which the plurality of delay elements are connected to one another in a ring shape.

An image pick-up device may include: an image capturing unit including a plurality of pixels provided with a photoelectric conversion element, the plurality of pixels outputting a first pixel signal corresponding to a reset level at a first time and outputting a second pixel signal corresponding to an amount of incident electromagnetic wave at a second time; and the A/D conversion circuit, wherein the first pixel signal is used as the first analog signal and the second pixel signal is used as the second analog signal.

An A/D conversion circuit may include: a reference signal generation unit that generates a reference signal increasing or decreasing through time; a comparison unit that compares an analog signal to be subject to A/D conversion with the reference signal, and completes a comparison process at a timing at which the reference signal has satisfied a predetermined condition with respect to the analog signal; a delay circuit that has a plurality of delay elements connected to one another to delay a pulse signal, and outputs a lower phase signal including output signals from the plurality of delay elements; a latch unit that latches a first lower phase signal at a first timing and then latches a second lower phase signal at a second timing, the first timing corresponding to a timing at which the comparison process for a first analog signal is completed, the second timing corresponding to a timing at which the comparison process for a second analog signal is completed; an arithmetic circuit that generates a first lower count signal according to the first lower phase signal held by the latch unit, and generates a second lower count signal according to the second lower phase signal held by the latch unit; a lower counter including a first binary counter that performs counting using the first lower count signal as a count clock to acquire a first lower count value, inverts values of respective bits constituting the first lower count value, performs counting using the second lower count signal as a count clock to acquire a second lower count value, and outputs an upper count clock based on a bit for a flag of the second lower count value; and an upper counter including a second binary counter that performs counting using the count clock based on one of the output signals constituting the first lower phase signal output from the delay circuit as a count clock to acquire a first upper count value, inverts values of respective bits constituting the first upper count value, performs counting using the count clock based on one of the output signals constituting the second lower phase signal output from the delay circuit as a count clock, and performs counting based on the upper count clock to acquire a second upper count value, and having a data protection function for protecting an upper count value held by the second binary counter at a time of count clock switching, wherein digital data corresponding to a difference between the first analog signal and the second analog signal is acquired.

The upper counter may further have a data set function for setting an initial value of the upper count value of the second binary counter when performing counting using the count clock based on the one of the output signals constituting the first lower phase signal output from the delay circuit as the count clock.

The A/D conversion circuit may further include: an adjustment unit that outputs an adjustment signal to the first binary counter or the second binary counter as a count clock, the adjustment signal being used for adjusting the lower count value held by the first binary counter or the upper count value held by the second binary counter.

The delay circuit may be a ring-like delay circuit in which the plurality of delay elements are connected to one another in a ring shape.

An image pick-up device may include: an image capturing unit including a plurality of pixels provided with a photoelectric conversion element, the plurality of pixels outputting a first pixel signal corresponding to a reset level at a first time and outputting a second pixel signal corresponding to an amount of incident electromagnetic wave at a second time; and the A/D conversion circuit, wherein the first pixel signal is used as the first analog signal and the second pixel signal is used as the second analog signal.

The present invention is provided with the upper counter having a data protection function for protecting the upper count value held by the second binary counter when the count clock switching is performed, so that it is possible to prevent the occurrence of erroneous count.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
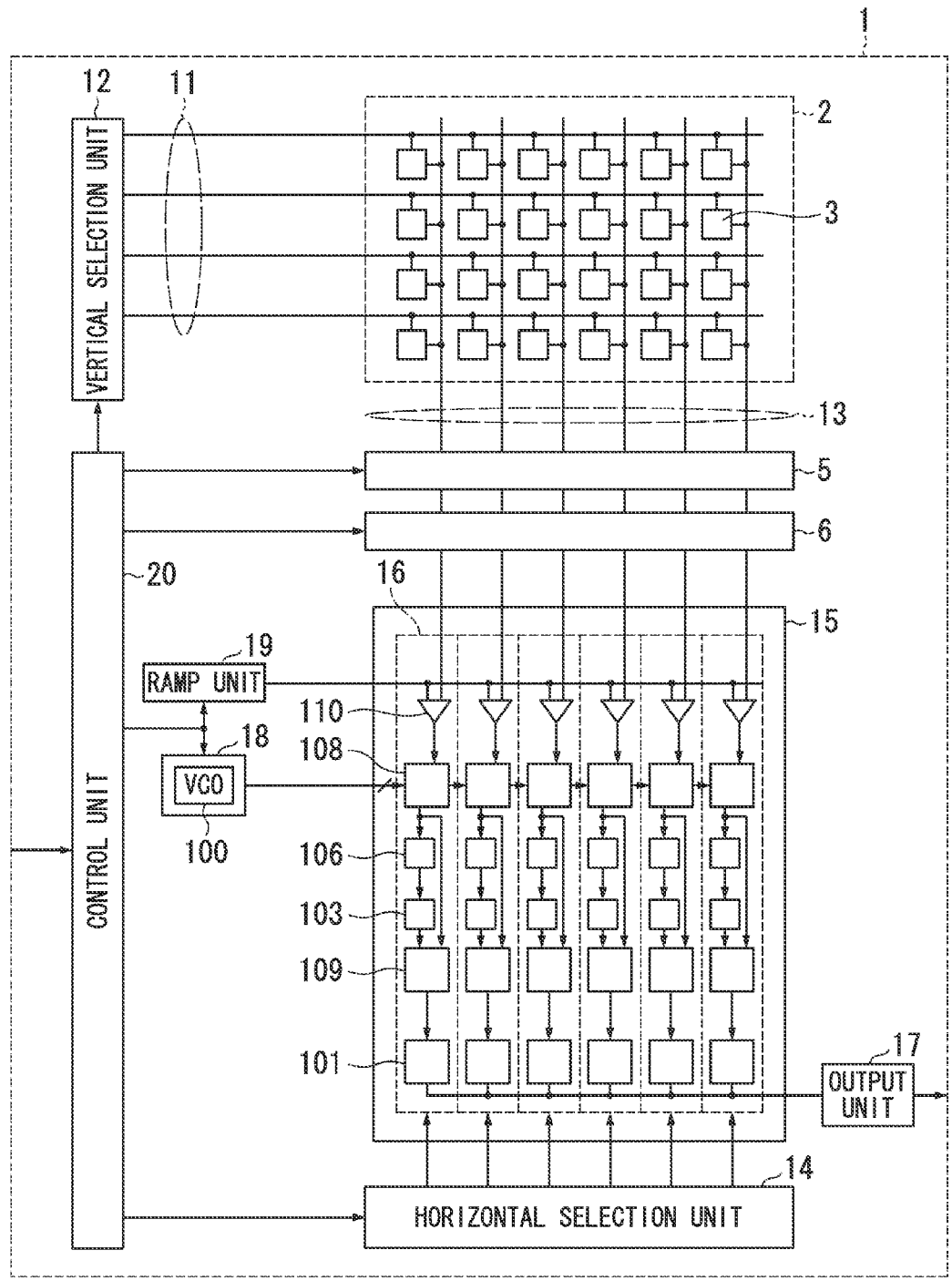
FIG. 1 is a block diagram illustrating the configuration of an image pick-up device in accordance with the first preferred embodiment of the present invention.

First, a first preferred embodiment of the present invention will be described. FIG. 1 is a block diagram illustrating the configuration of an image pick-up device in accordance with the first preferred embodiment of the present invention. FIG. 1 illustrates an example of the configuration of a (C)MOS image pick-up device in accordance with the present preferred embodiment. An image pick-up device 1 illustrated in FIG. 1 includes an image capturing unit 2, a vertical selection unit 12, a read current source unit 5, an analog unit 6, a clock generation unit 18, a ramp unit 19 (a reference signal generation unit), a column processing unit 15, a horizontal selection unit 14, an output unit 17, and a control unit 20.

The image capturing unit 2 has a configuration in which a plurality of unit pixels 3 are arranged in a matrix form to generate and output signals corresponding to the amounts of incident electromagnetic waves. The vertical selection unit 12 selects each row of the image capturing unit 2. The read current source unit 5 reads signals from the image capturing unit 2 as voltage signals. The analog unit 6 has an auto gain control (AGC) circuit having a signal amplification function according to necessity, which will not be described in detail. The clock generation unit 18 generates each clock. The ramp unit 19 generates a reference signal (a ramp wave) that increases or decreases with time. The column processing unit 15 is connected to the ramp unit 19 through a reference signal line. The horizontal selection unit 14 reads A/D converted data to a horizontal signal line. The output unit 17 is connected to the horizontal signal line. The control unit 20 controls these units.

In FIG. 1, the image capturing unit 2 including 4 rows 6 columns of unit pixels 3 will be described for the purpose of convenience. Actually, several tens or several tens of thousands of unit pixels 3 are arranged in rows and columns of the image capturing unit 2. Although not illustrated in the drawing, the unit pixels 3 constituting the image capturing unit 2 include a photoelectric conversion element such as a photodiode, a photogate or a phototransistor, and a transistor circuit.

Hereinafter, each unit will be described in detail. The image capturing unit 2 has a configuration in which the unit pixels 3 are two-dimensionally arranged in 4 rows 6 columns and row control lines 11 are arranged at the rows with respect to the pixel arrangement of 4 rows 6 columns. One end of each row control line 11 is connected to an output terminal corresponding to each row of the vertical selection unit 12. The vertical selection unit 12 includes a shift register, a decoder and the like, and controls row addresses or row scanning of the image capturing unit 2 through the row control lines 11 when the unit pixels 3 of the image capturing unit 2 are driven. Furthermore, vertical signal lines 3 are arranged at the columns with respect to the pixel arrangement of the image capturing unit 2.

The read current source unit 5 includes a current source configured to read signals from the image capturing unit 2 as voltage signals.

The column processing unit 15, for example, has column A/D conversion sections 16 provided to the pixel columns of the image capturing unit 2, that is, the vertical signal lines 13, and converts analog pixel signals into digital data, wherein the analog pixel signals are read from the unit pixels 3 of the image capturing unit 2 for each pixel column through the vertical signal lines 13. In the present example, the column A/D conversion sections 16 correspond to the pixel columns of the image capturing unit 2 in a one-to-one manner. This is for illustrative purposes only. The present invention is not limited to such an arrangement relation. For example, it is possible to employ a configuration in which one column A/D conversion section 16 is arranged to a plurality of pixel columns and is used among the plurality of pixel columns in a time division manner. The column processing unit 15 forms an analog-digital conversion unit for converting an analog pixel signal, which is read from the unit pixel 3 of a selection pixel row of the image capturing unit 2, into digital pixel data, together with the ramp unit 19 and the clock generation unit 18 which will be described later. The column processing unit 15, specifically, the column A/D conversion section 16 will be described in detail later.

The ramp unit 19, for example, includes an integration circuit, generates a so-called ramp wave which has level changing in an inclined manner through time, and supplies the ramp wave to the input terminals of comparison units 110 through a reference signal line under the control of the control unit 20. The ramp unit 19 may also use a DAC circuit as well as the integration circuit. However, when the ramp wave is generated using the DAC circuit in a digital manner, the ramp unit 19 is necessary to subdivide the step of the ramp wave or employ a configuration equivalent thereto.

The horizontal selection unit 14 includes a shift register, a decoder and the like, and controls column addresses or column scanning of the column A/D conversion sections 16 of the column processing unit 15. Under the control of the horizontal selection unit 14, digital data A/D converted by the column A/D conversion sections 16 is sequentially read to the horizontal signal line.

Figure 21:
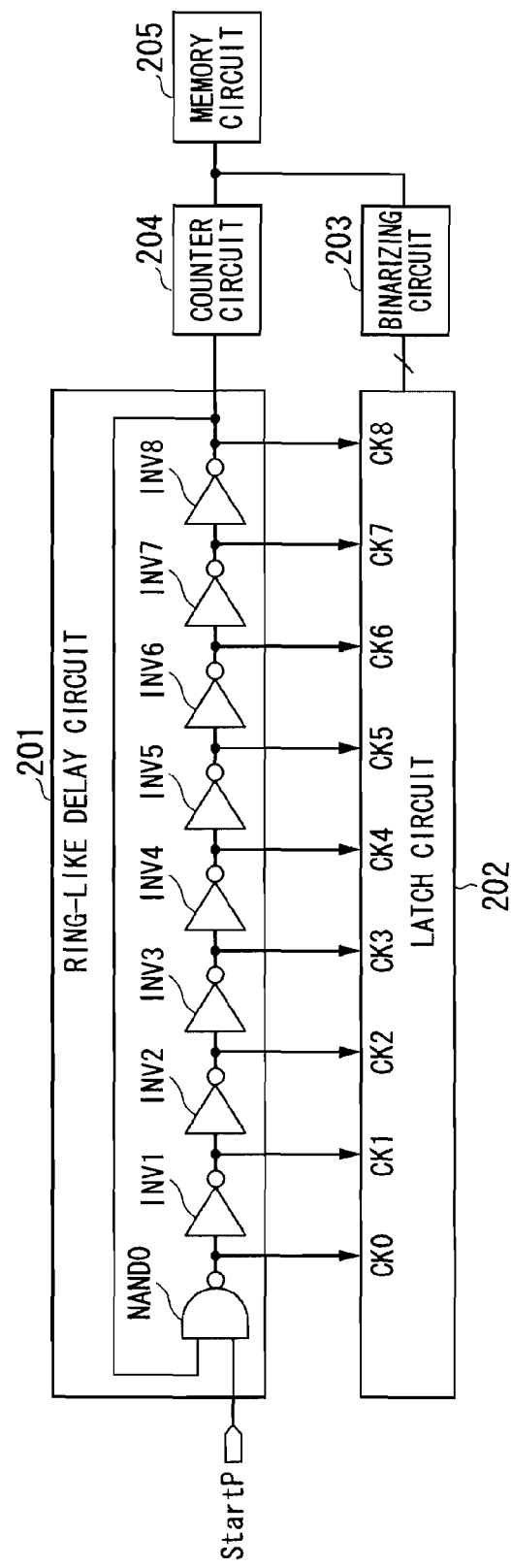
FIG. 21 is a block diagram illustrating a partial configuration of a conventional A/D conversion circuit.
Figure 22:
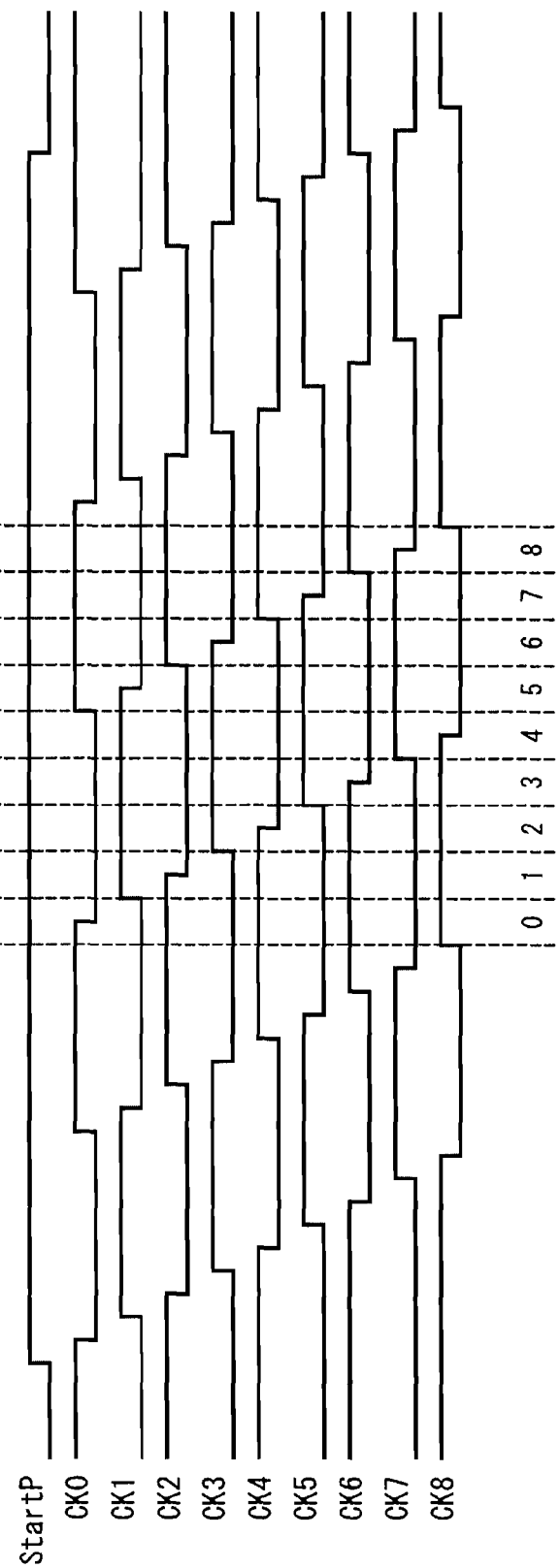
FIG. 22 is a timing chart illustrating a conventional operation.
Figure 23:
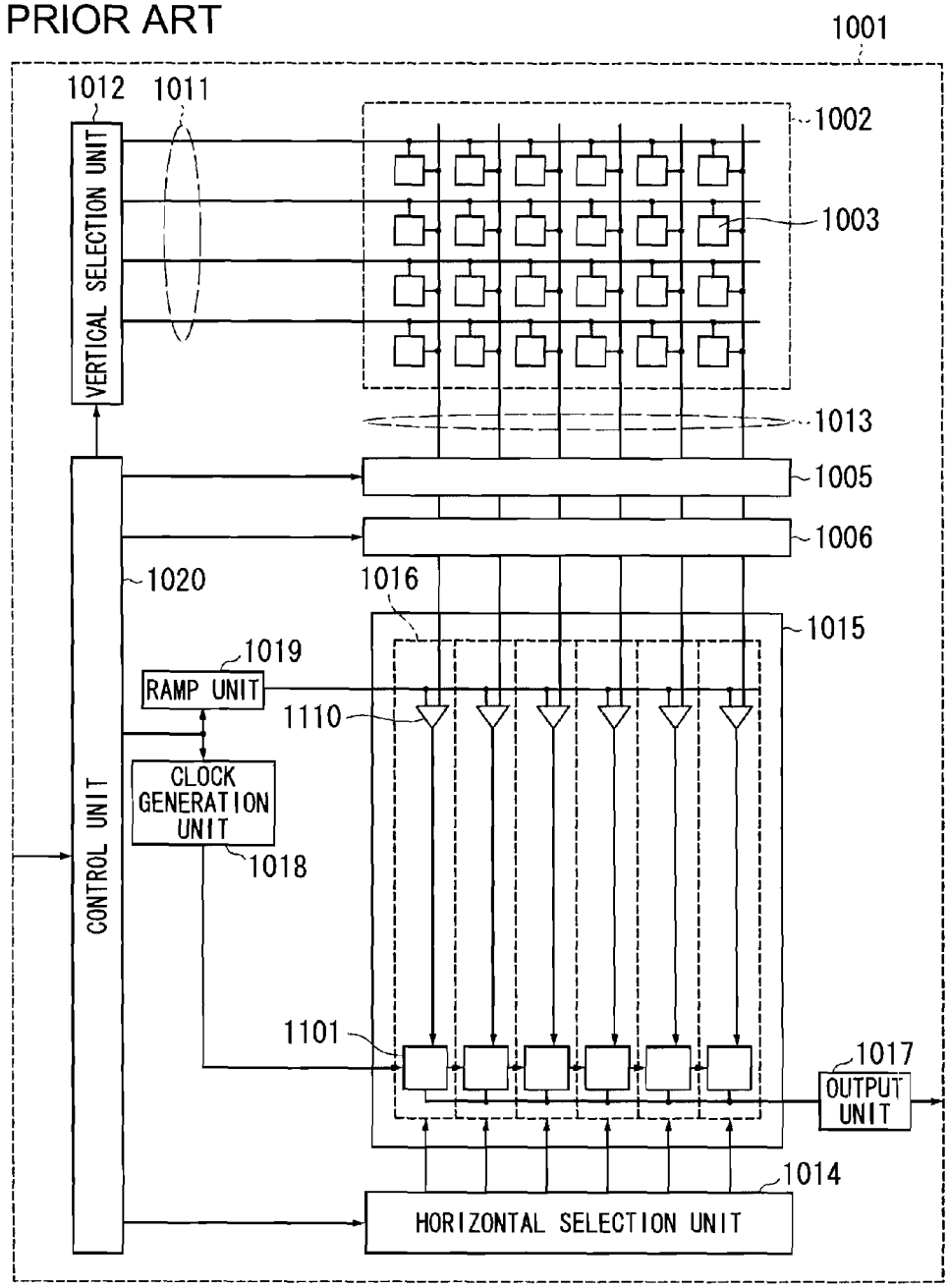
FIG. 23 is a block diagram illustrating the configuration of a conventional imaging device.

The clock generation unit 18 includes a VCO 100, which is a delay circuit to which a plurality of delay units (inversion elements) are connected. If the delay units constituting the VCO 100, for example, are connected in eight stages, the VCO 100 outputs eight-phase clocks CK0, CK1, CK2, CK3, CK4, CK5, CK6, and CK7. The signals output from the delay units constitute lower phase signals which will be described later. The delay circuit constituting the VCO 100 may also be a ring-like delay circuit having a configuration in which a plurality of inversion elements are connected to one another in a ring shape. In such a case, similarly to a symmetric oscillation circuit (for example, the ring-like delay circuit 201 illustrated in FIG. 21), the ring-like delay circuit itself includes an odd number of delay units, but preferably, the output thereof uses an even number (specifically, a power of 2) of asymmetric oscillation circuits. Moreover, the ring-like delay circuit itself may also use a ring delay line (RDL) circuit including an even number (specifically, a power of 2) of delay units, or the ring-like delay circuit itself may also use a full differential type oscillation circuit including an even number (specifically, a power of 2) of delay units, in which the output of final terminals of full differential type inversion circuits constituting the delay units is fed back to an opposite side of the input of initial terminals thereof.

The output unit 17 outputs binarized digital data. Furthermore, the output unit 17, for example, may also have a signal processing function such as black level adjustment, column variation correction, or color treatment, in addition to a buffering function. Moreover, the output unit 17 may convert n bit-parallel digital data to serial data and output the serial data.

The control unit 20 includes a functional block of a timing generator (TG) configured to supply clocks or predetermined timing pulse signals necessary for the operations of the ramp unit 19, the clock generation unit 18, the vertical selection unit 12, the horizontal selection unit 14, and the output unit 17, and a functional block configured to communicate with the TG.

Next, the configuration of the column A/D conversion section 16 will be described. Each column A/D conversion section 16 compares the analog pixel signal, which is read from each unit pixel 3 of the image capturing unit 2 through the vertical signal line 13, with the ramp wave for A/D conversion, which is supplied from the ramp unit 19, thereby generating a pulse signal having the amplitude (pulse width) in a time axis direction which corresponds to each amplitude of a reset level (a reference level) and a signal level. Then, A/D conversion is performed by converting data corresponding to a pulse width period of the pulse signal to digital data corresponding to the amplitude of the pixel signal.

Hereinafter, a detailed configuration of the column A/D conversion section 16 will be described. The column A/D conversion section 16 is provided to each column, and six column A/D conversion sections 16 are provided in FIG. 1. The column A/D conversion sections 16 of the columns have the same configuration. Each column A/D conversion section 16 includes the comparison unit 110, a latch unit 108, an arithmetic circuit 106, a lower counter 103, a switching unit 109, and an upper counter 101. Here, the lower counter 103 and the upper counter 101 are based on a binary counter circuit having a latch function configured to hold the logic state of each counter.

The comparison unit 110 compares a signal voltage corresponding to an analog pixel signal output from the unit pixel 3 of the image capturing unit 2 through the vertical signal line 13 with the ramp wave supplied from the ramp unit 19, thereby converting the amplitude of the pixel signal into information (a pulse width of a pulse signal) of the time axis direction. The comparison output of the comparison unit 110, for example, is at a High level (H level) when the ramp voltage is larger than the signal voltage, and is at a Low level (L level) when the ramp voltage is equal to or less than the signal voltage.

The latch unit 108 receives the comparison output of the comparison unit 110, and latches (holds/stores) the logic state (the lower phase signal) generated by the clock generation unit 18 at the inversion timing of the comparison output. The arithmetic circuit 106 generates a lower count signal serving as a counter clock of the lower counter 103 based on the lower phase signal latched by the latch unit 108. The lower counter 103 performs counting using the lower count signal as the counter clock. Accordingly, a lower count value constituting a lower bit of digital data is obtained.

The upper counter 101 performs counting using a clock signal (an upper count signal), which is input through the latch unit 108 after being output from the clock generation unit 18, as a counter clock (a first count clock). Furthermore, the upper counter 101 performs counting using the output signal of the lower counter 103 as a counter clock (a second count clock) based on carry digit or shift-down digit of the lower count value. Accordingly, an upper count value constituting an upper bit of digital data is obtained. The upper counter 101 of the present preferred embodiment has a data protection function configured to protect the upper count value at the time of count clock switching.

Here, the lower phase signal latched by the latch unit 108, for example, is 8-bit data. In such a case, the lower counter 103 is a 3-bit counter circuit. Furthermore, the upper counter 101, for example, is a 9-bit counter circuit. However, this is for illustrative purposes only. The present invention is not limited thereto.

Next, the operation of the present example will be described. Here, a basic operation of the unit pixel 3 will not be described. However, as is well-known in the art, a reset level and a signal level are output from the unit pixel 3.

The A/D conversion is performed as follows. For example, a ramp wave falling with a predetermined slope is compared with each voltage of a reset level or a signal level, which is a pixel signal from the unit pixel 3, and a period until each voltage of the reset level or the signal level coincides with the ramp wave (a ramp voltage) from the generation time point of a ramp wave to be used in a comparison process is counted by a clock (for example, the CK7) from the VCO100 output through the latch unit 108 and is measured in the logic states of multi-phase clocks (CK0 to CK7) having a constant phase difference, resulting in the achievement of digital data corresponding to each amplitude of the reset level or the signal level. Preferably, the number (8 in the present example) of clock signals from the VCO is a power of 2.

Here, a reset level including noise of a pixel signal is read from each unit pixel 3 of a selection row of the image capturing unit 2 as an analog pixel signal in the first read operation, and then a signal level is read in the second read operation. Next, the reset level and the signal level are input to the column A/D conversion section 16 through the vertical signal line 13 in time series. However, the signal level may be read in the first read operation and then the reset level may be read in the second read operation. Hereinafter, the first and second read operations and subsequent subtraction (a CDS process) will be described in detail. For the purpose of convenience, it is assumed that count modes of the upper counter 101 and the lower counter 103 are down-count modes and the upper counter 101 and the lower counter 103 perform counting at the falling edge timing of a count clock.

First Reading

The first reading from the unit pixel 3 of an arbitrary pixel row to the vertical signal line 13 is stabilized, and then the control unit 20 supplies control data for ramp wave generation to the ramp unit 19. After the control data is received, the ramp unit 19 outputs a ramp wave as a comparison voltage to be applied to the input terminals of the comparison units 110, wherein the waveform of the ramp wave temporally changes in a ramp form as a whole. The comparison unit 110 compares the ramp wave with the reset level. During this time, the upper counter 101 performs counting using a clock output from the VCO100 as a count clock. Preferably, the output start timing of the clock signal of the VCO100 and the output start timing of the ramp wave are approximately simultaneous. However, the present invention is not limited thereto.

The comparison unit 110 compares the ramp wave applied from the ramp unit 19 with the reset level, and inverts comparison output when both voltages approximately coincide with each other (at a first timing). At the first timing, the latch unit 108 holds the logic state of the VCO100 as the first lower phase signal. Furthermore, at the first timing, the upper counter 101 stops the count operation to hold the logic state as the first upper count value. If a predetermined period passes, the control unit 20 stops the supply of the control data to the ramp unit 19 and the output from the clock generation unit 18. Accordingly, the ramp unit 19 stops generating the ramp wave.

Next, the count clock input to the upper counter 101 is switched. The switched count clock is an output signal of a third bit which is the MSB of the lower counter 103. In order to prevent the occurrence of erroneous count, the operation mode of the upper counter 101 is changed to the data protection mode, and count clock switching is performed.

Then, the arithmetic circuit 106 generates a first lower count signal which is a clock signal corresponding to the first lower phase signal held by the latch unit 108, and outputs the first lower count signal to the lower counter 103. The lower counter 103 performs counting using the first lower count signal as a count clock. Accordingly, a first lower count value is obtained. While the lower counter 103 is performing the counting, the upper counter 101 performs counting according to shift-down digit in the lower counter 103.

Subsequently, values of bits constituting the first lower count value held by the lower counter 103 and the first upper count value held by the upper counter 101 are inverted. Then, the count clock input to the upper counter 101 is switched. The switched count clock is a clock which is output from the VCO100. In order to prevent the occurrence of erroneous count, the operation mode of the upper counter 101 is changed to the data protection mode, and count clock switching is performed.

Second Reading

Subsequently, at the time of second reading, a signal level corresponding to the amount of incident light of each unit pixel 3 is read, and an operation similar to that of the first reading is performed. The second reading from the unit pixel 3 of an arbitrary pixel row to the vertical signal line 13 is stabilized, and then the control unit 20 supplies control data for ramp wave generation to the ramp unit 19. After the control data is received, the ramp unit 19 outputs a ramp wave as a comparison voltage to be applied to the input terminals of the comparison units 110, wherein the waveform of the ramp wave temporally changes in a ramp form as a whole. The comparison unit 110 compares the ramp wave with the signal level. During this time, the upper counter 101 performs counting using a clock output from the VCO100 as a count clock. Preferably, the output start timing of the clock signal of the VCO100 and the output start timing of the ramp wave are approximately simultaneous. However, the present invention is not limited thereto.

The comparison unit 110 compares the ramp wave applied from the ramp unit 19 with the signal level, and inverts comparison output when both voltages approximately coincide with each other (at a second timing). At the second timing, the latch unit 108 holds the logic state of the VCO100 as the second lower phase signal. Furthermore, at the second timing, the upper counter 101 stops the count operation to hold the logic state as the second upper count value. Accordingly, an upper count value corresponding to the difference between the reset level and the signal level is obtained. If a predetermined period passes, the control unit 20 stops the supply of the control data to the ramp unit 19 and the output from the clock generation unit 18. Accordingly, the ramp unit 19 stops generating the ramp wave.

Next, the count clock input to the upper counter 101 is switched. The switched count clock is an output signal of the third bit of the lower counter 103. In order to prevent the occurrence of erroneous count, the operation mode of the upper counter 101 is changed to the data protection mode, and count clock switching is performed.

Then, the arithmetic circuit 106 generates a second lower count signal which is a clock signal corresponding to the second lower phase signal held by the latch unit 108, and outputs the second lower count signal to the lower counter 103. The lower counter 103 performs counting using the second lower count signal as a count clock.

Accordingly, a second lower count value, which is a lower count value corresponding to the difference between the reset level and the signal level, is obtained. While the lower counter 103 is performing the counting, the upper counter 101 performs counting according to shift-down digit in the lower counter 103.

In this way, the second lower count value and the second upper count value corresponding to the difference between the reset level and the signal level are obtained. Finally, values of bits constituting the second lower count value held by the lower counter 103 and the second upper count value held by the upper counter 101 are inverted, and digital data including the second lower count value and the second upper count value is transmitted to the output unit 17 by the horizontal selection unit 14 through the horizontal signal line.

Figure 2:
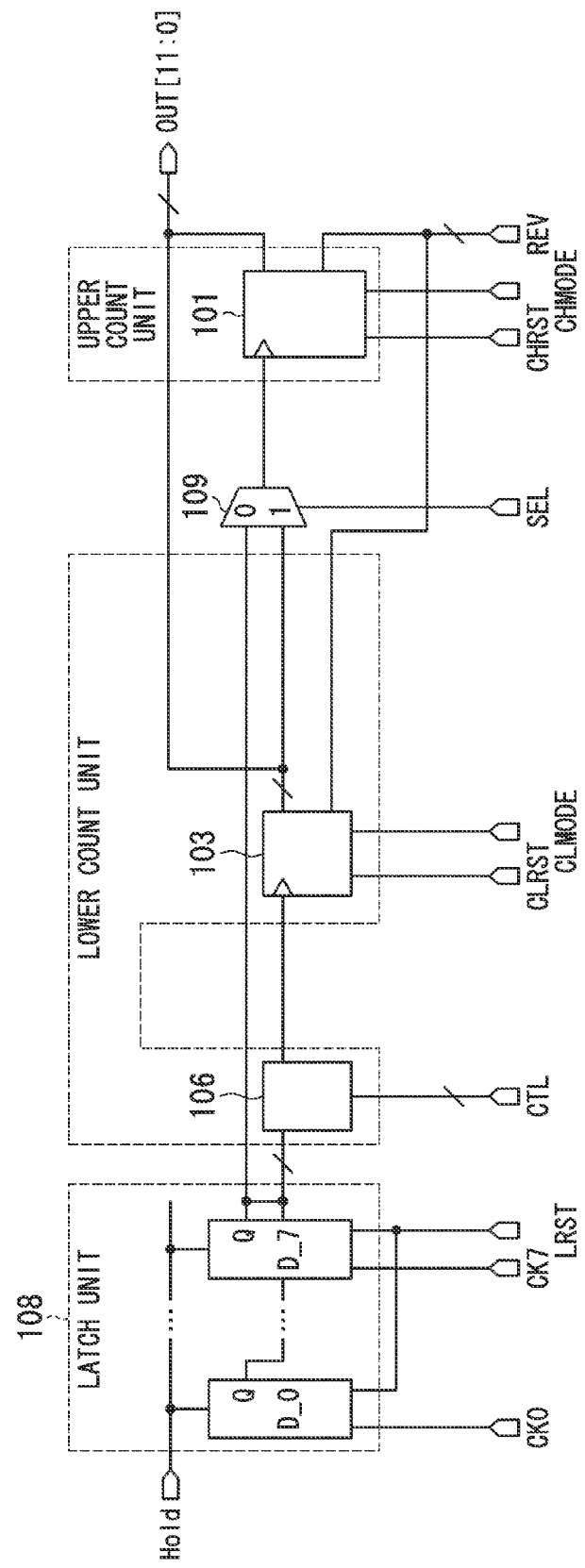
FIG. 2 is a block diagram illustrating a partial configuration of the column A/D conversion section in accordance with the first preferred embodiment of the present invention.

Next, details of each configuration of the column A/D conversion section 16 will be described. FIG. 2 is a block diagram illustrating a partial configuration of the column A/D conversion section in accordance with the first preferred embodiment of the present invention. FIG. 2 illustrates an example of a detailed configuration, from which the comparison units 110 are excluded and a unit of the elements of the column A/D conversion section 16 is extracted, in order to further describe the column A/D conversion section 16 of FIG. 1. Hereinafter, the configuration illustrated in FIG. 2 will be described. The configuration illustrated in FIG. 2 corresponds to the configuration of the column A/D conversion section 16 illustrated in FIG. 1, and is provided with the latch unit 108, the arithmetic circuit 106, the lower counter 103, the switching unit 109, and the upper counter 101. The arithmetic circuit 106 and the lower counter 103 constitute a lower count unit. The upper counter 101 constitutes an upper count unit. The ramp unit 19, the VCO100, and the comparison unit 110 of FIG. 1 and the configuration illustrated in FIG. 2 are an example of the A/D conversion circuit of the present invention.

The latch unit 108 includes latch circuits D_0 to D_7 configured to latch the logic states (lower phase signals) at a predetermined timing of the clock signals CK0 to CK7, which are output from the VCO100 including a delay unit, by a control signal Hold corresponding to the comparison output from the comparison unit 110. The logic states of the latch circuits D_0 to D_7 are reset by a control signal LRST. The lower phase signal latched by the latch unit 108 is output to the arithmetic circuit 106. Furthermore, the clock signal CK7 input to the latch circuit D_7 of the latch unit 108 is output to the switching unit 109 as a count clock to be used when the upper counter 101 performs counting.

The arithmetic circuit 106 generates a lower count signal based on the lower phase signal, which is output to the latch unit 108, by control signals CTL. The lower counter 103 and the upper counter 101 include binary counter circuits configured to perform counting in a down-count mode, respectively. The switching unit 109 switches the count clock, which is input to the upper counter 101, by a control signal SEL.

Control signals CLRST/CHRST, control signals CLMODE/CHMODE, and a control signal REV are input to the lower counter 103 and the upper counter 101. The control signals CLRST/CHRST are used to reset the lower count value and the upper count value of the lower counter 103 and the upper counter 101. The control signals CLMODE/CHMODE are used to switch the operations of the lower counter 103 and the upper counter 101 in the count mode and the data protection mode. The control signal REV is used to invert the lower count value and the upper count value of the lower counter 103 and the upper counter 101. In the present example, the counter circuit constituting the upper counter 101 may also be provided with a counter circuit for a flag for determining positive or negative. Details of the lower counter 103 and the upper counter 101 will be described with reference to FIG. 5.

Figure 7:
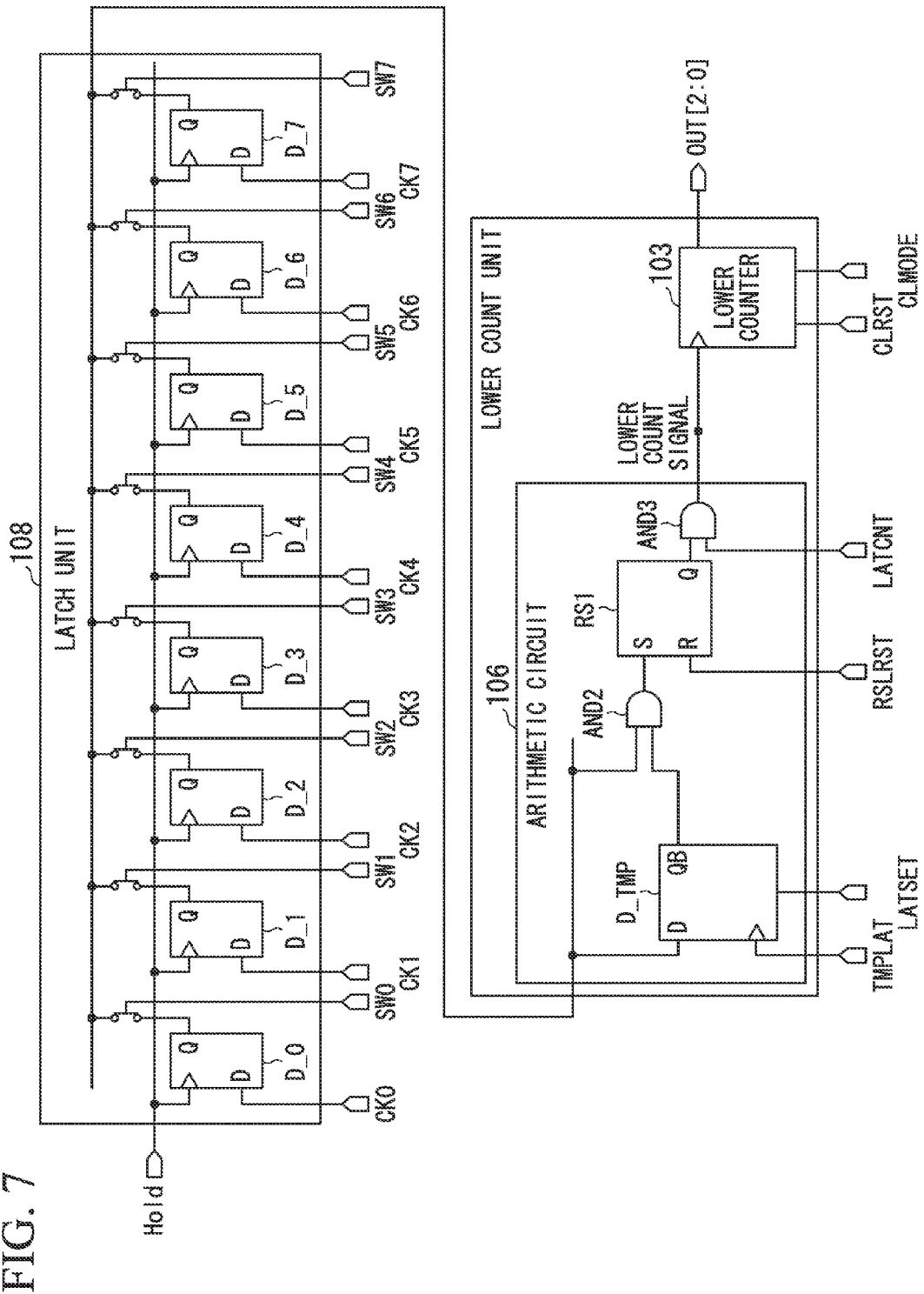
FIG. 7 is a block diagram illustrating an arithmetic circuit and a peripheral configuration thereof in accordance with the first preferred embodiment of the present invention.

When the lower count signal is generated from the lower phase signal, for example, it is preferable to generate the lower count signal by a logic arithmetic operation of a pulse and a reference clock based on a thermo code using the configuration as illustrated in FIG. 7. However, the present invention is not limited to such a configuration. Details of FIG. 7 will be described in detail later.

Next, the operation of the configuration illustrated in FIG. 2 will be described using a detailed example. In the present description, the case in which a 3-bit down-counter circuit is used as the lower counter 103 and a 9-bit down-counter circuit is used as the upper counter 101 will be described. The number of states of the lower phase signal based on 8 clock signals, which are output from the delay circuit, is 8 (states 0 to 7). When counting is performed in the down-count mode, for example, a count value is 3' b000 in the state 0 and a count value is 3' b001 in the state 7.

Expression of the count values will be described. "3' b" indicates a binary with a 3-bit count value. "000" indicates the output of the lower counter 103. Similar expressions are used for the count value of the upper counter 101.

Figure 3:
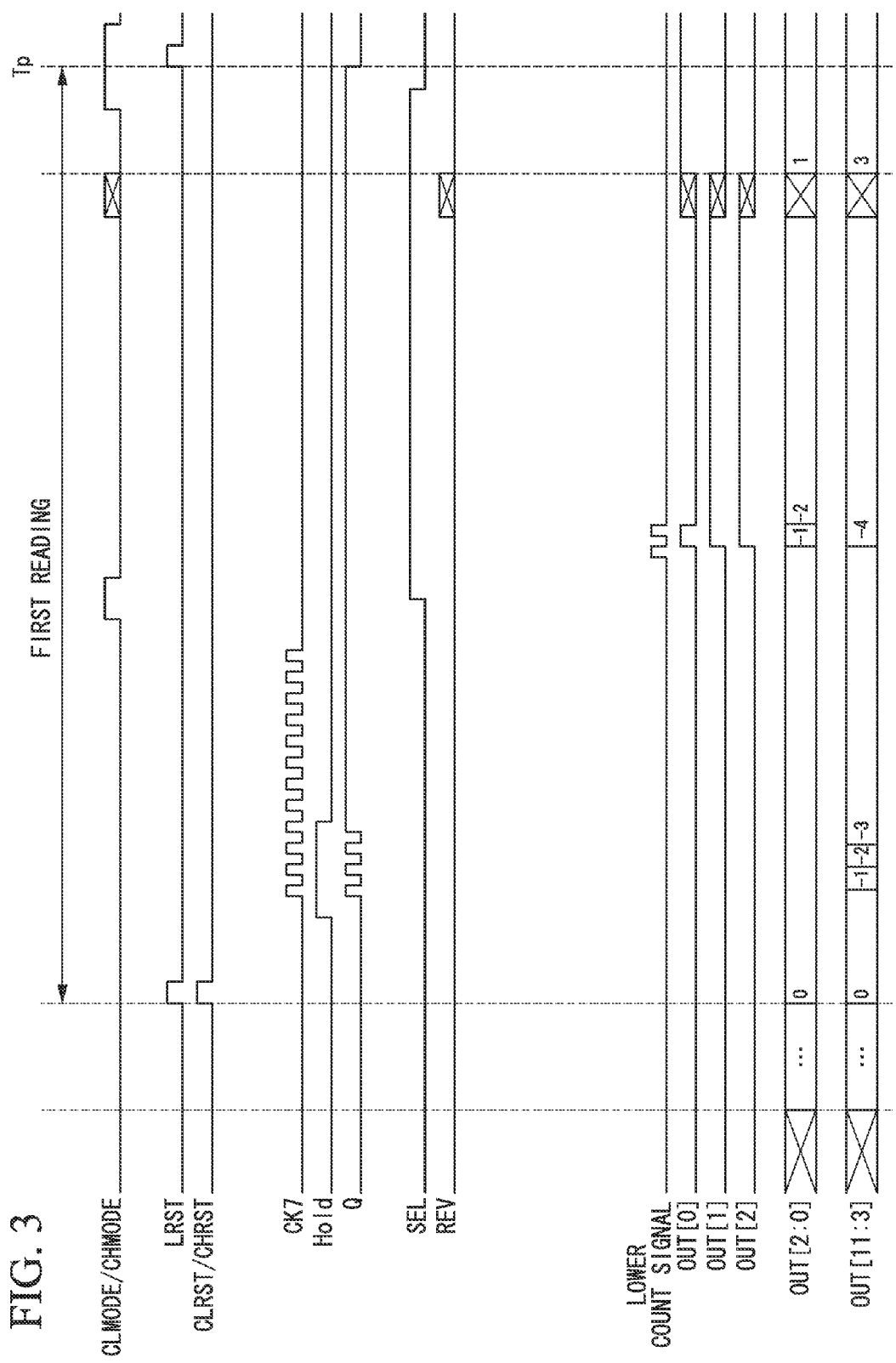
FIG. 3 is a timing chart illustrating the operation at the time of subtraction in accordance with the first preferred embodiment of the present invention.
Figure 4:
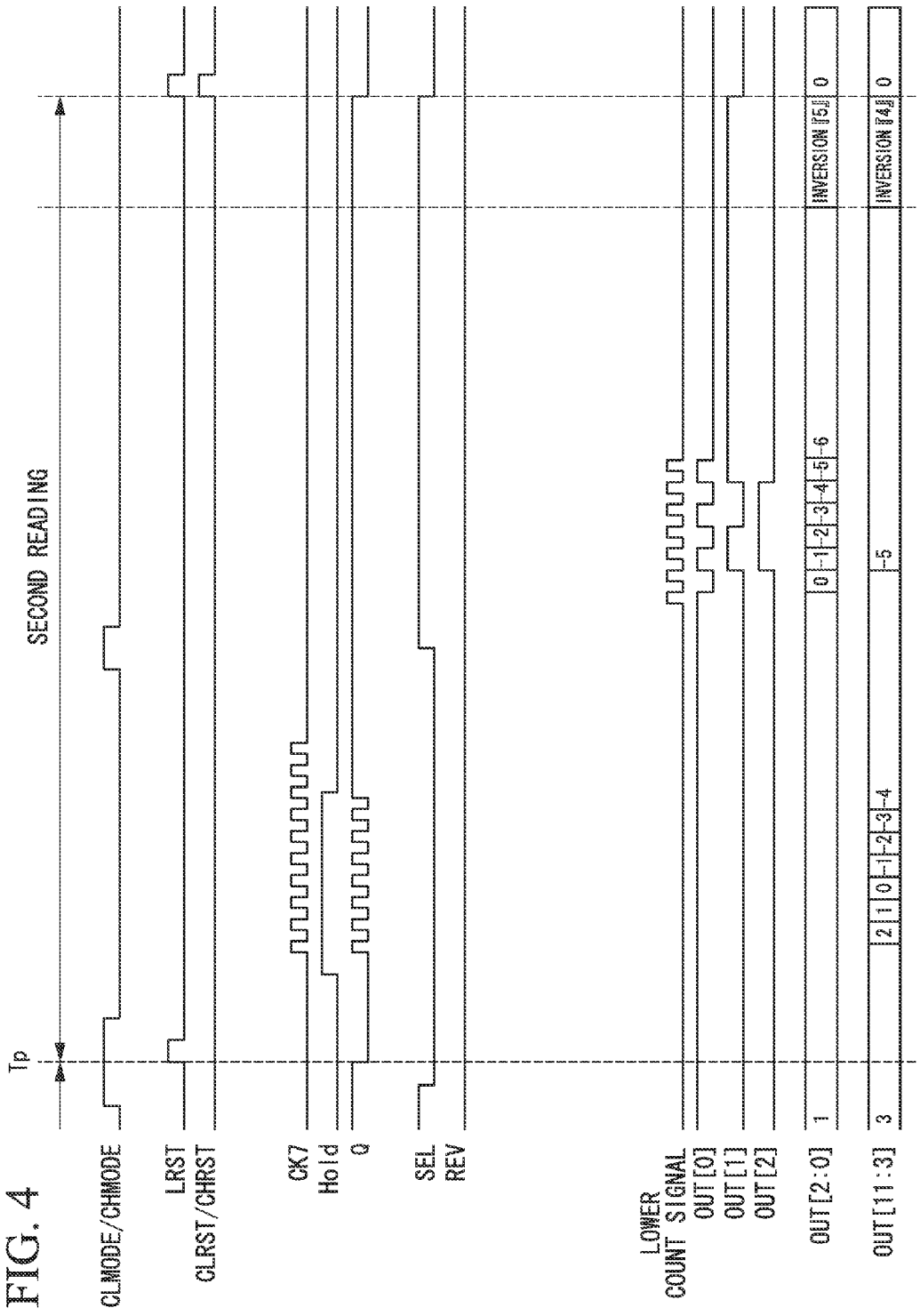
FIG. 4 is a timing chart illustrating the operation at the time of subtraction in accordance with the first preferred embodiment of the present invention.

Hereinafter, an example in which subtraction (a CDS process) of the first pixel signal and the second pixel signal subsequent to the first pixel signal is performed will be described. In the present example, binary subtraction using a complement of 2 is performed. FIG. 3 and FIG. 4 are timing charts illustrating the operation at the time of subtraction in accordance with the first preferred embodiment of the present invention. FIG. 3 and FIG. 4 illustrate the waveforms of signals. FIG. 3 illustrates the waveforms of signals at the time of the first reading and FIG. 4 illustrates the waveforms of signals at the time of the second reading. In FIG. 3 and FIG. 4, OUT[0], OUT[1], and OUT[2] indicate the output of the lower counter 103, OUT[2:0] indicates lower bits (from a $0^{th}$ bit to a second bit) constituting 12-bit digital data, and OUT[11:3] indicates upper bits (from a third bit to an eleventh bit) constituting digital data.

Here, it is assumed that a state corresponding to the lower phase signal of the first pixel signal is the state 2, an upper count value based on the first pixel signal is 3, a state corresponding to the lower phase signal of the second pixel signal is the state 7, and an upper count value based on the second pixel signal is 7. That is, the first pixel signal corresponds to 26 (=2+8 3), the second pixel signal corresponds to 63 (=7+8 7), and a value obtained by subtracting (a CDS process) the first pixel signal from the second pixel signal is 37.

First Reading

Initially, the control signals CLMODE/CHMODE enter an L state and the operation modes of the lower counter 103 and the upper counter 101 are set as the count modes. Next, the count values of the lower counter 103 and the upper counter 101 are reset by the control signals CLRST/CHRST. Simultaneously, the logic states of the latch circuits D_0 to D_7 are reset by the control signal LRST. Since the control signal SEL has been set as an L state, the count clock of the upper counter 101 is set as the output of the latch circuit D_7 of the latch unit 108. Accordingly, until a comparison process is completed, the clock signal CK7 is input to the upper counter 101 through the latch circuit D_7 and the switching unit 109, and the upper counter 101 performs counting using the clock signal CK7 as a count clock. At the time point at which the comparison process starts, a value held by the lower counter 103 is 3' b000 and a value held by the upper counter 101 is 9' b0000_0000_0. If these values are expressed in 12 bits, 12' b0000_0000_0000 is obtained.

At a first timing (the first timing related to the comparison of the ramp wave applied from the ramp unit 19 and the reset level in the above-mentioned operation) satisfying predetermined conditions, the control signal Hold is inverted, and the states of the clock signals CK0 to CK7, which are the logic state of the VCO100 at that time, are held (the first lower phase signal). Simultaneously, the upper counter 101 stops the count operation. At this time, a value held by the lower counter 103 is 3' b000 and a value held by the upper counter 101 is 9' b1111_1110_1 (corresponding to −3). If these values are expressed in 12 bits, 12' b1111_1110_1000 is obtained.

Next, the control signals CLMODE/CHMODE enter an H state. Accordingly, the operation modes of the lower counter 103 and the upper counter 101 are the data protection modes. Then, the control signal SEL is set as an H state. The count clock of the upper counter 101 at this time is the output signal of the third bit of the lower counter 103. In the present example, the inversion output of the third bit of the lower counter 103 is input to the upper counter 101. At this time, a value held by the lower counter 103 is 3' b000 and a value held by the upper counter 101 is 9' b1111_1110_1 (corresponding to −3). If these values are expressed in 12 bits, 12' b1111_1110_1000 is obtained.

Then, the control signals CLMODE/CHMODE enter an L state. Accordingly, the operation modes of the lower counter 103 and the upper counter 101 are the count modes. Then, a binarization process of the first lower phase signal is performed (the generation of a lower count signal will be described later with reference to FIG. 7 to FIG. 9). Through the binarization process of the first lower phase signal, a count clock is output from the arithmetic circuit 106 to the lower counter 103, so that the lower counter 103 performs counting.

At the timing at which the output of the third bit of the lower counter 103 changes from "0" to "1," the inversion output of the third bit of the lower counter 103 changes from "1" to "0," so that shift-down digit occurs in the count value of the lower counter 103. By the shift-down digit, 1 is subtracted from the count value of the upper counter 101. At the time point at which the binarization process of the first lower phase signal is completed, a value held by the lower counter 103 is 3' b110 (corresponding to −2) and a value held by the upper counter 101 is 9' b1111_1110_0 (corresponding to −4). If these values are expressed in 12 bits, 12' b1111_1110_0110 is obtained.

Then, the count values of the lower counter 103 and the upper counter 101 are inverted. At this time, a value held by the lower counter 103 is 3' b001 (corresponding to 1) and a value held by the upper counter 101 is 9' b0000_0001_1 (corresponding to 3). If these values are expressed in 12 bits, 12' b0000_0001_1001 is obtained. In binary subtraction, values are inverted and then 1 needs to be added. However, as will be described later, since a value is inverted even at the time of the second reading, a change in a value is offset due to the addition of 1 after each inversion. In this regard, in the present example, 1 is not added after a value is inverted. Detailed operations of the lower counter 103 and the upper counter 101 at the time of inversion will be described later with reference to FIG. 5 and FIG. 6.

Then, the control signals CLMODE/CHMODE enter an H state. Accordingly, the operation modes of the lower counter 103 and the upper counter 101 are the data protection modes. Then, the control signal SEL is set as an L state, and the count clock of the upper counter 101 is set as the output of the latch circuit D_7 of the latch unit 108. At this time, a value held by the lower counter 103 is 3' b001 (corresponding to 1) and a value held by the upper counter 101 is 9' b0000_0001_1 (corresponding to 3). If these values are expressed in 12 bits, 12' b0000_0001_1001 is obtained.

Second Reading

Then, the latch circuits D_0 to D_7 are reset by the control signal LRST. Here, the count values of the lower counter 103 and the upper counter 101 are not reset by the control signals CLRST/CHRST. Then, the control signals CLMODE/CHMODE enter an L state. Accordingly, the operation modes of the lower counter 103 and the upper counter 101 are set as the count modes. At this time, a value held by the lower counter 103 is 3' b001 (corresponding to 1) and a value held by the upper counter 101 is 9' b0000_0001_1 (corresponding to 3). If these values are expressed in 12 bits, 12' b0000_0001_1001 is obtained.

At a second timing (the second timing related to the comparison of the ramp wave applied from the ramp unit 19 and the signal level in the above-mentioned operation) satisfying predetermined conditions, the control signal Hold is inverted, and the states of the clock signals CK0 to CK7, which are the logic state of the VCO100 at that time, are held (the second lower phase signal). Simultaneously, the upper counter 101 stops the count operation. At this time, a value held by the lower counter 103 is 3' b001 (corresponding to 1) and a value held by the upper counter 101 is 9' b1111_1110_0 (corresponding to −4). If these values are expressed in 12 bits, 12' b1111_1110_0001 is obtained.

Next, the control signals CLMODE/CHMODE enter an H state. Accordingly, the operation modes of the lower counter 103 and the upper counter 101 are the data protection modes. Then, the control signal SEL is set as an H state. The count clock of the upper counter 101 at this time is the output signal of the third bit of the lower counter 103. In the present example, the inversion output of the third bit of the lower counter 103 is input to the upper counter 101. At this time, a value held by the lower counter 103 is 3' b001 (corresponding to 1) and a value held by the upper counter 101 is 9' b1111_1110_0 (corresponding to −4). If these values are expressed in 12 bits, 12' b1111_1110_0001 is obtained.

Then, the control signals CLMODE/CHMODE enter an L state. Accordingly, the operation modes of the lower counter 103 and the upper counter 101 are the count modes. Then, a binarization process of the second lower phase signal is performed (the generation of a lower count signal will be described later with reference to FIG. 7 to FIG. 9). Through the binarization process of the second lower phase signal, a count clock is output from the arithmetic circuit 106 to the lower counter 103, so that the lower counter 103 performs counting.

At the timing at which the output of the third bit of the lower counter 103 changes from "0" to "1," the inversion output of the third bit of the lower counter 103 changes from "1" to "0," so that shift-down digit occurs in the count value of the lower counter 103. By the shift-down digit, 1 is subtracted from the count value of the upper counter 101. At the time point at which the binarization process of the second lower phase signal is completed, a value held by the lower counter 103 is 3' b010 (corresponding to −6) and a value held by the upper counter 101 is 9' b1111_1101_1 (corresponding to −5). If these values are expressed in 12 bits, 12' b1111_1101_1010 is obtained.

As described above, since the count values of the lower counter 103 and the upper counter 101 are negative numbers, the count values of the lower counter 103 and the upper counter 101 are finally inverted (not illustrated in FIG. 4). At this time, a value held by the lower counter 103 is 3' b101 (corresponding to 5) and a value held by the upper counter 101 is 9' b0000_0010_0 (corresponding to 4). If these values are expressed in 12 bits, 12' b0000_0010_0101 (corresponding to 37) is obtained. In binary subtraction, values are inverted and then 1 needs to be added. However, as described above, since a value is inverted even in the first reading, a change in a value is offset due to the addition of 1 after each inversion. In this regard, in the present example, 1 is not added after a value is inverted.

Digital data including the second lower count value and the second upper count value is transmitted to the output unit 17 by the horizontal selection unit 14 through the horizontal signal line. The digital data at the time of the second reading may be inverted even after the digital data is transmitted to the output unit 17. Through the above operation, binary data corresponding to the difference between the first pixel signal and the second pixel signal is obtained.

Figure 5:
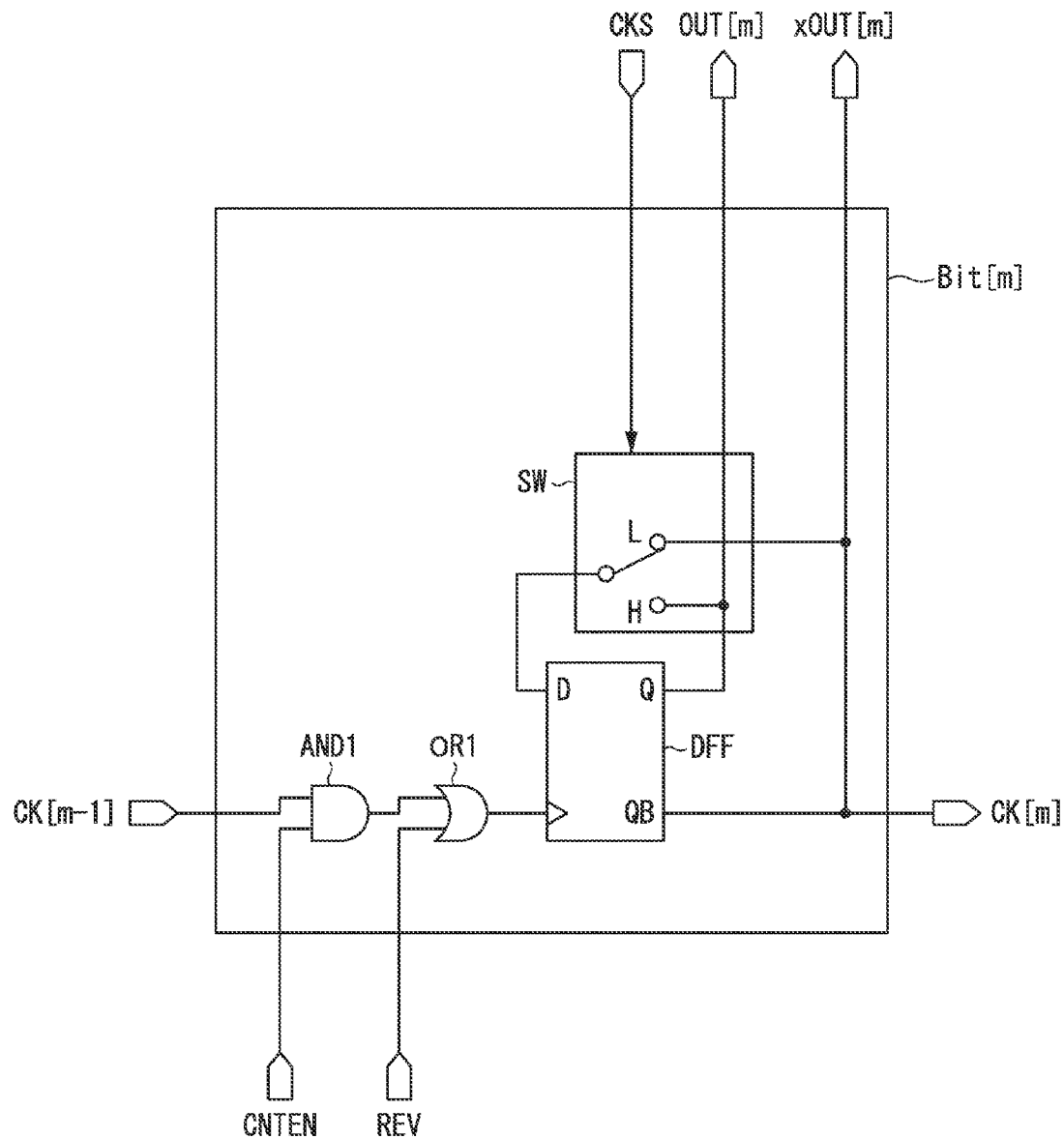
FIG. 5 is a circuit diagram illustrating the configuration of the binary counter circuit in accordance with the first preferred embodiment of the present invention.

Next, details of the binary counter circuit used in the lower counter 103 and the upper counter 101 will be described. FIG. 5 is a circuit diagram illustrating the configuration of the binary counter circuit in accordance with the first preferred embodiment of the present invention. FIG. 5 illustrates an example of the configuration of a counter circuit Bit[m] (m: 0 to n−1) of one bit which constitutes the lower counter 103 and the upper counter 101. The counter circuit Bit[m] illustrated in FIG. 5 includes a flip-flop circuit DFF, an AND circuit AND1, an OR circuit OR1, and a switching switch SW.

The flip-flop circuit DFF includes a D flip-flop. The AND circuit AND1 performs an AND operation on an output signal CK[m−1] of a counter circuit Bit[m−1] of a previous stage and a control signal CNTEN, thereby outputting a pulse for validating/invalidating a count clock. The OR circuit OR1 performs an OR operation on an output signal of the AND circuit AND1 and a control signal REV, thereby generating a pulse for inverting bits. The switching switch SW switches a connection state of an input terminal D and an output terminal Q and a connection state of the input terminal D and an inverted output terminal QB based on a control signal CKS (the control signals CLMODE/CHMODE of FIG. 2 to FIG. 4) in order to protect bit values. If n counter circuits Bit[m] are connected to one another, an n-bit counter circuit is obtained. Preferably, bits constituting the counter circuit have approximately the same configuration. However, the present invention is not limited thereto.

Figure 6:
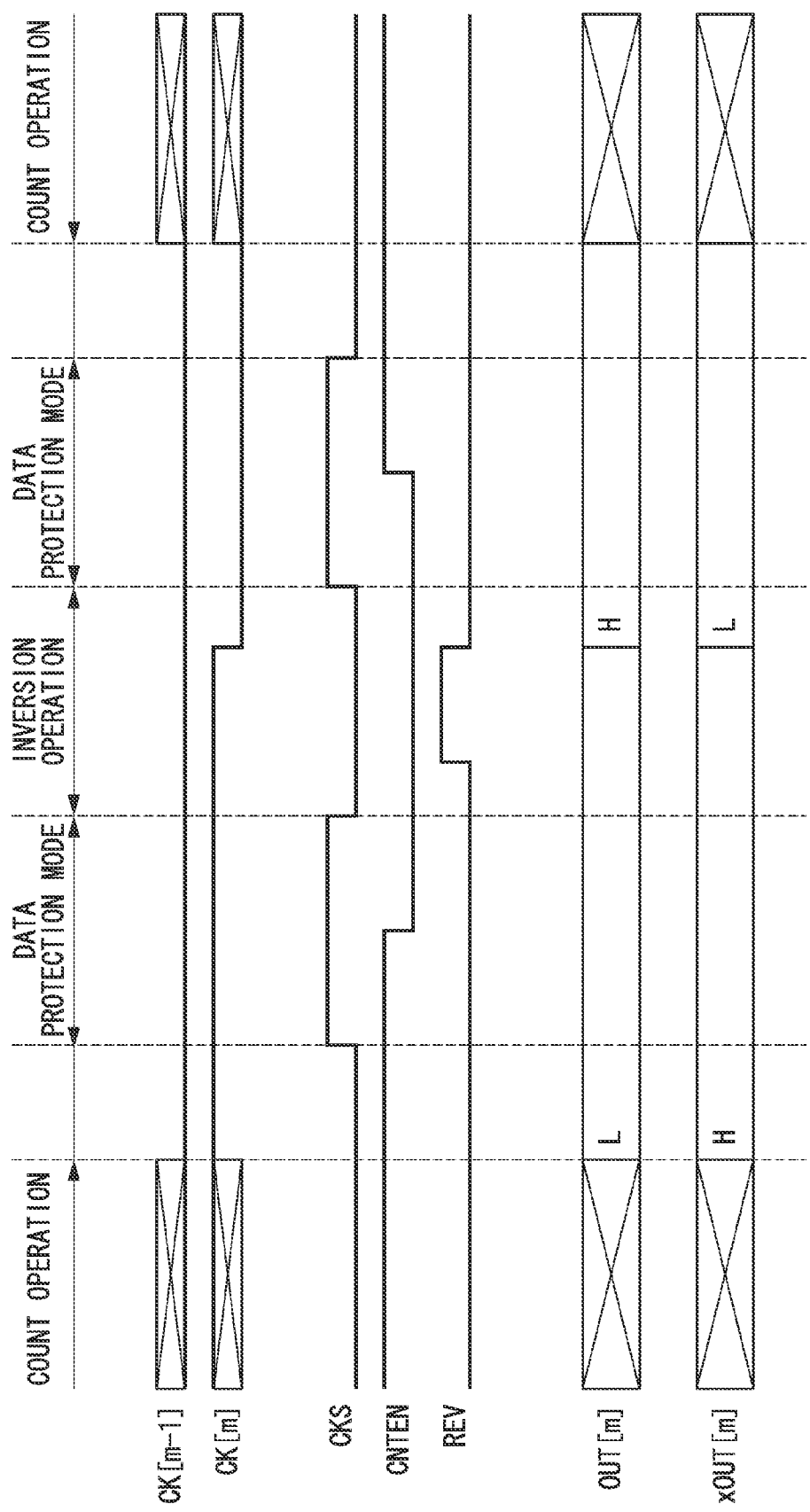
FIG. 6 is a timing chart illustrating the operation of the binary counter circuit in accordance with the first preferred embodiment of the present invention.

Next, the operation of the counter circuit Bit[m], specifically, a bit inversion operation, will be described. FIG. 6 is a timing chart illustrating the operation of the binary circuit in accordance with the first preferred embodiment of the present invention. FIG. 6 illustrates waveforms of signals according to the operation of the counter circuit Bit[m]. Specifically,

17

FIG. 6 illustrates waveforms of signals according to the operation based on the bit inversion operation. At the time of a count operation, the control signal CKS is in an L state, the control signal CNTEN is in an H state, and the control signal REV is in an L state.

After the count operation, the control signal CKS enters the H state. Accordingly, since the output terminal Q and the input terminal D of the counter circuit Bit[m] are connected to each other, the output of the counter circuit Bit[m] holds a constant state with no change, so that each bit value is protected. Then, the control signal CNTEN enters the L state, so that the input of a count clock is invalidated.

Then, the control signal CKS enters the L state, so that the inverted output terminal QB and the input terminal D of the counter circuit Bit[m] are connected to each other. Accordingly, the state of a signal input to the input terminal D is inverted. Then, the control signal REV changes from the L state to the H state, and further changes to the L state. At the time point at which the control signal REV changes from the H state to the L state, the flip-flop circuit DFF holds the signal input to the input terminal D, and outputs the signal from the output terminal Q. As described above, since the state of the signal input to the input terminal D at the time point at which the control signal CKS has entered the L state is inverted, the control signal REV changes from the H state to the L state, so that the output of the counter circuit Bit[m], that is, each bit value, is inverted.

Then, the control signal CKS enters the H state. Accordingly, since the output terminal Q and the input terminal D of the counter circuit Bit[m] are connected to each other, the output of the counter circuit Bit[m] holds a constant state with no change, so that each bit value is protected. Then, the control signal CNTEN enters the H state, so that the input of the count clock is validated. Finally, the control signal CKS enters the L state, so that the inverted output terminal QB and the input terminal D of the counter circuit Bit[m] are connected to each other. Through the above operation, it is possible to perform the count operation again by using a value obtained by inverting each bit value as an initial value. An operation of the data protection mode when the count clock input to the upper counter 101 is switched is similar to an operation of a period written as a "data protection mode" in FIG. 6.

Next, details of the arithmetic circuit 106 will be described. FIG. 7 is a block diagram illustrating an arithmetic circuit and a peripheral configuration thereof in accordance with the first preferred embodiment of the present invention. FIG. 7 illustrates an example of a detailed configuration including a peripheral configuration of the arithmetic circuit 106 in order to describe the generation of the lower count signal in the arithmetic circuit 106. In the configuration illustrated in FIG. 7, the latch unit 108 and the lower counter 103 have been described above. Hereinafter, the configuration of the arithmetic circuit 106 will be described.

As illustrated in FIG. 7, the arithmetic circuit 106 includes a latch circuit D_TMP, an AND circuit AND2, an RS latch RS1, and an AND circuit AND3. The latch circuit D_TMP temporarily holds the outputs of the latch circuits D_0 to D_7 in a predetermined order according to a pulse signal TMPLAT. Furthermore, the latch circuit D_TMP is reset by a control signal LATSET. The AND circuit AND2 performs an AND operation on any one of the outputs of the latch circuits D_0 to D_7 and the inverted output QB of the latch circuit D_TMP.

The RS latch RS1 receives the output of the AND circuit AND2 and a control signal RSLRST. After the RS latch RS1 is reset by the control signal RSLRST, the output Q of the RS latch RS1 changes from an L state to an H state when the output of the AND circuit AND2 changes from an L state to an H state, and is held in the H state, regardless of the output of the AND circuit AND2, until the RS latch RS1 is reset by the control signal RSLRST. The AND circuit AND3 performs an AND operation on the output of the RS latch RS1 and a count signal LATCNT (a reference clock).

18

Figure 8:
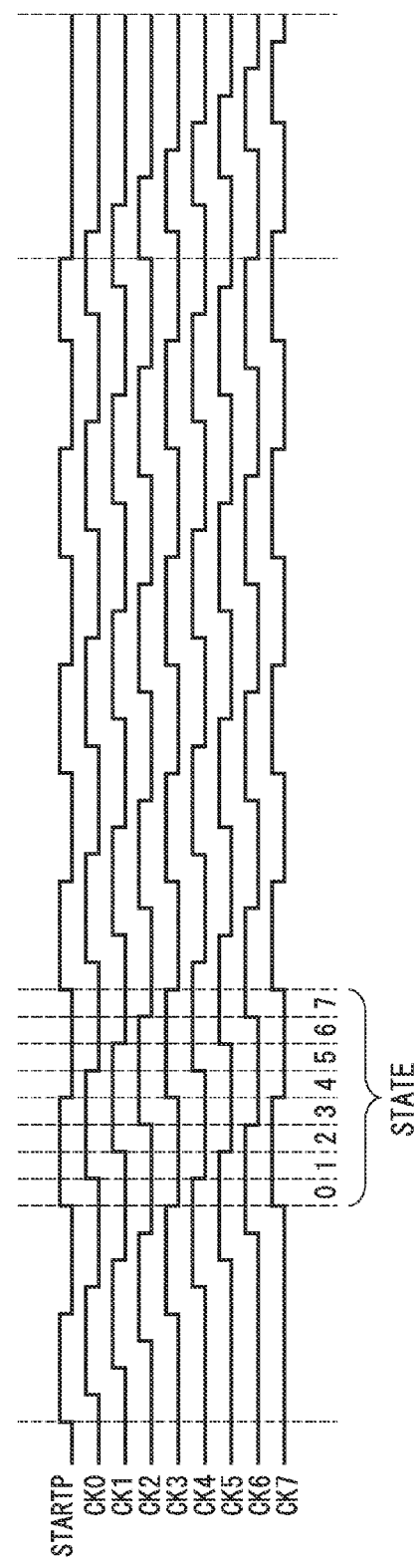
FIG. 8 is a timing chart illustrating the operation at the time of the generation of the lower count signal in accordance with the first preferred embodiment of the present invention.
Figure 9:
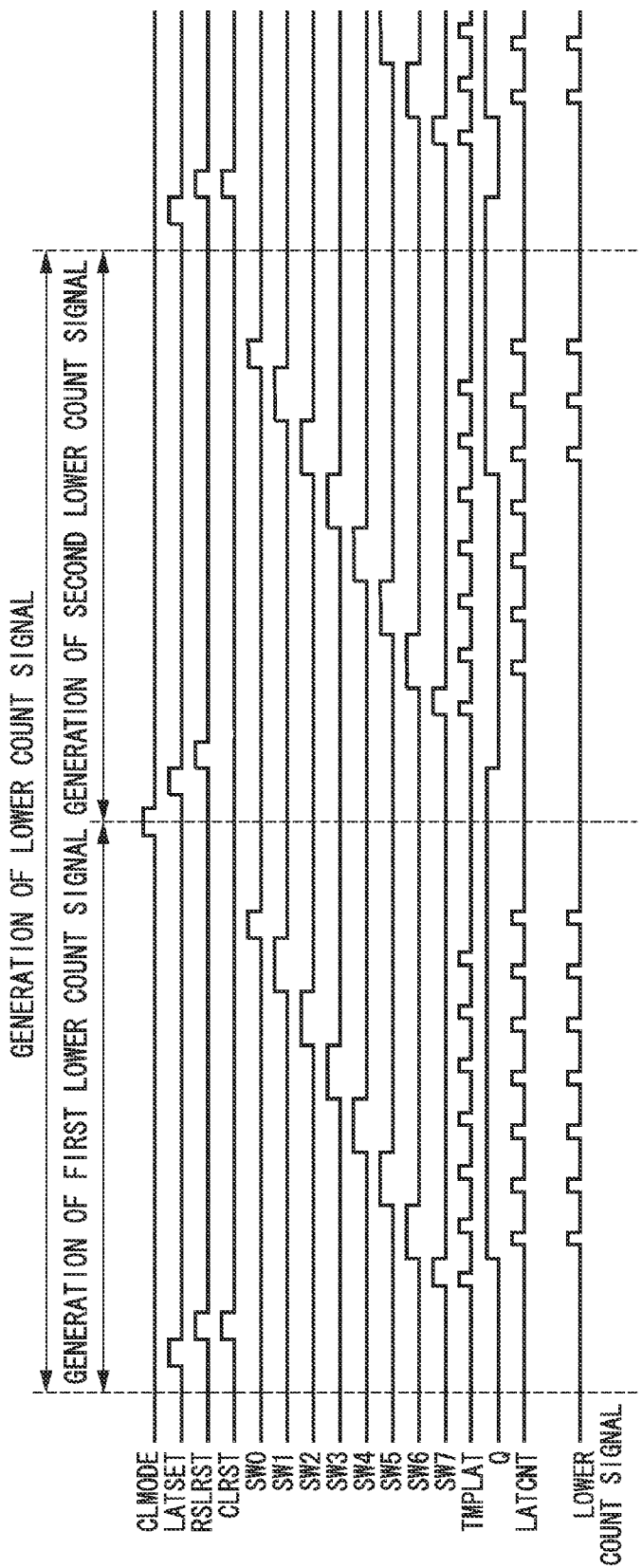
FIG. 9 is a timing chart illustrating the operation at the time of the generation of the lower count signal in accordance with the first preferred embodiment of the present invention.

Next, the operation of the arithmetic circuit 106 will be described. FIG. 8 and FIG. 9 are timing charts illustrating the operation at the time of the generation of the lower count signal in accordance with the first preferred embodiment of the present invention. FIG. 8 and FIG. 9 illustrate the operation at the time of the generation of the lower count signal. FIG. 8 illustrates the waveforms of the clock signals CK0 to CK7 output from the delay circuit. In FIG. 8, a pulse signal STARTP is a pulse signal input to the delay circuit. The states of the clock signals CK0 to CK7 correspond to any one of the state 0 to the state 7 illustrated in FIG. 8. The latch circuits D_0 to D_7 of the latch unit 108 latch the states (the lower phase signal) of the clock signals CK0 to CK7 by the control signal Hold. FIG. 9 illustrates waveforms of signals according to an operation for generating the lower count signal.

Hereinafter, a detailed example in which the first lower count signal is generated from the first lower phase signal and the second lower count signal is generated from the second lower phase signal will be described. Here, it is assumed that a state corresponding to the first lower phase signal is the state 7 and a state corresponding to the second lower phase signal is the state 3. In the case of the present example, the first lower count signal with seven pulses is generated from the first lower phase signal and the second lower count signal with three pulses is generated from the second lower phase signal. Each generated pulse is input as a count clock of the lower counter 103.

First, a schematic operation will be described. By control signals SW0 to SW7 and the pulse signal TMPLAT, pulses corresponding to the lower phase signal are generated, and a thermo code (an edge position changing from an H state to an L state in the case of the present example) is detected based on the pulses. When a result of an AND operation on the output Q of the latch circuit D_* (* is any one of 0 to 7) and the inverted output QB of the latch circuit D_TMP has entered an H state, the H state is input to the RS latch RS1, resulting in the detection of the thermo code. Furthermore, the pulses of the lower count signal are generated as a result of an AND operation on the output of the RS latch RS1 and the count signal LATCNT, and serve as the count clock of the lower counter 103.

Hereinafter, a detailed operation will be described. Since the detailed operation of the lower counter 103 has already been described, the operation of the lower counter 103 will not be described. At a first time point (corresponding to the first timing according to the comparison of the ramp wave applied from the ramp unit 19 and the reset level in the above-mentioned operation) satisfying predetermined conditions, the control signal Hold changes, so that the states of the clock signals CK0 to CK7 output from the delay circuit are held by the latch unit 108. At this time, the states held in the latch circuits D_0 to D_7 correspond to the first lower phase signal.

Since the control signal CLMODE is in an L state, the operation mode of the lower counter 103 is set as the count mode. Moreover, the latch circuit D_TMP is reset by the control signal LATSET, the count value of the lower counter 103 is reset by the control signal CLRST, and the RS latch RS1 is reset by the control signal RSLRST. The output Q of the RS latch RS1 at this time is in an L state.

Next, the control signals SW* (*: 0 to 7) are turned on in a predetermined order. If the control signal SW7 is turned on, a signal in an L state is output from the latch circuit D_7. By the pulse signal TMPLAT, the inverted output QB of the latch circuit D_TMP enters an L state when the latch circuit D_TMP has been reset by the control signal LATSET. By the output in the L state of the latch circuit D_TMP and the output in the L state of the latch circuit D_7, the output of the AND circuit AND2 enters an L state. Since the input S of the RS latch RS1 enters an L state, the output Q of the RS latch RS1 maintains the L state.

Next, if the control signal SW6 is turned on, a signal in an H state is output from the latch circuit D_6. By the pulse signal TMPLAT, the inverted output QB of the latch circuit D_TMP enters an H state based on the output (L) of the latch circuit D_7. By the output in the H state of the latch circuit D_TMP and the output in the H state of the latch circuit D_6, the output of the AND circuit AND2 enters an H state. Since the input S of the RS latch RS1 enters an H state, the output Q of the RS latch RS1 enters an H state. By the output Q of the RS latch RS1 and the count signal LATCNT, a count clock of one pulse is output from the AND circuit AND3.

Next, if the control signal SW5 is turned on, a signal in an H state is output from the latch circuit D_5. By the pulse signal TMPLAT, the inverted output QB of the latch circuit D_TMP enters an L state based on the output (H) of the latch circuit D_6. By the output in the L state of the latch circuit D_TMP and the output in the H state of the latch circuit D_6, the output of the AND circuit AND2 enters an L state. Since the input S of the RS latch RS1 enters an L state, but the control signal RSLRST input to the RS latch RS1 is in an L state, the output Q of the RS latch RS1 maintains the H state. By the output Q of the RS latch RS1 and the count signal LATCNT, a count clock of one pulse is output from the AND circuit AND3.

Then, the control signals SW4 to SW0 are sequentially turned on. However, since the input S of the RS latch RS1 maintains the L state, the output Q of the RS latch RS1 maintains the H state. Thus, when the control signals SW4 to SW0 have been sequentially turned on, a pulse of a count clock is output from the AND circuit AND3 by the output Q of the RS latch RS1 and the count signal LATCNT. Accordingly, the first lower count signal with 7 pulses in total serving as the count clock of the lower counter 103 is generated. In this way, the generation of the first lower count signal is completed.

At a second time point (corresponding to the second timing according to the comparison of the ramp wave applied from the ramp unit 19 and the signal level in the above-mentioned operation) satisfying predetermined conditions, the control signal Hold changes, so that the states of the clock signals CK0 to CK7 output from the delay circuit are held by the latch unit 108. At this time, the states held in the latch circuits D_0 to D_7 correspond to the second lower phase signal.

After the control signal CLMODE enters an H state and a value of each bit of the lower counter 103 is inverted, the control signal CLMODE enters an L state and the operation mode of the lower counter 103 is set as the count mode. Moreover, the latch circuit D_TMP is reset by the control signal LATSET and the RS latch RS1 is reset by the control signal RSLRST. Here, the lower counter 103 is not reset. The output Q of the RS latch RS1 at this time is in an L state.

Next, the control signals SW* (*: 0 to 7) are turned on in a predetermined order. If the control signal SW7 is turned on, a signal in an H state is output from the latch circuit D_7. By the pulse signal TMPLAT, the inverted output QB of the latch circuit D_TMP enters an L state when the latch circuit D_TMP has been reset by the control signal LATSET. By the output in the L state of the latch circuit D_TMP and the output in the H state of the latch circuit D_7, the output of the AND circuit AND2 enters an L state. Since the input S of the RS latch RS1 enters an L state, the output Q of the RS latch RS1 is maintained in the L state.

Next, if the control signal SW6 is turned on, a signal in an L state is output from the latch circuit D_6. By the pulse signal TMPLAT, the inverted output QB of the latch circuit D_TMP enters an L state based on the output (H) of the latch circuit D_7. By the output in the L state of the latch circuit D_TMP and the output in the L state of the latch circuit D_6, the output of the AND circuit AND2 enters an L state. Since the input S of the RS latch RS1 maintains the L state, the output Q of the RS latch RS1 maintains the L state. By the output Q of the RS latch RS1 and the count signal LATCNT, a pulse of a count clock is not output from the AND circuit AND3.

Then, the control signals SW5 to SW3 are sequentially turned on. However, since the input S of the RS latch RS1 maintains the L state, the output Q of the RS latch RS1 maintains the L state. Thus, when the control signals SW5 to SW3 have been sequentially turned on, a pulse of a count clock is not output from the AND circuit AND3 by the output Q of the RS latch RS1 and the count signal LATCNT.

Next, if the control signal SW2 is turned on, a signal in an H state is output from the latch circuit D_2. By the pulse signal TMPLAT, the inverted output QB of the latch circuit D_TMP enters an H state based on the output (L) of the latch circuit D_3. By the output in the H state of the latch circuit D_TMP and the output in the H state of the latch circuit D_2, the output of the AND circuit AND2 enters an H state. Since the input S of the RS latch RS1 enters an H state, the output Q of the RS latch RS1 enters an H state. By the output Q of the RS latch RS1 and the count signal LATCNT, a pulse of a count clock is output from the AND circuit AND3.

Then, the control signals SW1 and SW0 are sequentially turned on. However, since the input S of the RS latch RS1 maintains the L state, the output Q of the RS latch RS1 maintains the H state. Thus, when the control signals SW1 and SW0 have been sequentially turned on, a pulse of a count clock is output from the AND circuit AND3 by the output Q of the RS latch RS1 and the count signal LATCNT. Accordingly, the second lower count signal with 3 pulses in total serving as the count clock of the lower counter 103 is generated. In this way, the generation of the second lower count signal is completed. With the configuration illustrated in FIG. 7, the circuit that generates the lower count signal from the lower phase signal can be realized using a simple circuit configuration.

As described above, in accordance with the present preferred embodiment, the count value held by the upper counter 101 is protected at the time of count clock switching, so that it is possible to prevent the occurrence of erroneous count due to the count clock switching. Furthermore, since it is sufficient if the lower counter 103 and the upper counter 101 have only one type of count mode (a down-count mode in the present preferred embodiment), it is possible to realize the A/D conversion circuit using a simple circuit configuration.

Furthermore, the ring-like delay circuit, in which a plurality of delay elements are connected to one another in a ring shape, is used as a delay circuit, resulting in the improvement of accuracy of each phase of the lower phase signal. Furthermore, the A/D conversion circuit of the present preferred embodiment is applied to an image pick-up device, resulting in the achievement of a high quality image.

Second Preferred Embodiment

Next, a second preferred embodiment of the present invention will be described. The configuration of an image pick-up device in accordance with the present preferred embodiment is substantially identical to the configuration illustrated in FIG. 1, except for the column A/D conversion section 16. Therefore, the description will not be repeated here.

Figure 10:
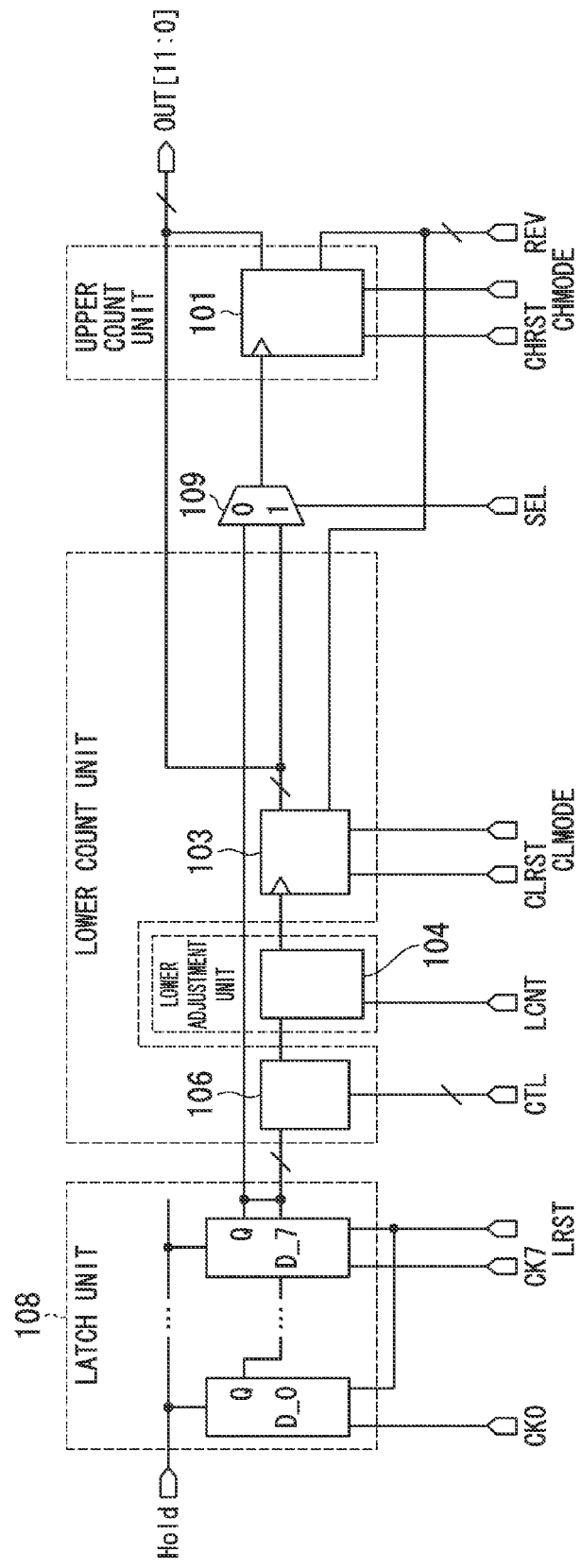
FIG. 10 is a block diagram illustrating a partial configuration of the column A/D conversion section in accordance with the second preferred embodiment of the present invention.

FIG. 10 is a block diagram illustrating a partial configuration of the column A/D conversion section in accordance with the second preferred embodiment of the present invention. FIG. 10 illustrates an example of a detailed configuration, from which the comparison units 110 are excluded and a unit of the elements of the column A/D conversion section 16 is extracted, in order to further describe the column A/D conversion section 16 of FIG. 1. Hereinafter, the configuration illustrated in FIG. 10 will be described. As illustrated in FIG. 10, the column A/D conversion section 16 is provided with the latch unit 108, the arithmetic circuit 106, a lower adjustment circuit 104, the lower counter 103, a switching unit 109, and the upper counter 101. Since a configuration other than the lower adjustment circuit 104, the lower counter 103, and the upper counter 101 is substantially identical to the configuration illustrated in FIG. 2, a description thereof will be omitted here.

The lower adjustment circuit 104 constitutes a lower adjustment unit. After a value held by the lower counter 103 is inverted, the lower adjustment circuit 104 generates an adjustment pulse for adjusting the value based on a control signal LCNT, and outputs the adjustment pulse to the lower counter 103. The lower counter 103 and the upper counter 101 include binary counter circuits that perform counting in an up-count mode, respectively. The ramp unit 19, the VCO100, and the comparison unit 110 of FIG. 1 and the configuration illustrated in FIG. 10 are an example of the A/D conversion circuit of the present invention.

Next, the operation of the present example will be described. Hereinafter, first and second read operations and subsequent subtraction (a CDS process) will be described in detail. For the purpose of convenience, it is assumed that count modes of the upper counter 101 and the lower counter 103 are up-count modes, and the upper counter 101 and the lower counter 103 perform counting at the falling edge timing of a count clock. Furthermore, an operation the same as the above-mentioned operation will not be described.

First Reading

The first reading from the unit pixel 3 of an arbitrary pixel row to the vertical signal line 13 is stabilized, and then the ramp unit 19 outputs a ramp wave. The comparison unit 110 compares the ramp wave with a reset level. During this time, the upper counter 101 performs counting using a clock output from the VCO100 as a count clock.

The comparison unit 110 compares the ramp wave applied from the ramp unit 19 with the reset level, and inverts comparison output when both voltages approximately coincide with each other (at a first timing). At the first timing, the latch unit 108 holds the logic state of the VCO100 as a first lower phase signal. Furthermore, at the first timing, the upper counter 101 stops the count operation to hold the logic state as a first upper count value. Next, the ramp unit 19 stops generating the ramp wave.

Next, the count clock input to the upper counter 101 is switched. The switched count clock is an output signal of a third bit of the lower counter 103. In order to prevent the occurrence of erroneous count, the operation mode of the upper counter 101 is changed to a data protection mode, and count clock switching is performed.

Then, the arithmetic circuit 106 generates a first lower count signal which is a clock signal corresponding to the first lower phase signal held by the latch unit 108, and outputs the first lower count signal to the lower counter 103. The lower counter 103 performs counting using the first lower count signal as a count clock. Accordingly, a first lower count value is obtained. While the lower counter 103 is performing the counting, the upper counter 101 performs counting according to carry digit in the lower counter 103.

Subsequently, values of bits constituting the first lower count value held by the lower counter 103 and a first upper count value held by the upper counter 101 are inverted. Next, the lower adjustment circuit 104 generates the adjustment pulse and output the adjustment pulse to the lower counter 103. The lower counter 103 performs counting using the adjustment pulse as a count clock. Then, the count clock input to the upper counter 101 is switched. The switched count clock is a clock which is output from the VCO100. In order to prevent the occurrence of erroneous count, the operation mode of the upper counter 101 is changed to the data protection mode, and count clock switching is performed.

Second Reading

Subsequently, at the time of second reading, a signal level corresponding to the amount of incident light of each unit pixel 3 is read, and an operation similar to that of the first reading is performed. The second reading from the unit pixel 3 of an arbitrary pixel row to the vertical signal line 13 is stabilized, and then the ramp unit 19 outputs a ramp wave. The comparison unit 110 compares the ramp wave with the signal level. During this time, the upper counter 101 performs counting using a clock output from the VCO100 as a count clock.

The comparison unit 110 compares the ramp wave applied from the ramp unit 19 with the signal level, and inverts comparison output when both voltages approximately coincide with each other (at a second timing). At the second timing, the latch unit 108 holds the logic state of the VCO100 as a second lower phase signal. Furthermore, at the second timing, the upper counter 101 stops the count operation to hold the logic state as a second upper count value. Accordingly, an upper count value corresponding to the difference between the reset level and the signal level is obtained. Then, the ramp unit 19 stops generating the ramp wave.

Next, the count clock input to the upper counter 101 is switched. The switched count clock is an output signal of the third bit of the lower counter 103. In order to prevent the occurrence of erroneous count, the operation mode of the upper counter 101 is changed to the data protection mode, and count clock switching is performed.

Then, the arithmetic circuit 106 generates a second lower count signal which is a clock signal corresponding to the second lower phase signal held by the latch unit 108, and outputs the second lower count signal to the lower counter 103. The lower counter 103 performs counting using the second lower count signal as a count clock.

Accordingly, a second lower count value, which is a lower count value corresponding to the difference between the reset level and the signal level, is obtained. While the lower counter 103 is performing the counting, the upper counter 101 performs counting according to carry digit in the lower counter 103.

In this way, the second lower count value and the second upper count value corresponding to the difference between the reset level and the signal level are obtained. Digital data including the second lower count value and the second upper count value is transmitted to the output unit 17 by the horizontal selection unit 14 through the horizontal signal line.

Next, the operation of the configuration illustrated in FIG. 10 will be described using a detailed example. In the present description, the case in which a 3-bit up-counter circuit is used as the lower counter 103 and a 9-bit up-counter circuit is used as the upper counter 101 will be described. In the following description, an operation the same as that of the configuration illustrated in FIG. 2 will not be described.

Figure 11:
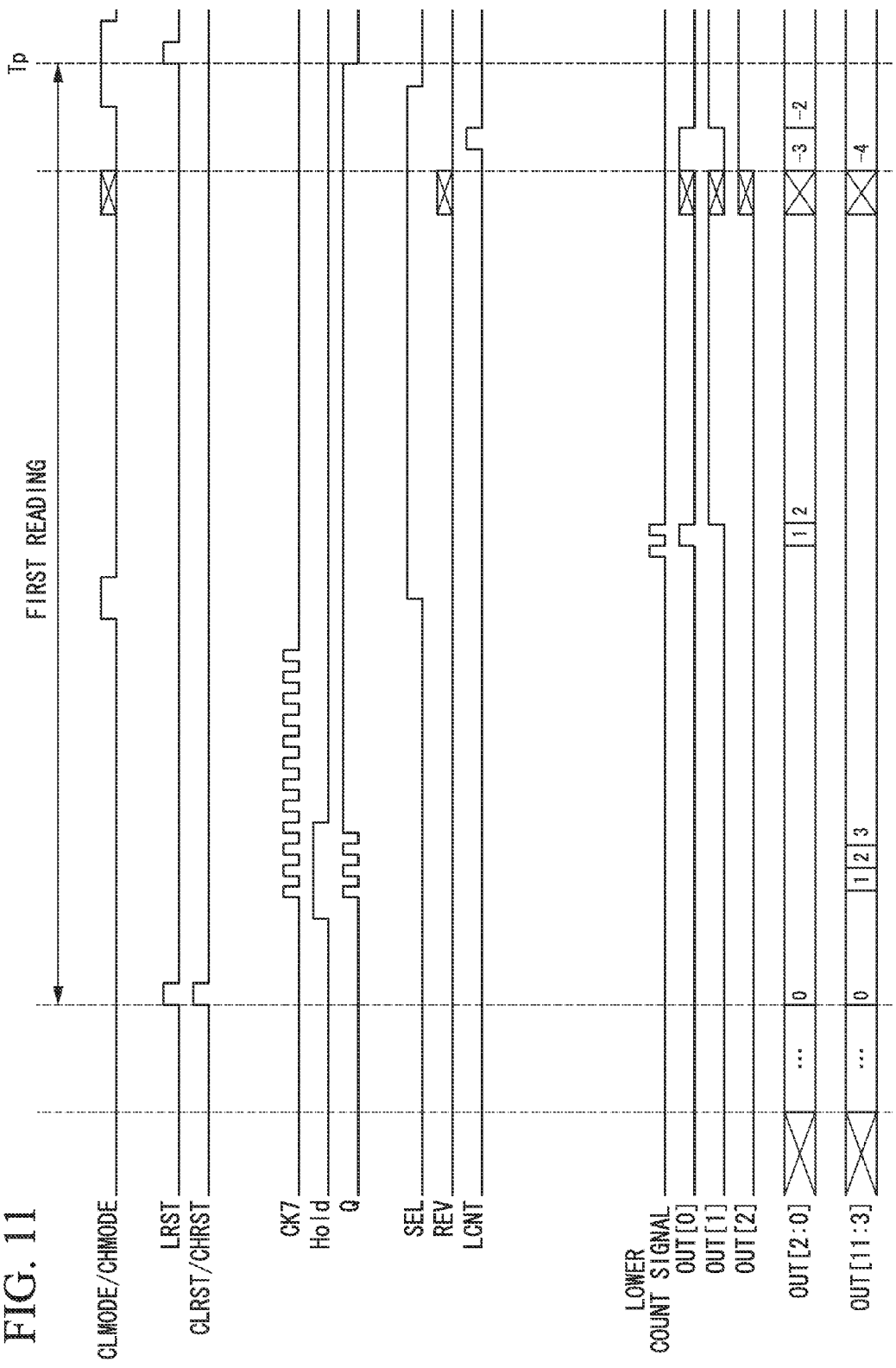
FIG. 11 is a timing chart illustrating the operation at the time of subtraction in accordance with the second preferred embodiment of the present invention.
Figure 12:
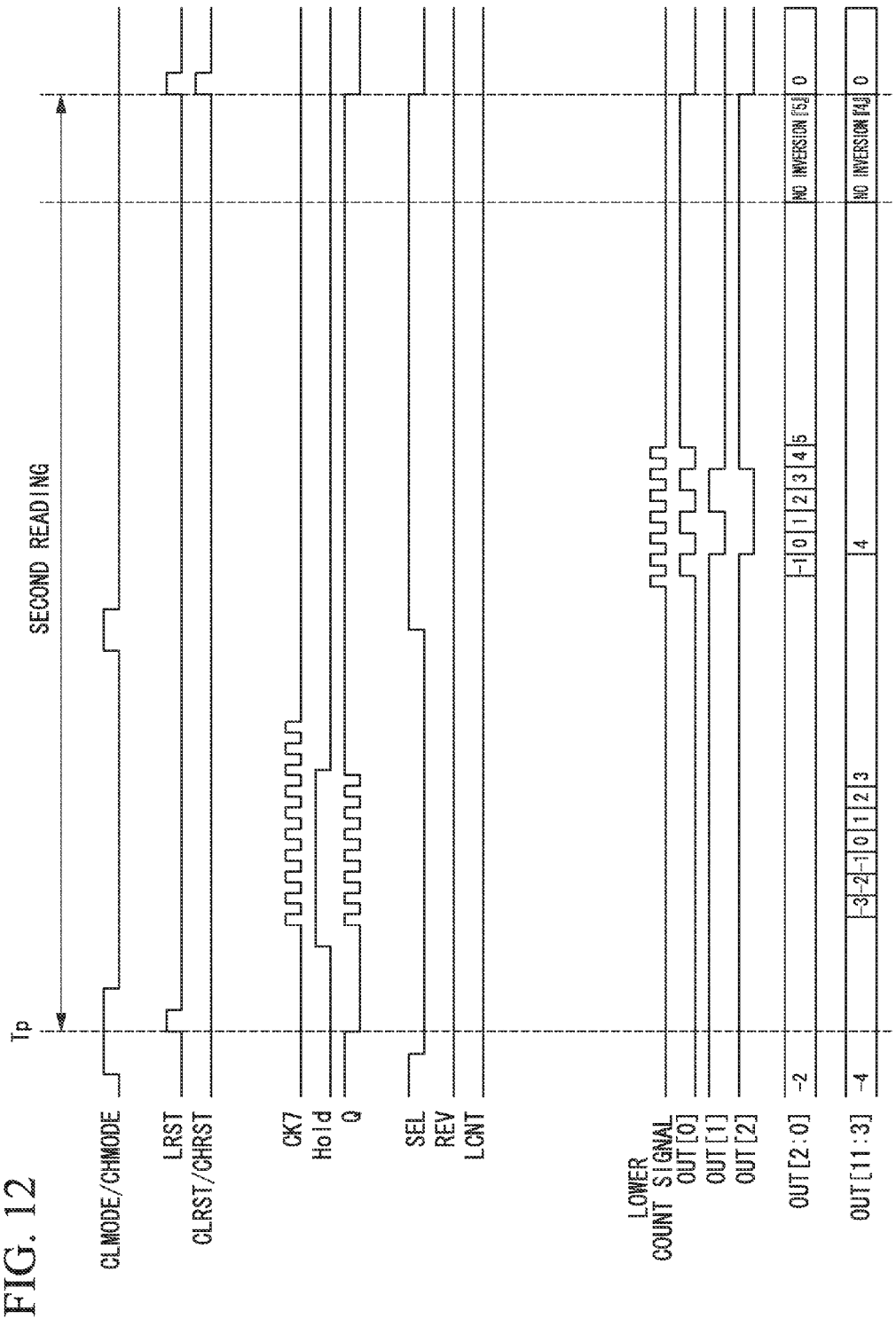
FIG. 12 is a timing chart illustrating the operation at the time of subtraction in accordance with the second preferred embodiment of the present invention.

Hereinafter, an example in which subtraction (a CDS process) of a first pixel signal and a second pixel signal subsequent to the first pixel signal is performed will be described. In the present example, binary subtraction using a complement of 2 is performed. FIG. 11 and FIG. 12 are timing charts illustrating the operation at the time of subtraction in accordance with the second preferred embodiment of the present invention. FIG. 11 and FIG. 12 illustrate the waveforms of signals. FIG. 11 illustrates the waveforms of signals at the time of the first reading and FIG. 12 illustrates the waveforms of signals at the time of the second reading.

Here, it is assumed that a state corresponding to the lower phase signal of the first pixel signal is the state 2, an upper count value based on the first pixel signal is 3, a state corresponding to the lower phase signal of the second pixel signal is the state 7, and an upper count value based on the second pixel signal is 7. That is, the first pixel signal corresponds to 26 (=2+8 3), the second pixel signal corresponds to 63 (=7+8 7), and a value obtained by subtracting (a CDS process) the first pixel signal from the second pixel signal is 37.

First Reading

Initially, the control signals CLMODE/CHMODE enter an L state and the operation modes of the lower counter 103 and the upper counter 101 are set as the count modes. Next, the count values of the lower counter 103 and the upper counter 101 are reset by the control signals CLRST/CHRST. Simultaneously, the logic states of the latch circuits D_0 to D_7 are reset by the control signal LRST. Since the control signal SEL has been set as an L state, the count clock of the upper counter 101 is set as the output of the latch circuit D_7 of the latch unit 108. Accordingly, until a comparison process is completed, the clock signal CK7 is input to the upper counter 101 through the latch circuit D_7 and the switching unit 109, and the upper counter 101 performs counting using the clock signal CK7 as a count clock. At the time point at which the comparison process starts, a value held by the lower counter 103 is 3' b000 and a value held by the upper counter 101 is 9' b0000_0000_0. If these values are expressed in 12 bits, 12' b0000_0000_0000 is obtained.

At a first timing (the first timing related to the comparison of the ramp wave applied from the ramp unit 19 and the reset level in the above-mentioned operation) satisfying predetermined conditions, the control signal Hold is inverted, and the states of the clock signals CK0 to CK7, which are the logic state of the VCO100 at that time, are held (the first lower phase signal). Simultaneously, the upper counter 101 stops the count operation. At this time, a value held by the lower counter 103 is 3' b000 and a value held by the upper counter 101 is 9' b0000_0001_1 (corresponding to 3). If these values are expressed in 12 bits, 12' b0000_0001_1000 is obtained.

Next, the control signals CLMODE/CHMODE enter an H state. Accordingly, the operation modes of the lower counter 103 and the upper counter 101 are the data protection modes. Then, the control signal SEL is set as an H state. The count clock of the upper counter 101 at this time is the output signal of the third bit of the lower counter 103. At this time, a value held by the lower counter 103 is 3' b000 and a value held by the upper counter 101 is 9' b0000_0001_1 (corresponding to 3). If these values are expressed in 12 bits, 12' b0000_0001_1000 is obtained.

Then, the control signals CLMODE/CHMODE enter an L state. Accordingly, the operation modes of the lower counter 103 and the upper counter 101 are the count modes. Then, a binarization process of the first lower phase signal is performed. Through the binarization process of the first lower phase signal, a count clock is output from the arithmetic circuit 106 to the lower counter 103, so that the lower counter 103 performs counting.

In the present example, since the carry digit does not occur in the counter value of the lower counter 103, the count value of the upper counter 101 does not change. At the time point at which the binarization process of the first lower phase signal is completed, a value held by the lower counter 103 is 3' b010 (corresponding to 2) and a value held by the upper counter 101 is 9' b0000_0001_1 (corresponding to 3). If these values are expressed in 12 bits, 12' b0000_0001_1010 is obtained.

Then, the count values of the lower counter 103 and the upper counter 101 are inverted. At this time, a value held by the lower counter 103 is 3' b101 (corresponding to −3) and a value held by the upper counter 101 is 9' b1111_1110_0 (corresponding to −4). If these values are expressed in 12 bits, 12' b1111_1110_0101 is obtained.

In binary subtraction, since values are inverted and then 1 needs to be added, the lower adjustment circuit 104 generates the adjustment pulse of one pulse based on the control signal LCNT, and outputs the adjustment pulse to the lower counter 103. The lower counter 103 performs counting using the adjustment pulse as a count clock. Through this counting, the count value of the lower counter 103 is incremented by 1. In the present example, since the output signal of the third bit of the lower counter 103 is input to the upper counter 101 and the lower counter 103 and the upper counter 101 operate as one counter circuit, it is sufficient if count value adjustment is performed only for the lower counter 103.

Then, the control signals CLMODE/CHMODE enter an H state. Accordingly, the operation modes of the lower counter 103 and the upper counter 101 are the data protection modes. Then, the control signal SEL is set as an L state, and the count clock of the upper counter 101 is set as the output of the latch circuit D_7 of the latch unit 108. At this time, a value held by the lower counter 103 is 3' b110 (corresponding to −2) and a value held by the upper counter 101 is 9' b1111_1110_0 (corresponding to −4). If these values are expressed in 12 bits, 12' b1111_1110_0110 is obtained.

Second Reading

Then, the latch circuits D_0 to D_7 are reset by the control signal LRST. Here, the count values of the lower counter 103 and the upper counter 101 are not reset by the control signals CLRST/CHRST. Then, the control signals CLMODE/CHMODE enter an L state. Accordingly, the operation modes of the lower counter 103 and the upper counter 101 are the count modes. At this time, a value held by the lower counter 103 is 3' b110 (corresponding to −2) and a value held by the upper counter 101 is 9' b1111_1110_0 (corresponding to −4). If these values are expressed in 12 bits, 12' b1111_1110_0110 is obtained.

At a second timing (the second timing related to the comparison of the ramp wave applied from the ramp unit 19 and the signal level in the above-mentioned operation) satisfying predetermined conditions, the control signal Hold is inverted, and the states of the clock signals CK0 to CK7, which are the logic state of the VCO100 at that time, are held (the second lower phase signal). Simultaneously, the upper counter 101 stops the count operation. At this time, a value held by the lower counter 103 is 3' b110 (corresponding to −2) and a value held by the upper counter 101 is 9' b0000_0001_1 (corresponding to 3). If these values are expressed in 12 bits, 12' b0000_0001_1110 is obtained.

Next, the control signals CLMODE/CHMODE enter an H state. Accordingly, the operation modes of the lower counter 103 and the upper counter 101 are the data protection modes. Then, the control signal SEL is set as an H state. The count clock of the upper counter 101 at this time is the output signal of the third bit of the lower counter 103. At this time, a value held by the lower counter 103 is 3' b110 (corresponding to −2) and a value held by the upper counter 101 is 9' b0000_0001_1 (corresponding to 3). If these values are expressed in 12 bits, 12' b0000_0001_1110 is obtained.

Then, the control signals CLMODE/CHMODE enter an L state. Accordingly, the operation modes of the lower counter 103 and the upper counter 101 are the count modes. Then, a binarization process of the second lower phase signal is performed. Through the binarization process of the second lower phase signal, a count clock is output from the arithmetic circuit 106 to the lower counter 103, so that the lower counter 103 performs counting.

At the timing at which the output of the third bit of the lower counter 103 changes from "1" to "0," carry digit occurs in the count value of the lower counter 103. By the carry digit, 1 is added to the count value of the upper counter 101. At the time point at which the binarization process of the second lower phase signal is completed, a value held by the lower counter 103 is 3' b101 (corresponding to 5) and a value held by the upper counter 101 is 9' b0000_0010_0 (corresponding to 4). If these values are expressed in 12 bits, 12' b0000_0010_0101 (corresponding to 37) is obtained.

Digital data including the second lower count value and the second upper count value is transmitted to the output unit 17 by the horizontal selection unit 14 through the horizontal signal line. Through the above operation, binary data corresponding to the difference between the first pixel signal and the second pixel signal is obtained.

As described above, in accordance with the present preferred embodiment, the count value held by the upper counter 101 is protected at the time of count clock switching, so that it is possible to prevent the occurrence of erroneous count due to the count clock switching. Furthermore, since it is sufficient if the lower counter 103 and the upper counter 101 have only one type of count mode (an up-count mode in the present preferred embodiment), it is possible to realize the A/D conversion circuit using a simple circuit configuration.

Furthermore, the lower adjustment circuit 104 outputs the adjustment pulse and the lower counter 103 performs counting using the adjustment pulse as a count pulse, so that it is possible to perform the binary subtraction in combination with the count value inversion performed immediately before the counting.

Third Preferred Embodiment

Next, a third preferred embodiment of the present invention will be described. The configuration of an image pick-up device in accordance with the present preferred embodiment is substantially identical to the configuration illustrated in FIG. 1, except for the column A/D conversion section 16. Therefore, the redundant description will not be repeated.

Figure 13:
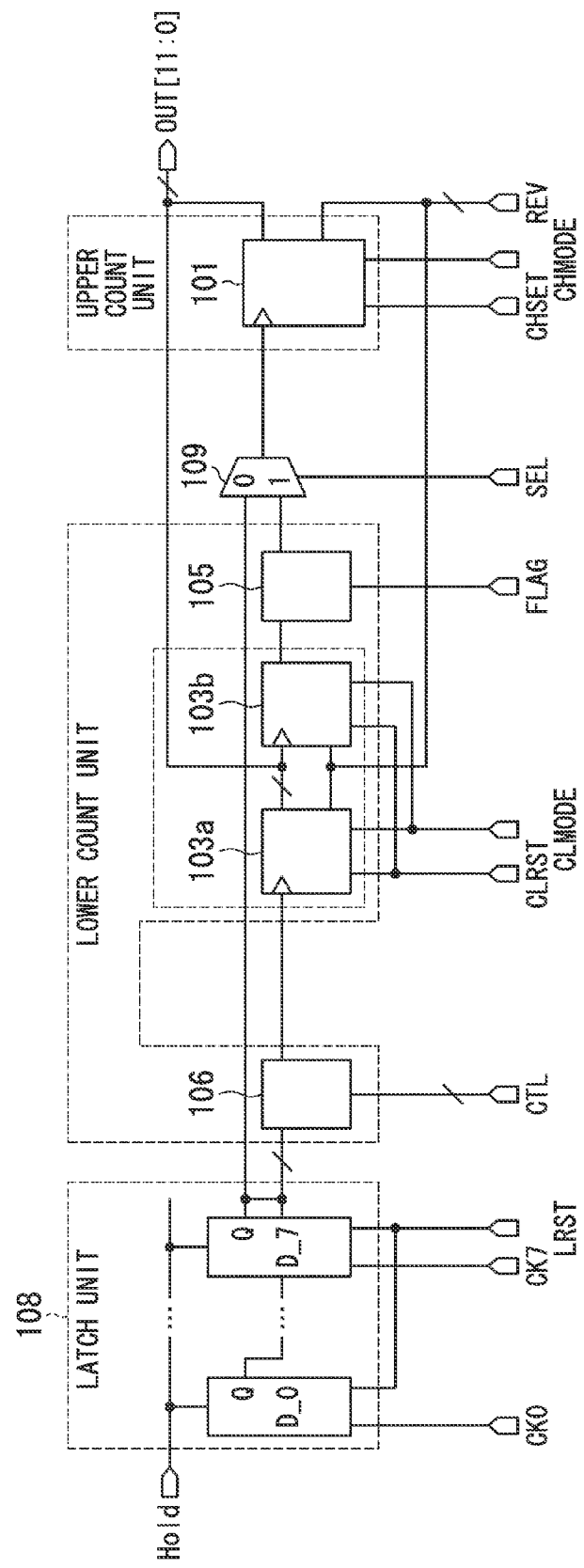
FIG. 13 is a block diagram illustrating a partial configuration of the column A/D conversion section in accordance with the third preferred embodiment of the present invention.

FIG. 13 is a block diagram illustrating a partial configuration of the column A/D conversion section in accordance with the third preferred embodiment of the present invention. FIG. 13 illustrates an example of a detailed configuration, from which the comparison units 110 are excluded and a unit of the elements of the column A/D conversion section 16 is extracted, in order to further describe the column A/D conversion section 16 of FIG. 1. Hereinafter, the configuration illustrated in FIG. 13 will be described. As illustrated in FIG. 13, the column A/D conversion section 16 is provided with the latch unit 108, the arithmetic circuit 106, lower counters 103a and 103b, a determination unit 105, the switching unit 109, and the upper counter 101. Since a configuration other than the lower counters 103a and 103b, the determination unit 105, and the upper counter 101 is substantially identical to the configuration illustrated in FIG. 2, description thereof will be omitted.

The lower counters 103a and 103b constitute a 4-bit binary counter circuit. The lower counter 103a counts count values of a first bit to a third bit and the lower counter 103b counts a count value of a fourth bit (a bit for a flag). The lower counter 103b is a counter for a flag which performs counting according to shift-down digit occurring when the lower counter 103a has performed counting. In the present example, the inverted output of the third bit of the lower counter 103a is input to the lower counter 103b. Furthermore, in the first preferred embodiment and the second preferred embodiment, a control signal CHRST for resetting a count value is input to the upper counter 101. However, in the present preferred embodiment, a control signal CHSET for setting a count value as a predetermined value is input to the upper counter 101. That is, the upper counter 101 of the present preferred embodiment has a data set function.

The determination unit 105 determines whether it is necessary to adjust an upper count value based on the output signal of the lower counter 103b in a period designated by a control signal FLAG. When it is determined that it is necessary to adjust the upper count value, the determination unit 105 outputs a count clock for subtracting the upper count value to the switching unit 109. The ramp unit 19, the VCO100, and the comparison unit 110 of FIG. 1 and the configuration illustrated in FIG. 13 are examples of the A/D conversion circuit of the present invention.

Next, the operation of the present example will be described. Hereinafter, first and second read operations and subsequent subtraction (a CDS process) will be described in detail. For the purpose of convenience, it is assumed that count modes of the upper counter 101 and the lower counters 103a and 103b are down-count modes, and the upper counter 101 and the lower counters 103a and 103b perform counting at the falling edge timing of a count clock. Furthermore, an operation the same as the above-mentioned operation will not be described. In the first preferred embodiment and the second preferred embodiment, the count clock switching is performed at the time of the first reading and at the time of the second reading. However, in the present preferred embodiment, the count clock is switched only at the time of the second reading.

First Reading

The first reading from the unit pixel 3 of an arbitrary pixel row to the vertical signal line 13 is stabilized, and then the ramp unit 19 outputs a ramp wave. The comparison unit 110 compares the ramp wave with a reset level. During this time, the upper counter 101 performs counting using a clock output from the VCO100 as a count clock.

The comparison unit 110 compares the ramp wave applied from the ramp unit 19 with the reset level, and inverts comparison output when both voltages approximately coincide with each other (at a first timing). At the first timing, the latch unit 108 holds the logic state of the VCO100 as a first lower phase signal. Furthermore, at the first timing, the upper counter 101 stops the count operation to hold the logic state as a first upper count value. Next, the ramp unit 19 stops generating the ramp wave.

Then, the arithmetic circuit 106 generates a first lower count signal which is a clock signal corresponding to the first lower phase signal held by the latch unit 108, and outputs the first lower count signal to the lower counter 103a. The lower counter 103a performs counting using the first lower count signal as a count clock and the lower counter 103b counts the output signal of the third bit of the lower counter 103a as a count clock. Accordingly, a first lower count value is obtained. Subsequently, values of bits constituting the first lower count value held by the lower counters 103a and 103b and a first upper count value held by the upper counter 101 are inverted.

Second Reading

Subsequently, at the time of second reading, a signal level corresponding to the amount of incident light of each unit pixel 3 is read, and an operation similar to that of the first reading is performed. The second reading from the unit pixel 3 of an arbitrary pixel row to the vertical signal line 13 is stabilized, and then the ramp unit 19 outputs a ramp wave. The comparison unit 110 compares the ramp wave with the signal level. During this time, the upper counter 101 performs counting using a clock output from the VCO 100 as a count clock.

The comparison unit 110 compares the ramp wave applied from the ramp unit 19 with the signal level, and inverts comparison output when both voltages approximately coincide with each other (at a second timing). At the second timing, the latch unit 108 holds the logic state of the VCO 100 as a second lower phase signal. Furthermore, at the second timing, the upper counter 101 stops the count operation to hold the logic state as a second upper count value. Accordingly, an upper count value corresponding to the difference between the reset level and the signal level is obtained. Then, the ramp unit 19 stops generating the ramp wave.

Then, the arithmetic circuit 106 generates a second lower count signal which is a clock signal corresponding to the second lower phase signal held by the latch unit 108, and outputs the second lower count signal to the lower counter 103a. The lower counter 103a performs counting using the second lower count signal as a count clock and the lower counter 103b performs counting using the output signal of the third bit of the lower counter 103a as a count clock. Accordingly, a second lower count value, which is a lower count value corresponding to the difference between the reset level and the signal level, is obtained.

Next, the count clock input to the upper counter 101 is switched. The switched count clock is the output signal of the determination unit 105 based on the output signal of the lower counter 103b. In order to prevent the occurrence of erroneous count, the operation mode of the upper counter 101 is changed to the data protection mode, and count clock switching is performed. The determination unit 105 outputs a count clock when the output signal of the lower counter 103b is in an H state, and does not output the count clock when the output signal of the lower counter 103b is in an L state. When the count clock is output from the determination unit 105, 1 is subtracted from the upper count value of the upper counter 101.

In this way, the second lower count value and the second upper count value corresponding to the difference between the reset level and the signal level are obtained. Finally, values of bits constituting the second lower count value held by the lower counters 103a and 103b and the second upper count value held by the upper counter 101 are inverted, and digital data including the second lower count value and the second upper count value is transmitted to the output unit 17 by the horizontal selection unit 14 through the horizontal signal line.

Next, the operation of the configuration illustrated in FIG. 13 will be described using a detailed example. In the present description, the case in which a 4-bit down-counter circuit is used as the lower counters 103a and 103b and a 9-bit down-counter circuit is used as the upper counter 101 will be described. In the following description, the output of the lower counters 103a and 103b, for example, is expressed by "[0]000." "[0]" denotes the output of the lower counter 103b and "000" denotes the output of the lower counter 103a. In the following description, an operation the same as that of the configuration illustrated in FIG. 2 will not be described.

Figure 14:
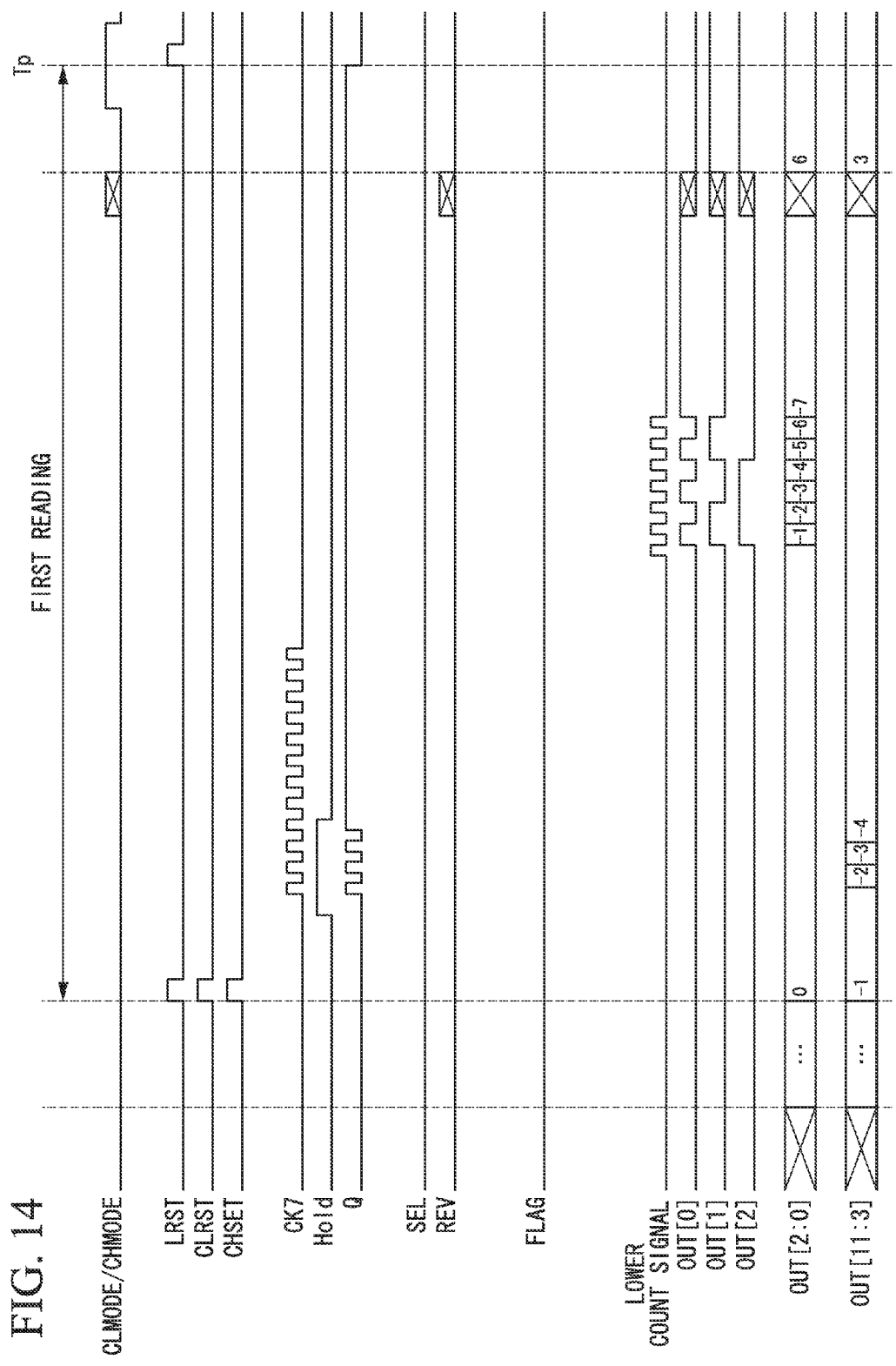
FIG. 14 is a timing chart illustrating the operation at the time of subtraction in accordance with the third preferred embodiment of the present invention.
Figure 15:
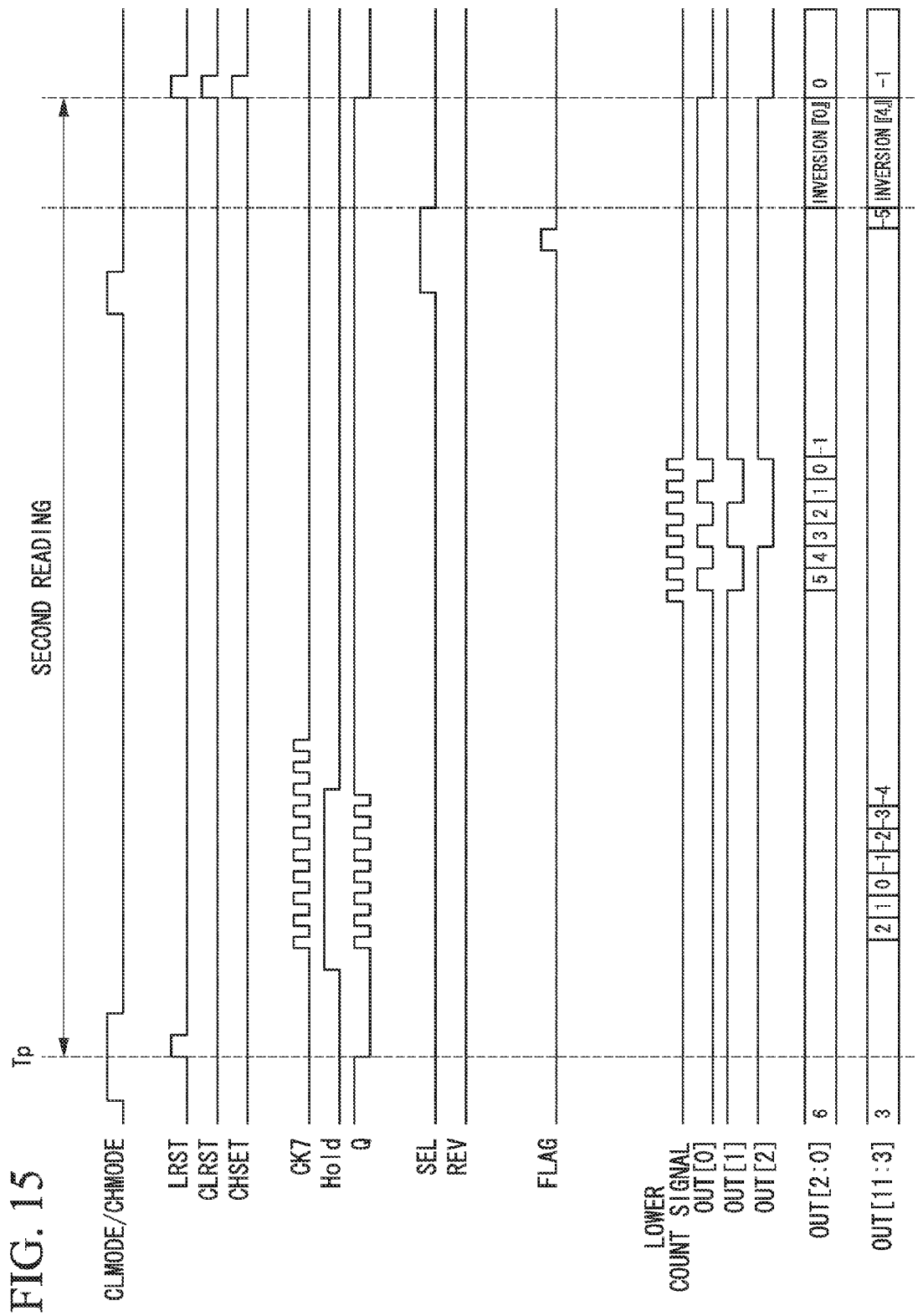
FIG. 15 is a timing chart illustrating the operation at the time of subtraction in accordance with the third preferred embodiment of the present invention.

Hereinafter, an example in which subtraction (a CDS process) of a first pixel signal and a second pixel signal subsequent to the first pixel signal is performed will be described. In the present example, binary subtraction using a complement of 2 is performed. FIG. 14 and FIG. 15 are timing charts illustrating the operation at the time of subtraction in accordance with the third preferred embodiment of the present invention. FIG. 14 and FIG. 15 illustrate the waveforms of signals. FIG. 14 illustrates the waveforms of signals at the time of the first reading and FIG. 15 illustrates the waveforms of signals at the time of the second reading.

Here, it is assumed that a state corresponding to the lower phase signal of the first pixel signal is the state 7, an upper count value based on the first pixel signal is 3, a state corresponding to the lower phase signal of the second pixel signal is the state 7, and an upper count value based on the second pixel signal is 7. That is, the first pixel signal corresponds to 31 (=7+8 3), the second pixel signal corresponds to 63 (=7+8 7), and a value obtained by subtracting (a CDS process) the first pixel signal from the second pixel signal is 32.

First Reading

Initially, the control signals CLMODE/CHMODE enter an L state and the operation modes of the lower counters 103a and 103b and the upper counter 101 are set as the count modes. Next, the count values of the lower counters 103a and 103b are reset by the control signal CLRST. Furthermore, the count value of the upper counter 101 is set as a predetermined value (9' b1111_1111_1 in this case) by the control signal CHSET. Simultaneously, the logic states of the latch circuits D_0 to D_7 are reset by the control signal LRST. Since the control signal SEL has been set as an L state, the count clock of the upper counter 101 is set as the output of the latch circuit D_7 of the latch unit 108. Accordingly, until a comparison process is completed, the clock signal CK7 is input to the upper counter 101 through the latch circuit D_7 and the switching unit 109, and the upper counter 101 performs counting using the clock signal CK7 as a count clock. At the time point at which the comparison process starts, values held by the lower counters 103a and 103b are 3' b[0]000 and a value held by the upper counter 101 is 9' b1111_1111_1 (corresponding to −1). If these values are expressed in 12 bits, 12' b1111_1111_1000 is obtained.

At a first timing (the first timing related to the comparison of the ramp wave applied from the ramp unit 19 and the reset level in the above-mentioned operation) satisfying predetermined conditions, the control signal Hold is inverted, and the states of the clock signals CK0 to CK7, which are the logic state of the VCO 100 at that time, are held (the first lower phase signal). Simultaneously, the upper counter 101 stops the count operation. At this time, values held by the lower counters 103a and 103b are 3' b[0]000 and a value held by the upper counter 101 is 9' b1111_1110_0 (corresponding to −4). If these values are expressed in 12 bits, 12' b1111_1110_0000 is obtained.

Next, a binarization process of the first lower phase signal is performed. Through the binarization process of the first lower phase signal, a count clock is output from the arithmetic circuit 106 to the lower counter 103a, so that the lower counter 103a performs counting. In the present example, the inverted output of the third bit of the lower counter 103a is input to the lower counter 103b. At the timing at which the output of the third bit of the lower counter 103a changes from "0" to "1," the inverted output of the third bit of the lower counter 103a changes from "1" to "0," and shift-down digit occurs in the count value of the lower counter 103a. By the shift-down digit, 1 is subtracted from the count value of the lower counter 103b. At the time point at which the binarization process of the first lower phase signal is completed, values held by the lower counters 103a and 103b are 3' b[1] 001 (corresponding to −7) and a value held by the upper counter 101 is 9' b1111_1110_0 (corresponding to −4). If these values are expressed in 12 bits, 12' b1111_1110_0001 is obtained.

Then, the count values of the lower counters 103a and 103b and the upper counter 101 are inverted. At this time, values held by the lower counters 103a and 103b are 3' b[0]110 (corresponding to 6) and a value held by the upper counter 101 is 9' b0000_0001_1 (corresponding to 3). If these values are expressed in 12 bits, 12' b0000_0001_1110 is obtained. In binary subtraction, values are inverted and then 1 needs to be added. However, as will be described later, since a value is inverted even at the time of the second reading, a change in the value is offset due to the addition of 1 after each inversion. In this regard, in the present example, 1 is not added after a value is inverted.

Then, the control signals CLMODE/CHMODE enter an H state. Accordingly, the operation modes of the lower counters 103a and 103b and the upper counter 101 are the data protection modes.

Second Reading

Then, the latch circuits D_0 to D_7 are reset by the control signal LRST. Here, the count values of the lower counters 103a and 103b are not set by the control signal CLRST and the count value of the upper counter 101 is not set by the control signal CHSET. Then, the control signals CLMODE/CHMODE enter an L state. Accordingly, the operation modes of the lower counters 103a and 103b and the upper counter 101 are set as the count modes. At this time, values held by the lower counters 103a and 103b are 3' b[0]110 (corresponding to 6) and a value held by the upper counter 101 is 9' b0000_0001_1 (corresponding to 3). If these values are expressed in 12 bits, 12' b0000_0001_1110 is obtained.

At a second timing (the second timing related to the comparison of the ramp wave applied from the ramp unit 19 and the signal level in the above-mentioned operation) satisfying predetermined conditions, the control signal Hold is inverted, and the states of the clock signals CK0 to CK7, which are the logic state of the VCO100 at that time, are held (the second lower phase signal). Simultaneously, the upper counter 101 stops the count operation. At this time, values held by the lower counters 103a and 103b are 3' b[0]110 (corresponding to 6) and a value held by the upper counter 101 is 9' b1111_1110_0 (corresponding to −4). If these values are expressed in 12 bits, 12' b1111_1110_0110 is obtained.

Then, a binarization process of the second lower phase signal is performed. Through the binarization process of the second lower phase signal, a count clock is output from the arithmetic circuit 106 to the lower counter 103a, so that the lower counter 103a performs counting. In the present example, the inverted output of the third bit of the lower counter 103a is input to the lower counter 103b. At the timing at which the output of the third bit of the lower counter 103a changes from "0" to "1," the inverted output of the third bit of the lower counter 103a changes from "1" to "0," and shift-down digit occurs in the count value of the lower counter 103a. By the shift-down digit, 1 is subtracted from the count value of the lower counter 103b. At the time point at which the binarization process of the second lower phase signal is completed, values held by the lower counters 103a and 103b are 3' b[1]111 (corresponding to −1) and a value held by the upper counter 101 is 9' b1111_1110_0 (corresponding to −4). If these values are expressed in 12 bits, 12' b1111_1110_0111 is obtained.

Next, determination by the determination unit 105 and subtraction of the upper count value are performed. The determination unit 105 outputs a count clock when the count value of the lower counter 103b is 1 and does not output the count clock when the count value of the lower counter 103b is 0. First, the control signals CLMODE/CHMODE enter an H state. Accordingly, the operation modes of the lower counters 103a and 103b and the upper counter 101 are the data protection modes. Then, the control signal SEL is set as an H state. The count clock of the upper counter 101 at this time is an output signal of the determination unit 105. At this time, values held by the lower counters 103a and 103b are 3' b[1] 111 (corresponding to −1) and a value held by the upper counter 101 is 9' b1111_1110_0 (corresponding to −4). If these values are expressed in 12 bits, 12' b1111_1110_0111 is obtained.

Then, the control signals CLMODE/CHMODE enter an L state, and the operation modes of the lower counters 103a and 103b and the upper counter 101 are set as the count modes. Since the count value of the lower counter 103b is 1, the determination unit 105 outputs the count clock. The upper counter 101 performs counting based on the count clock. Through this counting, the count value of the upper counter 101 is reduced by 1. At this time, values held by the lower counters 103a and 103b are 3' b[1]111 (corresponding to −1) and a value held by the upper counter 101 is 9' b1111_ 1101_1 (corresponding to −5). If these values are expressed in 12 bits, 12' b1111_1101_1111 is obtained.

As described above, since the count values of the lower counters 103a and 103b and the upper counter 101 are negative numbers, the count values of the lower counters 103a and 103b and the upper counter 101 are inverted (not illustrated in FIG. 15). At this time, values held by the lower counters 103a and 103b are 3' b[0]000 (corresponding to 0) and a value held by the upper counter 101 is 9' b0000_0010_0 (corresponding to 4). If these values are expressed in 12 bits, 12' b0000_ 0010_0000 (corresponding to 32) is obtained. In binary subtraction, values are inverted and then 1 needs to be added. However, as described above, since a value is inverted even in the first reading, a change in a value is offset due to the addition of 1 after each inversion. In this regard, in the present example, 1 is not added after a value is inverted.

Digital data including the second lower count value and the second upper count value is transmitted to the output unit 17 by the horizontal selection unit 14 through the horizontal signal line. Through the above operation, binary data corresponding to the difference between the first pixel signal and the second pixel signal is obtained.

Next, in the present example, the reason for initially setting the count value of the upper counter 101 as a predetermined value will be described. An operation in the case of initially resetting the count value of the upper counter 101 and performing counting is as follows. In the following description, similarly to the above description, it is assumed that a state corresponding to the lower phase signal of the first pixel signal is the state 7, an upper count value based on the first pixel signal is 3, a state corresponding to the lower phase signal of the second pixel signal is the state 7, and an upper count value based on the second pixel signal is 7. That is, the first pixel signal corresponds to 31 (=7+8 3), the second pixel signal corresponds to 63 (=7+8 7), and a value obtained by subtracting (a CDS process) the first pixel signal from the second pixel signal is 32. In the following description, the redundant description will not be repeated. Furthermore, the upper counter 101 will be described based on the assumption that the upper counter 101 has a reset function.

First Reading

An operation in the first reading is similar to the above operation. However, since the count value of the upper counter 101 is initially reset, the count value of the upper counter 101 is different from a count value in the above operation. At the time point at which the first reading is completed, values held by the lower counters 103a and 103b are 3' b[0]110 (corresponding to 6) and a value held by the upper counter 101 is 9' b0000_0001_0 (corresponding to 2). If these values are expressed in 12 bits, 12' b0000_0001_0110 is obtained.

Second Reading

In the second reading, an operation until the count clock input to the upper counter 101 is switched is similar to the above operation. However, since the count value of the upper counter 101 is initially reset, the count value of the upper counter 101 is different from a count value in the above operation. At the time point at which the count clock is switched, values held by the lower counters 103a and 103b are 3' b[1]111 (corresponding to −1) and a value held by the upper counter 101 is 9' b1111_1101_1 (corresponding to −5). If these values are expressed in 12 bits, 12' b1111_1101_1111 is obtained.

Then, it is necessary to adjust the upper count value according to the count value of the lower counter 103b. After the upper count value is adjusted, the lower count value and the upper count value are inverted. However, the lower count value after the inversion needs to be a positive number. In other words, the count value of the lower counter 103b after the inversion needs to be 0, that is, the count value of the lower counter 103b before the inversion needs to be 1. When the count value of the lower counter 103b after the inversion is 1, since it is necessary to subtract 1 from the count value of the upper counter 101, 1 needs to be added to the count value of the upper counter 101 when the count value of the lower counter 103b before the inversion is 0. Furthermore, when the count value of the lower counter 103b before the inversion is 1, it is not necessary to adjust the count value of the upper counter 101.

Accordingly, determination by the determination unit 105 and addition of the upper count value are performed. The determination unit 105 outputs a count clock for addition when the count value of the lower counter 103b is 0 and does not output the count clock when the count value of the lower counter 103b is 1.

In the case of the present example, since the count value of the lower counter 103b is 1, the determination unit 105 does not output the count clock. Therefore, even when the count clock of the upper counter 101 is switched to the output signal of the determination unit 105, the count value of the upper counter 101 does not change. At this time, values held by the lower counters 103a and 103b are 3' b[1]111 (corresponding to −1) and a value held by the upper counter 101 is 9' b1111_1101_1 (corresponding to −5). If these values are expressed in 12 bits, 12' b1111_1101_1111 is obtained.

Next, the count values of the lower counters 103a and 103b and the upper counter 101 are inverted. At this time, values held by the lower counters 103a and 103b are 3' b[0]000 (corresponding to 0) and a value held by the upper counter 101 is 9' b0000_0010_0 (corresponding to 4). If these values are expressed in 12 bits, 12' b0000_0010_0000 (corresponding to 32) is obtained. This result is the same as the above-mentioned result.

In the present example, the addition for adjusting the count value of the upper counter 101 is not performed. However, when it is necessary to adjust the count value of the upper counter 101, since the upper counter 101 performs counting in a down-count mode in the present example, it is not possible to perform the addition for adjusting the count value. Hereinafter, an example in which it is necessary to perform the addition for adjusting the count value of the upper counter 101 will be described.

In the following description, it is assumed that a state corresponding to the lower phase signal of the first pixel signal is the state 7, an upper count value based on the first pixel signal is 3, a state corresponding to the lower phase signal of the second pixel signal is the state 1, and an upper count value based on the second pixel signal is 7. That is, the first pixel signal corresponds to 31 (=7+8 3), the second pixel signal corresponds to 57 (=1+8 7), and a value obtained by subtracting (a CDS process) the first pixel signal from the second pixel signal is 26. Accordingly, a duplicate instruction will not be repeated here. Furthermore, the upper counter 101 will be described based on the assumption that the upper counter 101 has a reset function.

First Reading

An operation in the first reading is similar to the above operation. At the time point at which the first reading is completed, values held by the lower counters 103a and 103b are 3' b[0]110 (corresponding to 6) and a value held by the upper counter 101 is 9' b0000_0001_0 (corresponding to 2). If these values are expressed in 12 bits, 12' b0000_0001_0110 is obtained.

Second Reading

In the second reading, an operation until the count clock input to the upper counter 101 is switched is similar to the above operation. At the time point at which the count clock is switched, values held by the lower counters 103a and 103b are 3' b[0]101 (corresponding to 5) and a value held by the upper counter 101 is 9' b1111_1101_1 (corresponding to −5). If these values are expressed in 12 bits, 12' b1111_1101_1101 is obtained.

Then, it is necessary to adjust the upper count value according to the count value of the lower counter 103b. As described above, the determination unit 105 outputs a count clock for addition when the count value of the lower counter 103b is 0 and does not output the count clock when the count value of the lower counter 103b is 1.

In the case of the present example, since the count value of the lower counter 103b is 0, the determination unit 105 outputs the count clock. It is assumed that the upper counter 101 has performed addition based on the count clock. At this time, values held by the lower counters 103a and 103b are 3' b[0]101 (corresponding to 5) and a value held by the upper counter 101 is 9' b1111_1110_0 (corresponding to −4). If these values are expressed in 12 bits, 12' b1111_1110_0101 is obtained.

Next, the count values of the lower counters 103a and 103b and the upper counter 101 are inverted. At this time, values held by the lower counters 103a and 103b are 3' b[1]010 (a positive number corresponding to 2) and a value held by the upper counter 101 is 9' b0000_0001_1 (corresponding to 3). If these values are expressed in 12 bits, 12' b0000_0001_1010 (corresponding to 26) is obtained.

In the present example, it is assumed that the upper counter 101 performs the addition based on the count clock from the determination unit 105. However, actually, since the upper counter 101 performs counting in the down-count mode, it is not possible to perform the addition for adjusting the count value. Therefore, in the present preferred embodiment, an initial value of the count value of the upper counter 101 is set as a value obtained by subtracting 1 from the value at the time of reset.

As described above, when the count value of the lower counter 103b before the inversion in the second reading is 0, it is necessary to add 1 to the count value of the upper counter 101. When the count value of the lower counter 103b before the inversion is 1, it is not necessary to adjust the count value of the upper counter 101. Meanwhile, when the initial value of the count value of the upper counter 101 is set as a value obtained by subtracting 1 from the value at the time of the reset and an operation starts, the count value of the upper counter 101 at the time of start of the second reading after the count value of the upper counter 101 is inverted at the time of the first reading enters a state in which 1 is additionally added to the count value of the upper counter 101. That is, it is necessary to subtract 1 from the count value of the upper counter 101 at the time of start of the second reading. Therefore, after the initial value of the count value of the upper counter 101 is set as the value obtained by subtracting 1 from the value at the time of the reset and the operation starts, when the count value of the lower counter 103b before the inversion in the second reading is 0, it is not necessary to adjust the upper count value. When the count value of the lower counter 103b before the inversion in the second reading is 1, it is necessary to subtract 1 from the upper count value.

In the present example, the initial value of the count value of the upper counter 101 is set as the value obtained by subtracting 1 from the value at the time of the reset. Instead, the initial value of the count value of the upper counter 101 may also be set as the value at the time of the reset, and 1 may also be subtracted from the count value of the upper counter 101 after the count value is inverted at the time of the second reading. Here, the initial value of the count value of the upper counter 101 is set based on the number of subtractions (CDS processes). Furthermore, in the above, when the count values of the lower counters 103a and 103b are inverted, the count value of the lower counter 103b, which is a bit for a flag, is inverted. However, the count value of the lower counter 103b may also not be inverted. When the count value of the lower counter 103b is not inverted, it is sufficient if a determination criterion of the determination unit 105 based on the count value of the lower counter 103b is changed to be opposite to the above.

As described above, in accordance with the present preferred embodiment, since the count value held by the upper counter 101 is protected at the time of count clock switching, it is possible to prevent the occurrence of erroneous count due to the count clock switching. Furthermore, since it is sufficient if the lower counters 103a and 103b and the upper counter 101 have only one type of count mode (a down-count mode in the present preferred embodiment), it is possible to realize the A/D conversion circuit using a simple circuit configuration.

Furthermore, the count value of the upper counter 101 is initially set as a predetermined value, so that it is possible to adjust the count value of the upper counter 101 according to shift-down digit of the count values of the lower counters 103a and 103b without changing the count mode.

Fourth Preferred Embodiment

Next, a fourth preferred embodiment of the present invention will be described. The configuration of an image pick-up device in accordance with the present preferred embodiment is substantially identical to the configuration illustrated in FIG. 1, except for the column A/D conversion section 16. Therefore, the redundant description will not be repeated. Furthermore, in the column A/D conversion section 16 of the present preferred embodiment, since a detailed configuration, from which the comparison units 110 are excluded and a unit of the elements of the column A/D conversion section 16 is extracted, is substantially identical to the configuration illustrated in FIG. 13, a description thereof will be omitted here.

Next, the operation of the present example will be described. Hereinafter, first and second read operations and subsequent subtraction (a CDS process) will be described in detail. For the purpose of convenience, it is assumed that a count mode of the upper counter 101 is an up-count mode, count modes of the lower counters 103a and 103b are down-count modes, and the upper counter 101 and the lower counters 103a and 103b perform counting at the falling edge timing of a count clock. Similarly to the third preferred embodiment, in the present preferred embodiment, the count clock is switched only at the time of the second reading. Since a schematic operation of the present preferred embodiment is substantially identical to the schematic operation described in the third preferred embodiment, description thereof will be omitted.

Next, the operation of the configuration illustrated in FIG. 13 will be described using a detailed example. In the present description, the case in which a 4-bit down-counter circuit is used as the lower counters 103a and 103b and a 9-bit down-counter circuit is used as the upper counter 101 will be described. In the following description, an operation the same as that of the configuration illustrated in FIG. 2 will not be described.

Figure 16:
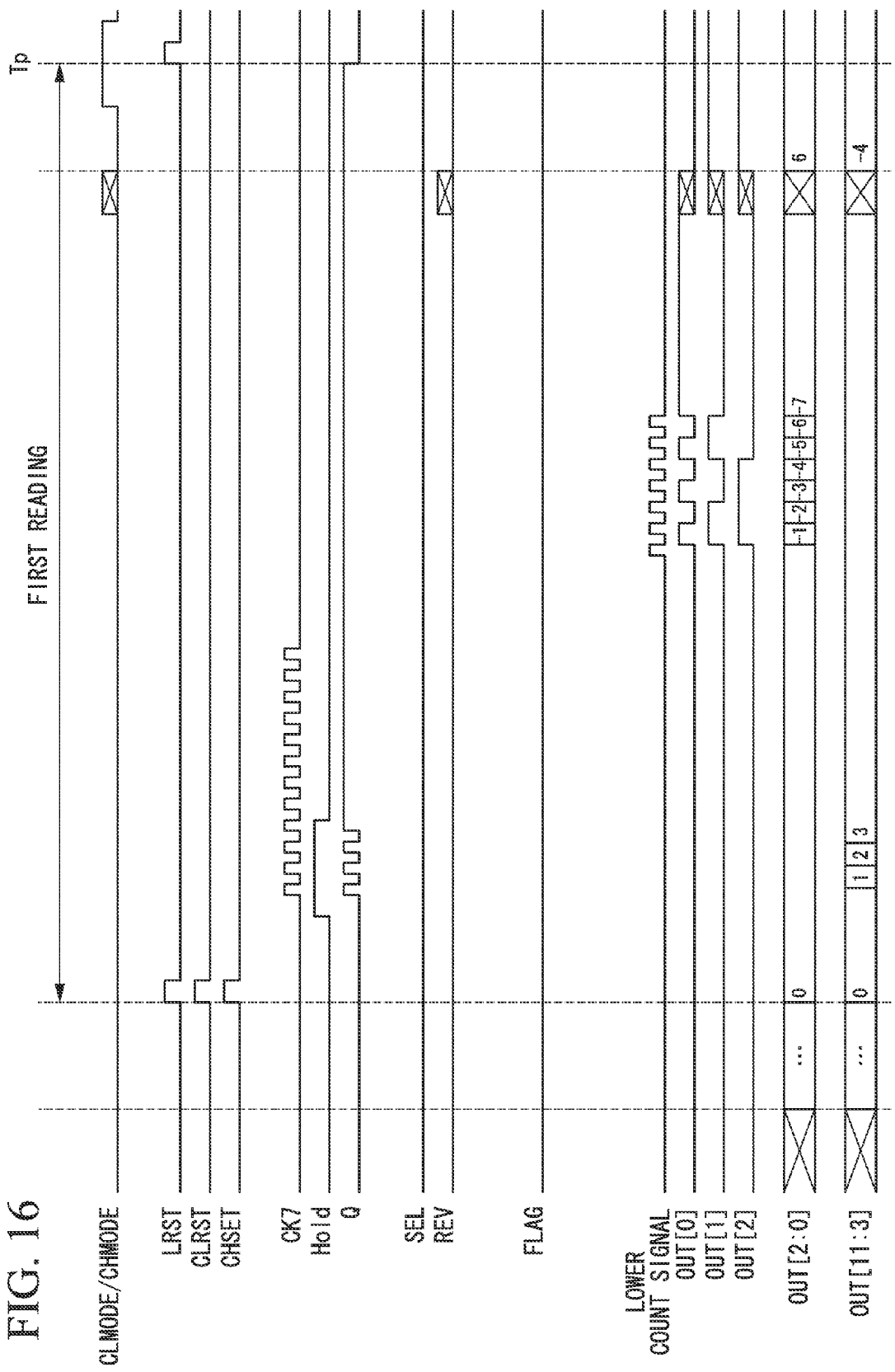
FIG. 16 is a timing chart illustrating the operation at the time of subtraction in accordance with the fourth preferred embodiment of the present invention.
Figure 17:
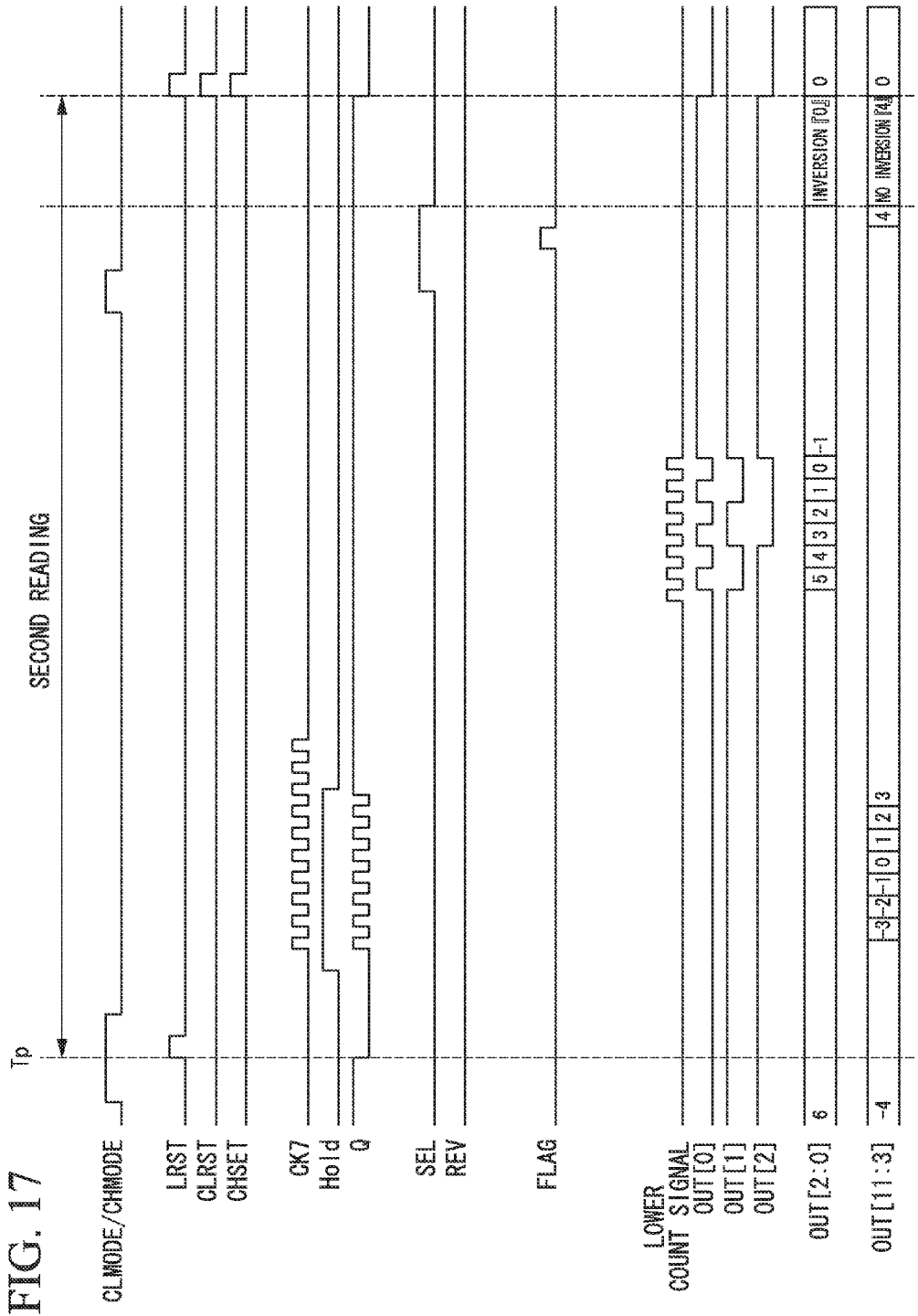
FIG. 17 is a timing chart illustrating the operation at the time of subtraction in accordance with the fourth preferred embodiment of the present invention.

Hereinafter, an example in which subtraction (a CDS process) of a first pixel signal and a second pixel signal subsequent to the first pixel signal is performed will be described. In the present example, binary subtraction using a complement of 2 is performed. FIG. 16 and FIG. 17 are timing charts illustrating the operation at the time of subtraction in accordance with the fourth preferred embodiment of the present invention. FIG. 16 and FIG. 17 illustrate the waveforms of signals. FIG. 16 illustrates the waveforms of signals at the time of the first reading and FIG. 17 illustrates the waveforms of signals at the time of the second reading.

Here, it is assumed that a state corresponding to the lower phase signal of the first pixel signal is the state 7, an upper count value based on the first pixel signal is 3, a state corresponding to the lower phase signal of the second pixel signal is the state 7, and an upper count value based on the second pixel signal is 7. That is, the first pixel signal corresponds to 31 (=7+8 3), the second pixel signal corresponds to 63 (=7+8 7), and a value obtained by subtracting (a CDS process) the first pixel signal from the second pixel signal is 32.

First Reading

Initially, the control signals CLMODE/CHMODE enter an L state and the operation modes of the lower counters 103a and 103b and the upper counter 101 are set as the count modes. Next, the count values of the lower counters 103a and 103b are reset by the control signal CLRST. Furthermore, the count value of the upper counter 101 is set as a predetermined value (9' b0000_0000_0 in this case) by the control signal CHSET. Simultaneously, the logic states of the latch circuits D_0 to D_7 are reset by the control signal LRST. Since the control signal SEL has been set as an L state, the count clock of the upper counter 101 is set as the output of the latch circuit D_7 of the latch unit 108. Accordingly, until a comparison process is completed, the clock signal CK7 is input to the upper counter 101 through the latch circuit D_7 and the switching unit 109, and the upper counter 101 performs counting using the clock signal CK7 as a count clock. At the time point at which the comparison process starts, values held by the lower counters 103a and 103b are 3' b[0]000 and a value held by the upper counter 101 is 9' b0000_0000_0. If these values are expressed in 12 bits, 12' b0000_0000_0000 is obtained. In the present example, the count value of the upper counter 101 may also be reset.

At a first timing (the first timing related to the comparison of the ramp wave applied from the ramp unit 19 and the reset level in the above-mentioned operation) satisfying predetermined conditions, the control signal Hold is inverted, and the states of the clock signals CK0 to CK7, which are the logic state of the VCO100 at that time, are held (the first lower phase signal). Simultaneously, the upper counter 101 stops the count operation. At this time, values held by the lower counters 103a and 103b are 3' b[0]000 and a value held by the upper counter 101 is 9' b0000_0001_1 (corresponding to 3). If these values are expressed in 12 bits, 12' b0000_0001_1000 is obtained.

Next, a binarization process of the first lower phase signal is performed. Through the binarization process of the first lower phase signal, a count clock is output from the arithmetic circuit 106 to the lower counter 103a, so that the lower counter 103a performs counting. In the present example, the inverted output of the third bit of the lower counter 103a is input to the lower counter 103b. At the timing at which the output of the third bit of the lower counter 103a changes from "0" to "1," the inverted output of the third bit of the lower counter 103a changes from "1" to "0," and shift-down digit occurs in the count value of the lower counter 103a. By the shift-down digit, 1 is subtracted from the count value of the lower counter 103b. At the time point at which the binarization process of the first lower phase signal is completed, values held by the lower counters 103a and 103b are 3' b[1]001 (corresponding to −7) and a value held by the upper counter 101 is 9' b0000_0001_1 (corresponding to 3). If these values are expressed in 12 bits, 12' b0000_0001_1001 is obtained.

Then, the count values of the lower counters 103a and 103b and the upper counter 101 are inverted. At this time, values held by the lower counters 103a and 103b are 3' b[0]110 (corresponding to 6) and a value held by the upper counter 101 is 9' b1111_1110_0 (corresponding to −4). If these values are expressed in 12 bits, 12' b1111_1110_0110 is obtained. Similarly to the third preferred embodiment, in the present example, 1 is not added after the value is inverted.

Then, the control signals CLMODE/CHMODE enter an H state. Accordingly, the operation modes of the lower counters 103a and 103b and the upper counter 101 are the data protection modes.

Second Reading

Then, the latch circuits D_0 to D_7 are reset by the control signal LRST. Here, the count values of the lower counters 103a and 103b are not reset by the control signal CLRST and the count value of the upper counter 101 is not set by the control signal CHSET. Then, the control signals CLMODE/CHMODE enter an L state. Accordingly, the operation modes of the lower counters 103a and 103b and the upper counter 101 are set as the count modes. At this time, values held by the lower counters 103a and 103b are 3' b[0]110 (corresponding to 6) and a value held by the upper counter 101 is 9' b1111_1110_0 (corresponding to −4). If these values are expressed in 12 bits, 12' b1111_1110_0110 is obtained.

At a second timing (the second timing related to the comparison of the ramp wave applied from the ramp unit 19 and the signal level in the above-mentioned operation) satisfying predetermined conditions, the control signal Hold is inverted, and the states of the clock signals CK0 to CK7, which are the logic state of the VCO100 at that time, are held (the second lower phase signal). Simultaneously, the upper counter 101 stops the count operation. At this time, values held by the lower counters 103a and 103b are 3' b[0]110 (corresponding to 6) and a value held by the upper counter 101 is 9' b0000_0001_1 (corresponding to 3). If these values are expressed in 12 bits, 12' b0000_0001_1110 is obtained.

Then, a binarization process of the second lower phase signal is performed. Through the binarization process of the second lower phase signal, a count clock is output from the arithmetic circuit 106 to the lower counter 103a, so that the lower counter 103a performs counting. In the present example, the inverted output of the third bit of the lower counter 103a is input to the lower counter 103b. At the timing at which the output of the third bit of the lower counter 103a changes from "0" to "1," the inverted output of the third bit of the lower counter 103a changes from "1" to "0," and shift-down digit occurs in the count value of the lower counter 103a. By the shift-down digit, 1 is subtracted from the count value of the lower counter 103b. At the time point at which the binarization process of the second lower phase signal is completed, values held by the lower counters 103a and 103b are 3' b[1]111 (corresponding to −1) and a value held by the upper counter 101 is 9' b0000_0001_1 (corresponding to 3). If these values are expressed in 12 bits, 12' b0000_0001_1111 is obtained.

Then, it is necessary to adjust the upper count value according to the count value of the lower counter 103b. In the present example, when the count value of the lower counter 103b is 1, it is necessary to add 1 to the count value of the upper counter 101. Furthermore, when the count value of the lower counter 103b before the inversion is 0, it is not necessary to adjust the count value of the upper counter 101.

Accordingly, determination by the determination unit 105 and addition of the upper count value are performed. The determination unit 105 outputs a count clock for addition when the count value of the lower counter 103b is 1 and does not output the count clock when the count value of the lower counter 103b is 0.

In the case of the present example, since the count value of the lower counter 103b is 1, the determination unit 105 outputs the count clock. Therefore, if the count clock of the upper counter 101 is switched to the output signal of the determination unit 105, the count value of the upper counter 101 is incremented by 1. At this time, values held by the lower counters 103a and 103b are 3' b[1]111 (corresponding to −1) and a value held by the upper counter 101 is 9' b0000_0010_0 (corresponding to 4). If these values are expressed in 12 bits, 12' b0000_0010_0111 is obtained.

As described above, since the count values of the lower counters 103a and 103b are negative numbers, only the count values of the lower counters 103a and 103b are inverted (not illustrated in FIG. 17). At this time, values held by the lower counters 103a and 103b are 3' b[0]000 (corresponding to 0) and a value held by the upper counter 101 is 9' b0000_0010_0 (corresponding to 4). If these values are expressed in 12 bits, 12' b0000_0010_0000 (corresponding to 32) is obtained. In binary subtraction, values are inverted and then 1 needs to be added. However, as described above, since a value is inverted even in the first reading, a change in a value is offset due to the addition of 1 after each inversion. In this regard, in the present example, in relation to the lower count value, 1 is not added after a value is inverted.

Digital data including the second lower count value and the second upper count value is transmitted to the output unit 17 by the horizontal selection unit 14 through the horizontal signal line. Through the above operation, binary data corresponding to the difference between the first pixel signal and the second pixel signal is obtained. In the above, when the count values of the lower counters 103a and 103b are inverted, the count value of the lower counter 103b, which is a bit for a flag, is inverted. However, the count value of the lower counter 103b may not be inverted. When the count value of the lower counters 103 is not inverted, it is sufficient if a determination criterion of the determination unit 105 based on the count value of the lower counter 103b is changed to be opposite to the above.

As described above, in accordance with the present preferred embodiment, since the count value held by the upper counter 101 is protected at the time of count clock switching, it is possible to prevent the occurrence of erroneous count due to the count clock switching. Furthermore, since it is sufficient if the lower counters 103a and 103b and the upper counter 101 have only one type of count mode (the lower counters 103a and 103b have a down-count mode and the upper counter 101 has an up-count mode in the present preferred embodiment), it is possible to realize the A/D conversion circuit using a simple circuit configuration.

Fifth Preferred Embodiment

Next, a fifth preferred embodiment of the present invention will be described. The configuration of an image pick-up device in accordance with the present preferred embodiment is substantially identical to the configuration illustrated in FIG. 1, except for the column A/D conversion section 16. Therefore, a description thereof will not be repeated here.

Figure 18:
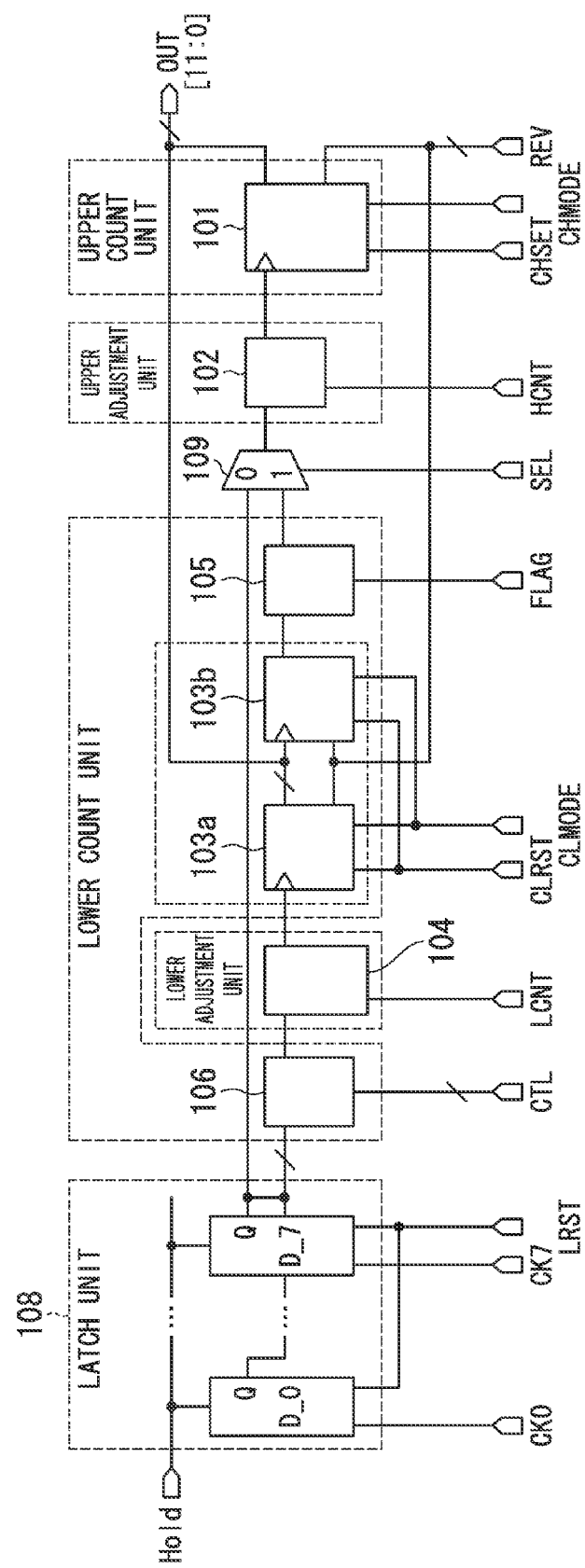
FIG. 18 is a block diagram illustrating a partial configuration of the column A/D conversion section in accordance with the fifth preferred embodiment of the present invention.

FIG. 18 is a block diagram illustrating a partial configuration of the column A/D conversion section in accordance with the fifth preferred embodiment of the present invention. FIG. 18 illustrates an example of a detailed configuration, from which the comparison units 110 are excluded and a unit of the elements of the column A/D conversion section 16 is extracted, in order to further describe the column A/D conversion section 16 of FIG. 1. Hereinafter, the configuration illustrated in FIG. 18 will be described. As illustrated in FIG. 18, the column A/D conversion section 16 is provided with the latch unit 108, the arithmetic circuit 106, a lower adjustment circuit 104, the lower counters 103a and 103b, the determination unit 105, the switching unit 109, an upper adjustment circuit 102, and the upper counter 101. Since a configuration other than the lower adjustment circuit 104, the lower counters 103a and 103b, the determination unit 105, the upper adjustment circuit 102, and the upper counter 101 is substantially identical to the configuration illustrated in FIG. 2, a description thereof will be omitted here.

The lower counters 103a and 103b constitute a 4-bit binary counter circuit. The lower counter 103a counts count values of a first bit to a third bit and the lower counter 103b counts a count value of a fourth bit. The lower counter 103b is a counter for a flag which performs counting according to carry digit occurring when the lower counter 103a has performed counting. In the present example, the inverted output of the third bit of the lower counter 103a is input to the lower counter 103b. Furthermore, in the first preferred embodiment and the second preferred embodiment, the control signal CHRST for resetting a count value is input to the upper counter 101. However, in the present preferred embodiment, the control signal CHSET for setting a count value as a predetermined value is input to the upper counter 101. That is, the upper counter 101 of the present preferred embodiment has a data set function.

The lower adjustment circuit 104 constitutes a lower adjustment unit. After a value held by the lower counter 103 is inverted, the lower adjustment circuit 104 generates an adjustment pulse for adjusting the value based on the control signal LCNT, and outputs the adjustment pulse to the lower counter 103. The upper adjustment circuit 102 constitutes an upper adjustment unit. After a value held by the upper counter 101 is inverted, the upper adjustment circuit 102 generates an adjustment pulse for adjusting the value based on the control signal HCNT, and outputs the adjustment pulse to the upper counter 101.

The determination unit 105 determines whether it is necessary to adjust an upper count value based on the output signal of the lower counter 103b in a period designated by the control signal FLAG. When it is determined that it is necessary to adjust the upper count value, the determination unit 105 outputs a count clock for adding the upper count value to the switching unit 109. The ramp unit 19, the VCO100, and the comparison unit 110 of FIG. 1 and the configuration illustrated in FIG. 18 are an example of the A/D conversion circuit of the present invention.

Next, the operation of the present example will be described. Hereinafter, first and second read operations and subsequent subtraction (a CDS process) will be described in detail. For the purpose of convenience, it is assumed that count modes of the upper counter 101 and the lower counters 103a and 103b are up-count modes, and the upper counter 101 and the lower counters 103a and 103b perform counting at the falling edge timing of a count clock. Furthermore, an operation the same as the above-mentioned operation will not be described. Similarly to the third preferred embodiment, in the present preferred embodiment, the count clock is switched only at the time of the second reading.

First Reading

The first reading from the unit pixel 3 of an arbitrary pixel row to the vertical signal line 13 is stabilized, and then the ramp unit 19 outputs a ramp wave. The comparison unit 110 compares the ramp wave with a reset level. During this time, the upper counter 101 performs counting using a clock output from the VCO100 as a count clock.

The comparison unit 110 compares the ramp wave applied from the ramp unit 19 with the reset level, and inverts comparison output when both voltages approximately coincide with each other (at a first timing). At the first timing, the latch unit 108 holds the logic state of the VCO100 as a first lower phase signal. Furthermore, at the first timing, the upper counter 101 stops the count operation to hold the logic state as a first upper count value. Next, the ramp unit 19 stops generating the ramp wave.

Then, the arithmetic circuit 106 generates a first lower count signal which is a clock signal corresponding to the first lower phase signal held by the latch unit 108, and outputs the first lower count signal to the lower counters 103a and 103b. The lower counters 103a and 103b count the first lower count signal as a count clock. Accordingly, a first lower count value is obtained.

Next, values of bits constituting the first lower count value held by the lower counters 103a and 103b and a first upper count value held by the upper counter 101 are inverted. Subsequently, the lower adjustment circuit 104 generates the adjustment pulse to output the adjustment pulse to the lower counters 103a and 103b, and the upper adjustment circuit 102 generates the adjustment pulse to output the adjustment pulse to the upper counter 101. The lower counters 103a and 103b and the upper counter 101 count the adjustment pulses as a count clock, respectively.

Second Reading

Subsequently, at the time of second reading, a signal level corresponding to the amount of incident light of each unit pixel 3 is read, and an operation similar to that of the first reading is performed. The second reading from the unit pixel 3 of an arbitrary pixel row to the vertical signal line 13 is stabilized, and then the ramp unit 19 outputs a ramp wave. The comparison unit 110 compares the ramp wave with the signal level. During this time, the upper counter 101 performs counting using a clock output from the VCO100 as a count clock.

The comparison unit 110 compares the ramp wave applied from the ramp unit 19 with the signal level, and inverts comparison output when both voltages approximately coincide with each other (at a second timing). At the second timing, the latch unit 108 holds the logic state of the VCO100 as a second lower phase signal. Furthermore, at the second timing, the upper counter 101 stops the count operation to hold the logic state as a second upper count value. Accordingly, an upper count value corresponding to the difference between the reset level and the signal level is obtained. Then, the ramp unit 19 stops generating the ramp wave.

Then, the arithmetic circuit 106 generates a second lower count signal which is a clock signal corresponding to the second lower phase signal held by the latch unit 108, and outputs the second lower count signal to the lower counters 103a and 103b. The lower counters 103a and 103b count the second lower count signal as a count clock. Accordingly, a second lower count value, which is a lower count value corresponding to the difference between the reset level and the signal level, is obtained. While the lower counters 103a and 103b perform the counting, the upper counter 101 performs counting according to carry digit in the lower counters 103a and 103b.

Next, the count clock input to the upper counter 101 is switched. The switched count clock is the output signal of the determination unit 105 based on the output signal of the lower counter 103b. In order to prevent the occurrence of erroneous count, the operation mode of the upper counter 101 is changed to the data protection mode, and count clock switching is performed. The determination unit 105 outputs a count clock when the output signal of the lower counter 103b is in an L state, and does not output the count clock when the output signal of the lower counter 103b is in an H state. When the count clock is output from the determination unit 105, 1 is added to the upper count value of the upper counter 101.

In this way, the second lower count value and the second upper count value corresponding to the difference between the reset level and the signal level are obtained. Digital data including the second lower count value and the second upper count value is transmitted to the output unit 17 by the horizontal selection unit 14 through the horizontal signal line.

Next, the operation of the configuration illustrated in FIG. 18 will be described using a detailed example. In the present description, the case in which a 4-bit up-counter circuit is used as the lower counters 103a and 103b and a 9-bit up-counter circuit is used as the upper counter 101 will be described. In the following description, an operation the same as that of the configuration illustrated in FIG. 2 will not be described.

Figure 19:
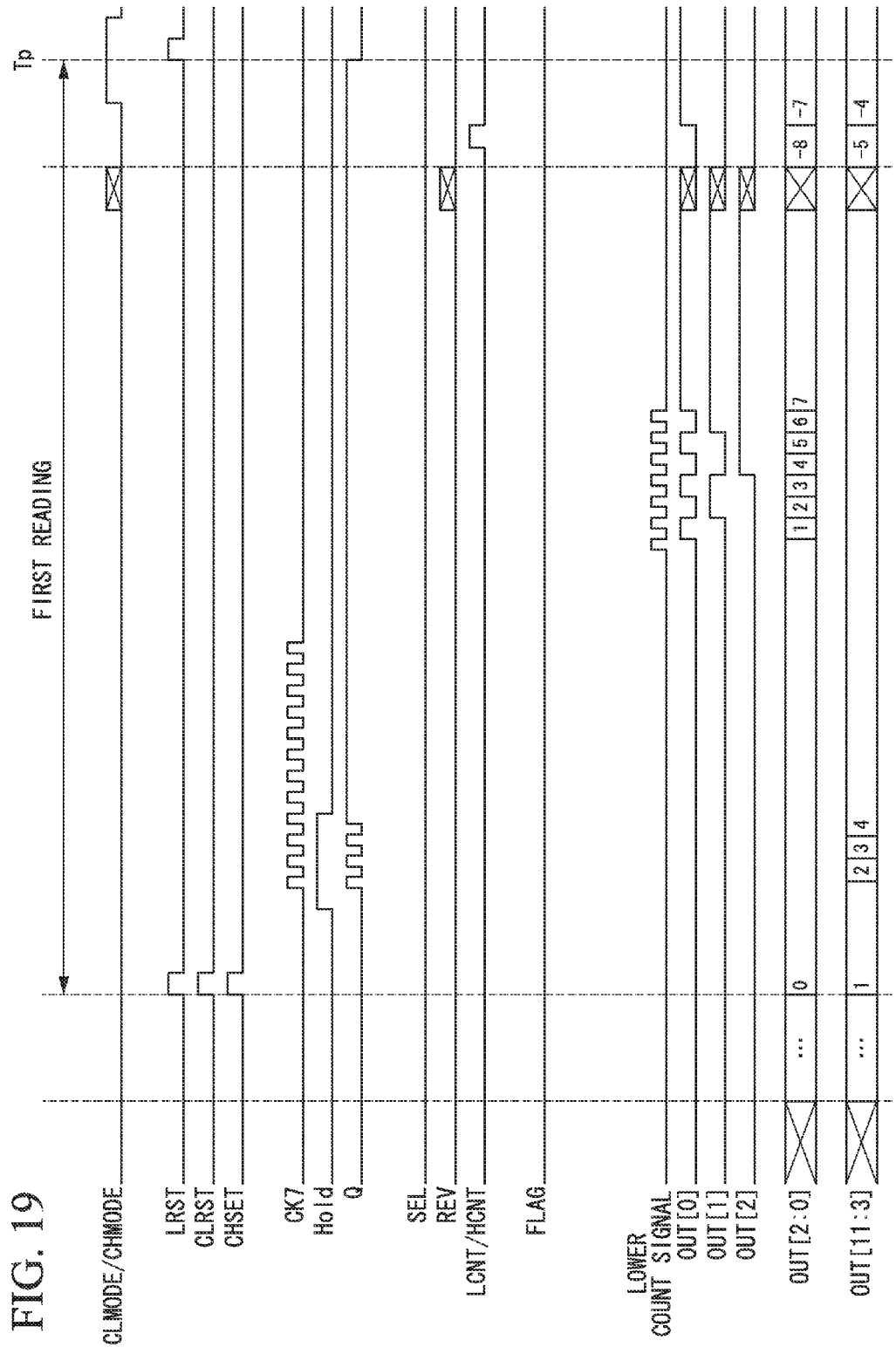
FIG. 19 is a timing chart illustrating the operation at the time of subtraction in accordance with the fifth preferred embodiment of the present invention.
Figure 20:
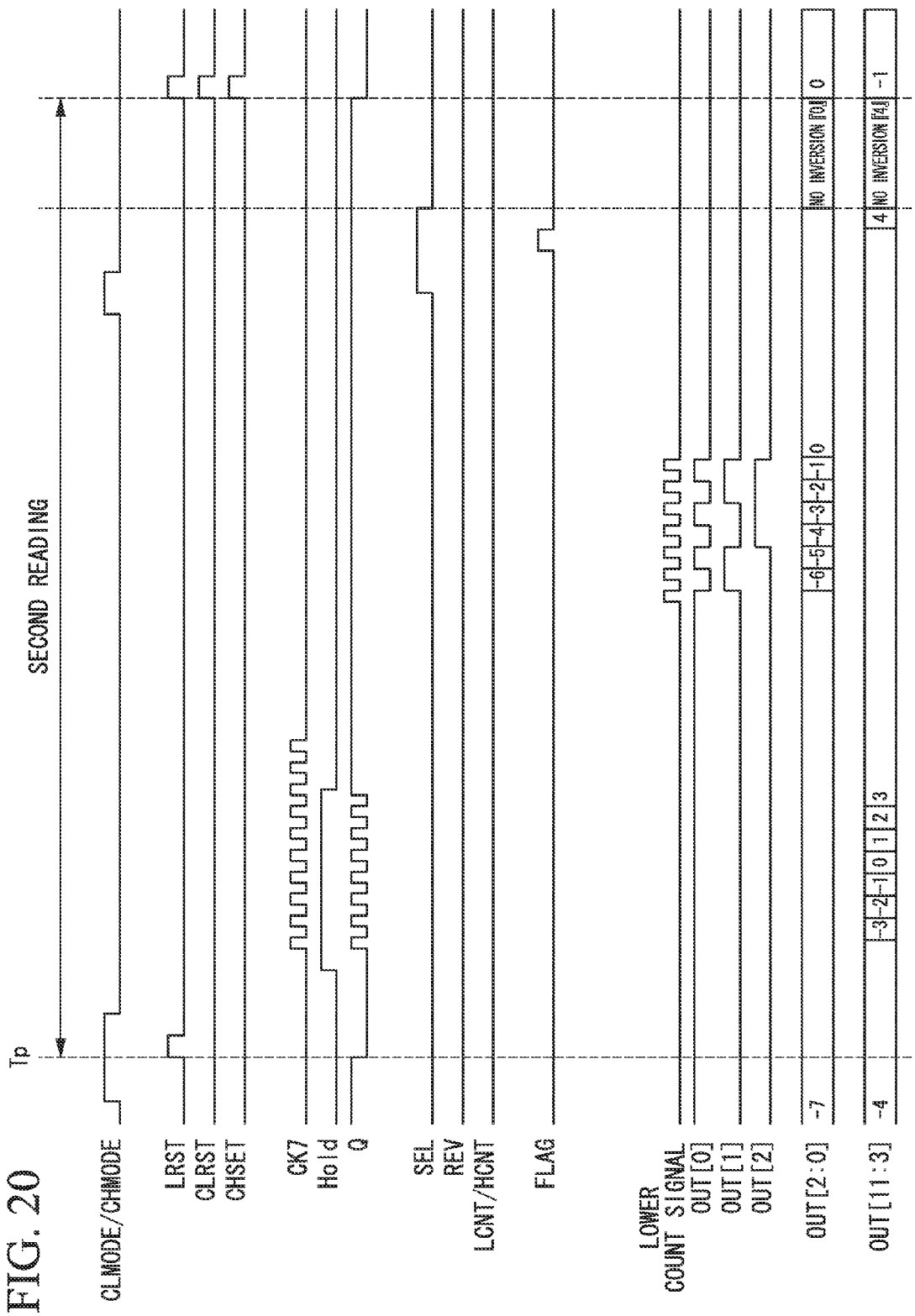
FIG. 20 is a timing chart illustrating the operation at the time of subtraction in accordance with the fifth preferred embodiment of the present invention.

Hereinafter, an example in which subtraction (a CDS process) of a first pixel signal and a second pixel signal subsequent to the first pixel signal is performed will be described. In the present example, binary subtraction using a complement of 2 is performed. FIG. 19 and FIG. 20 are timing charts illustrating the operation at the time of subtraction in accordance with the fifth preferred embodiment of the present invention. FIG. 19 and FIG. 20 illustrate the waveforms of signals. FIG. 19 illustrates the waveforms of signals at the time of the first reading and FIG. 20 illustrates the waveforms of signals at the time of the second reading.

Here, it is assumed that a state corresponding to the lower phase signal of the first pixel signal is the state 7, an upper count value based on the first pixel signal is 3, a state corresponding to the lower phase signal of the second pixel signal is the state 7, and an upper count value based on the second pixel signal is 7. That is, the first pixel signal corresponds to 31 (=7+8 3), the second pixel signal corresponds to 63 (=7+8 7), and a value obtained by subtracting (a CDS process) the first pixel signal from the second pixel signal is 32.

First Reading

Initially, the control signals CLMODE/CHMODE enter an L state and the operation modes of the lower counters 103a and 103b and the upper counter 101 are set as the count modes. Next, the count values of the lower counters 103a and 103b are reset by the control signal CLRST. Furthermore, the count value of the upper counter 101 is set as a predetermined value (9' b0000_0000_1 in this case) by the control signal CHSET. Simultaneously, the logic states of the latch circuits D_0 to D_7 are reset by the control signal LRST. Since the control signal SEL has been set as an L state, the count clock of the upper counter 101 is set as the output of the latch circuit D_7 of the latch unit 108. Accordingly, until a comparison process is completed, the clock signal CK7 is input to the upper counter 101 through the latch circuit D_7 and the switching unit 109, and the upper counter 101 performs counting using the clock signal CK7 as a count clock. At the time point at which the comparison process starts, values held by the lower counters 103a and 103b are 3' b[0]000 and a value held by the upper counter 101 is 9' b0000_0000_1. If these values are expressed in 12 bits, 12' b0000_0000_1000 is obtained.

At a first timing (the first timing related to the comparison of the ramp wave applied from the ramp unit 19 and the reset level in the above-mentioned operation) satisfying predetermined conditions, the control signal Hold is inverted, and the states of the clock signals CK0 to CK7, which are the logic state of the VCO100 at that time, are held (the first lower phase signal). Simultaneously, the upper counter 101 stops the count operation. At this time, values held by the lower counters 103a and 103b are 3' b[0]000 and a value held by the upper counter 101 is 9' b0000_0010_0 (corresponding to 4). If these values are expressed in 12 bits, 12' b0000_0010_0000 is obtained.

Next, a binarization process of the first lower phase signal is performed. Through the binarization process of the first lower phase signal, a count clock is output from the arithmetic circuit 106 to the lower counter 103a, so that the lower counter 103a performs counting. In the present example, carry digit does not occur in the count value of the lower counter 103. At the time point at which the binarization process of the first lower phase signal is completed, values held by the lower counters 103a and 103b are 3' b[0]111 (corresponding to 7) and a value held by the upper counter 101 is 9' b0000_0010_0 (corresponding to 4). If these values are expressed in 12 bits, 12' b0000_0010_0111 is obtained.

Then, the count values of the lower counters 103a and 103b and the upper counter 101 are inverted. At this time, values held by the lower counters 103a and 103b are 3' b[1]000 (corresponding to −8) and a value held by the upper counter 101 is 9' b1111_1101_1 (corresponding to −5). If these values are expressed in 12 bits, 12' b1111_1101_1000 is obtained.

In binary subtraction, since values are inverted and then 1 need to be added, the lower adjustment circuit 104 generates an adjustment pulse of one pulse based on the control signal LCNT, and outputs the adjustment pulse to the lower counters 103a and 103b. The lower counters 103a and 103b count the adjustment pulse as a count clock. Furthermore, the upper adjustment circuit 102 generates an adjustment pulse of one pulse based on the control signal HCNT, and outputs the adjustment pulse to the upper counter 101. The upper counter 101 performs counting using the adjustment pulse as a count clock. Through this counting, the count value of the upper counter 101 is incremented by 1.

At this time, values held by the lower counters 103a and 103b are 3' b[1]001 (corresponding to −7) and a value held by the upper counter 101 is 9' b1111_1110_0 (corresponding to −4). If these values are expressed in 12 bits, 12' b1111_1110_0001 is obtained. In the present example, since the lower counters 103a and 103b and the upper counter 101 operate as separate counter circuits, count values are adjusted both in the lower counters 103a and 103b and the upper counter 101, differently from the second preferred embodiment.

Then, the control signals CLMODE/CHMODE enter an H state. Accordingly, the operation modes of the lower counters 103a and 103b and the upper counter 101 are the data protection modes.

Second Reading

Then, the latch circuits D_0 to D_7 are reset by the control signal LRST. Here, the count values of the lower counters 103a and 103b are not reset by the control signal CLRST and the count value of the upper counter 101 is not set by the control signal CHSET. Then, the control signals CLMODE/CHMODE enter an L state.

Accordingly, the operation modes of the lower counters 103a and 103b and the upper counter 101 are the count modes. At this time, values held by the lower counters 103a and 103b are 3' b[1]001 (corresponding to −7) and a value held by the upper counter 101 is 9' b1111_1110_0 (corresponding to −4). If these values are expressed in 12 bits, 12' b1111_1110_0001 is obtained.

At a second timing (the second timing related to the comparison of the ramp wave applied from the ramp unit 19 and the signal level in the above-mentioned operation) satisfying predetermined conditions, the control signal Hold is inverted, and the states of the clock signals CK0 to CK7, which are the logic state of the VCO100 at that time, are held (the second lower phase signal). Simultaneously, the upper counter 101 stops the count operation. At this time, values held by the lower counters 103a and 103b are 3' b[1]001 (corresponding to −7) and a value held by the upper counter 101 is 9' b0000_0001_1 (corresponding to 3). If these values are expressed in 12 bits, 12' b0000_0001_1001 is obtained.

Then, a binarization process of the second lower phase signal is performed. Through the binarization process of the second lower phase signal, a count clock is output from the arithmetic circuit 106 to the lower counter 103a, so that the lower counter 103a performs counting. At the timing at which the output of the third bit of the lower counter 103a changes from "1" to "0," carry digit occurs in the count value of the lower counter 103a. By the carry digit, 1 is added to the count value of the lower counter 103b. At the time point at which the binarization process of the second lower phase signal is completed, values held by the lower counters 103a and 103b are 3' b[0]000 (corresponding to 0) and a value held by the upper counter 101 is 9' b0000_0001_1 (corresponding to 3). If these values are expressed in 12 bits, 12' b0000_0001_1000 is obtained.

Next, determination by the determination unit 105 and subtraction of the upper count value are performed. The determination unit 105 outputs a count clock when the count value of the lower counter 103b is 0 and does not output the count clock when the count value of the lower counter 103b is 1.

First, the control signals CLMODE/CHMODE enter an H state. Accordingly, the operation modes of the lower counters 103a and 103b and the upper counter 101 are the data protection modes. Then, the control signal SEL is set as an H state. The count clock of the upper counter 101 at this time is an output signal of the determination unit 105. At this time, values held by the lower counters 103a and 103b are 3' b[0]000 (corresponding to 0) and a value held by the upper counter 101 is 9' b0000_0001_1 (corresponding to 3). If these values are expressed in 12 bits, 12' b0000_0001_1000 is obtained.

Then, the control signals CLMODE/CHMODE enter an L state, and the operation modes of the lower counters 103a and 103b and the upper counter 101 are set as the count modes. Since the count value of the lower counter 103b is 0, the determination unit 105 outputs the count clock. The upper counter 101 performs counting based on the count clock. Through this counting, the count value of the upper counter 101 is incremented by 1. At this time, values held by the lower counters 103a and 103b are 3' b[0]000 (corresponding to 0) and a value held by the upper counter 101 is 9' b0000_0010_0 (corresponding to 4). If these values are expressed in 12 bits, 12' b0000_0010_0000 (corresponding to 32) is obtained.

Digital data including the second lower count value and the second upper count value is transmitted to the output unit 17 by the horizontal selection unit 14 through the horizontal signal line. Through the above operation, binary data corresponding to the difference between the first pixel signal and the second pixel signal is obtained.

Next, in the present example, the reason for initially setting the count value of the upper counter 101 as a predetermined value will be described. An operation in the case of initially resetting the count value of the upper counter 101 and performing counting is as follows. In the following description, similarly to the above description, it is assumed that a state corresponding to the lower phase signal of the first pixel signal is the state 7, an upper count value based on the first pixel signal is 3, a state corresponding to the lower phase signal of the second pixel signal is the state 7, and an upper count value based on the second pixel signal is 7. That is, the first pixel signal corresponds to 31 (=7+8 3), the second pixel signal corresponds to 63 (=7+8 7), and a value obtained by subtracting (a CDS process) the first pixel signal from the second pixel signal is 32. In the following description, the redundant description will not be repeated. Furthermore, the upper counter 101 will be described based on the assumption that the upper counter 101 has a reset function.

First Reading

An operation in the first reading is similar to the above operation. However, since the count value of the upper counter 101 is initially reset, the count value of the upper counter 101 is different from the count value in the above operation. At the time point at which the first reading is completed, values held by the lower counters 103a and 103b are 3' b[1]001 (corresponding to −7) and a value held by the upper counter 101 is 9' b1111_1110_1 (corresponding to −3). If these values are expressed in 12 bits, 12' b1111_1110_1001 is obtained.

Second Reading

In the second reading, an operation until the count clock input to the upper counter 101 is switched is similar to the above operation. However, since the count value of the upper counter 101 is initially reset, the count value of the upper counter 101 is different from a count value in the above operation. At the time point at which the count clock is switched, values held by the lower counters 103a and 103b are 3' b[0]000 (corresponding to 0) and the value held by the upper counter 101 is 9' b0000_0010_0 (corresponding to 4). If these values are expressed in 12 bits, 12' b0000_0010_0000 is obtained.

Then, it is necessary to adjust the upper count value according to the count value of the lower counter 103b. When the count value of the lower counter 103b is 1, since the lower count value is a negative number, it is necessary to subtract 1 from the count value of the upper counter 101. Furthermore, when the count value of the lower counter 103b is 0, it is not necessary to adjust the count value of the upper counter 101.

Accordingly, determination by the determination unit 105 and subtraction of the upper count value are performed. The determination unit 105 outputs a count clock for subtraction when the count value of the lower counter 103b is 1 and does not output the count clock when the count value of the lower counter 103b is 0.

In the case of the present example, since the count value of the lower counter 103b is 0, the determination unit 105 does not output the count clock. Therefore, even when the count clock of the upper counter 101 is switched to the output signal of the determination unit 105, the count value of the upper counter 101 does not change. At this time, values held by the lower counters 103a and 103b are 3' b[0]000 (corresponding to 0) and a value held by the upper counter 101 is 9' b0000_0010_0 (corresponding to 4). If these values are expressed in 12 bits, 12' b0000_0010_0000 (corresponding to 32) is obtained. This result is the same as the above-mentioned result.

In the present example, subtraction for adjusting the count value of the upper counter 101 is not performed. However, when it is necessary to adjust the count value of the upper counter 101, since the upper counter 101 performs counting in an up-count mode in the present example, it is not possible to perform the subtraction for adjusting the count value. Hereinafter, an example in which it is necessary to perform the subtraction for adjusting the count value of the upper counter 101 will be described.

In the following description, it is assumed that a state corresponding to the lower phase signal of the first pixel signal is the state 7, an upper count value based on the first pixel signal is 3, a state corresponding to the lower phase signal of the second pixel signal is the state 1, and an upper count value based on the second pixel signal is 7. That is, the first pixel signal corresponds to 31 (=7+8 3), the second pixel signal corresponds to 57 (=1+8 7), and a value obtained by subtracting (a CDS process) the first pixel signal from the second pixel signal is 26. In the following description, the redundant description will not be repeated. Furthermore, the upper counter 101 will be described based on the assumption that the upper counter 101 has a reset function.

First Reading

An operation in the first reading is similar to the above operation. At the time point at which the first reading is completed, values held by the lower counters 103a and 103b are 3' b[1]001 (corresponding to −7) and a value held by the upper counter 101 is 9' b1111_1110_1 (corresponding to −3). If these values are expressed in 12 bits, 12' b1111_1110_1001 is obtained.

Second Reading

In the second reading, the operation until the count clock input to the upper counter 101 is switched is similar to the above operation. At the time point at which the count clock is switched, values held by the lower counters 103a and 103b are 3' b[1]010 (corresponding to −6) and a value held by the upper counter 101 is 9' b0000_0010_0 (corresponding to 4). If these values are expressed in 12 bits, 12' b0000_0010_0010 is obtained.

Then, it is necessary to adjust the upper count value according to the count value of the lower counter 103b. As described above, the determination unit 105 outputs a count clock for subtraction when the count value of the lower counter 103b is 1 and does not output the count clock when the count value of the lower counter 103b is 0.

In the case of the present example, since the count value of the lower counter 103b is 1, the determination unit 105 outputs the count clock. It is assumed that the upper counter 101 has performed subtraction based on the count clock. At this time, values held by the lower counters 103a and 103b are 3' b[1]010 (corresponding to −6) and a value held by the upper counter 101 is 9' b0000_0001_1 (corresponding to 3). If these values are expressed in 12 bits, 12' b0000_0001_1010 is obtained.

In the present example, it is assumed that the upper counter 101 performs the subtraction based on the count clock from the determination unit 105. However, actually, since the upper counter 101 performs counting in the up-count mode, it is not possible to perform the subtraction for adjusting the count value. Therefore, in the present preferred embodiment, an initial value of the count value of the upper counter 101 is set as a value obtained by adding 1 to a value at the time of reset.

As described above, when the count value of the lower counter 103b in the second reading is 1, it is necessary to subtract 1 from the count value of the upper counter 101. When the count value of the lower counter 103b is 0, it is not necessary to adjust the count value of the upper counter 101. Meanwhile, when the initial value of the count value of the upper counter 101 is set as a value obtained by adding 1 to the value at the time of the reset and an operation starts, the count value of the upper counter 101 at the time of start of the second reading after the count value of the upper counter 101 is inverted at the time of the first reading enters a state in which 1 is additionally subtracted from the count value of the upper counter 101. That is, it is necessary to add 1 to the count value of the upper counter 101 at the time of start of the second reading.

Therefore, after the initial value of the count value of the upper counter 101 is set as the value obtained by adding 1 to the value at the time of the reset and the operation starts, when the count value of the lower counter 103b in the second reading is 1, it is not necessary to adjust the upper count value. When the count value of the lower counter 103b before the inversion in the second reading is 0, it is necessary to add 1 to the upper count value.

In the present example, the initial value of the count value of the upper counter 101 is set as the value obtained by adding 1 to the value at the time of the reset. Instead, the initial value of the count value of the upper counter 101 may also be set as the value at the time of the reset, addition of a count value may not be performed after the count value is inverted at the time of the first reading, and addition of the count value of the upper counter 101 may also be performed according to the count value of the lower counter 103b at the time of the second reading. Here, the initial value of the count value of the upper counter 101 is set based on the number of subtractions (CDS processes).

As described above, in accordance with the present preferred embodiment, since the count value held by the upper counter 101 is protected at the time of count clock switching, it is possible to prevent the occurrence of erroneous count due to the count clock switching. Furthermore, since it is sufficient if the lower counters 103a and 103b and the upper counter 101 have only one type of count mode (the lower counters 103a and 103b have a down-count mode and the upper counter 101 has an up-count mode in the present preferred embodiment), it is possible to realize the A/D conversion circuit using a simple circuit configuration.

Furthermore, the lower adjustment circuit 104 and the upper adjustment circuit 102 output the adjustment pulses, and the lower counters 103a and 103b and the upper counter 101 count the adjustment pulses as a count pulse, so that it is possible to perform the binary subtraction in combination with the count value inversion performed immediately before the counting.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An A/D conversion circuit, comprising:
a reference signal generation unit that generates a reference signal increasing or decreasing through time;
a comparison unit that compares an analog signal to be subject to A/D conversion with the reference signal, and completes a comparison process at a timing at which the reference signal has satisfied a predetermined condition with respect to the analog signal;
a delay circuit that has a plurality of delay elements connected to one another to delay a pulse signal, and outputs a lower phase signal including output signals from the plurality of delay elements;
a latch unit that latches a first lower phase signal at a first timing and then latches a second lower phase signal at a second timing, the first timing corresponding to a timing at which the comparison process for a first analog signal is completed, the second timing corresponding to a timing at which the comparison process for a second analog signal is completed;
an arithmetic circuit that generates a first lower count signal according to the first lower phase signal held by the latch unit, and generates a second lower count signal according to the second lower phase signal held by the latch unit;
a lower counter including a first binary counter that performs counting using the first lower count signal as a count clock and outputs a first upper count clock to acquire a first lower count value, inverts values of respective bits constituting the first lower count value, and performs counting using the second lower count signal as a count clock and outputs a second upper count clock to acquire a second lower count value; and
an upper counter including a second binary counter that performs counting using the count clock based on one of the output signals constituting the first lower phase signal output from the delay circuit as a count clock, performs counting based on the first upper count clock to acquire a first upper count value, inverts values of respective bits constituting the first upper count value, performs counting using the count clock based on one of the output signals constituting the second lower phase signal output from the delay circuit as a count clock, and performs counting based on the second upper count clock to acquire a second upper count value, and having a data protection function for protecting an upper count value held by the second binary counter at the time of count clock switching,
wherein digital data corresponding to a difference between the first analog signal and the second analog signal is acquired.

2. The A/D conversion circuit according to claim 1, further comprising:
an adjustment unit that outputs an adjustment signal to the first binary counter or the second binary counter as a count clock, the adjustment signal being used for adjusting the lower count value held by the first binary counter or the upper count value held by the second binary counter.

3. The A/D conversion circuit according to claim 1, wherein the delay circuit is a ring-like delay circuit in which the plurality of delay elements are connected to one another in a ring shape.

4. An image pick-up device comprising:
an image capturing unit including a plurality of pixels provided with a photoelectric conversion element, the plurality of pixels outputting a first pixel signal corresponding to a reset level at a first time and outputting a second pixel signal corresponding to an amount of incident electromagnetic wave at a second time; and
the A/D conversion circuit according to claim 1,
wherein the first pixel signal is used as the first analog signal and the second pixel signal is used as the second analog signal.

5. An A/D conversion circuit, comprising:
a reference signal generation unit that generates a reference signal increasing or decreasing through time;
a comparison unit that compares an analog signal to be subject to A/D conversion with the reference signal, and completes a comparison process at a timing at which the reference signal has satisfied a predetermined condition with respect to the analog signal;
a delay circuit that has a plurality of delay elements connected to one another to delay a pulse signal, and outputs a lower phase signal including output signals from the plurality of delay elements;
a latch unit that latches a first lower phase signal at a first timing and then latches a second lower phase signal at a second timing, the first timing corresponding to a timing at which the comparison process for a first analog signal is completed, the second timing corresponding to a timing at which the comparison process for a second analog signal is completed;
an arithmetic circuit that generates a first lower count signal according to the first lower phase signal held by the latch unit, and generates a second lower count signal according to the second lower phase signal held by the latch unit;
a lower counter including a first binary counter that performs counting using the first lower count signal as a count clock to acquire a first lower count value, inverts values of respective bits constituting the first lower count value, performs counting using the second lower count signal as a count clock to acquire a second lower count value, and outputs an upper count clock based on a bit for a flag of the second lower count value; and
an upper counter including a second binary counter that performs counting using the count clock based on one of the output signals constituting the first lower phase signal output from the delay circuit as a count clock to acquire a first upper count value, inverts values of respective bits constituting the first upper count value, performs counting using the count clock based on one of the output signals constituting the second lower phase signal output from the delay circuit as a count clock, and performs counting based on the upper count clock to acquire a second upper count value, and having a data protection function for protecting an upper count value held by the second binary counter at a time of count clock switching, wherein digital data corresponding to a difference between the first analog signal and the second analog signal is acquired.

6. The A/D conversion circuit according to claim 5, wherein the upper counter further has a data set function for setting an initial value of the upper count value of the second binary counter when performing counting using the count clock based on the one of the output signals constituting the first lower phase signal output from the delay circuit as the count clock.

7. The A/D conversion circuit according to claim 5, further comprising:

an adjustment unit that outputs an adjustment signal to the first binary counter or the second binary counter as a count clock, the adjustment signal being used for adjusting the lower count value held by the first binary counter or the upper count value held by the second binary counter.

8. The A/D conversion circuit according to claim 5, wherein the delay circuit is a ring-like delay circuit in which the plurality of delay elements are connected to one another in a ring shape.

9. An image pick-up device comprising:

an image capturing unit including a plurality of pixels provided with a photoelectric conversion element, the plurality of pixels outputting a first pixel signal corresponding to a reset level at a first time and outputting a second pixel signal corresponding to an amount of incident electromagnetic wave at a second time; and the A/D conversion circuit according to claim 5, wherein the first pixel signal is used as the first analog signal and the second pixel signal is used as the second analog signal.

* * * * *